US012811182B2

(12) United States Patent
Parvinian et al.

(10) Patent No.: US 12,811,182 B2
(45) Date of Patent: Nov. 24, 2026

(54) LI-ION BATTERY CELL USING IMPROVED ANODE CURRENT COLLECTOR

(71) Applicant: Sila Nanotechnologies, Inc., Alameda, CA (US)

(72) Inventors: Sepideh Parvinian, Walnut Creek, CA (US); Indrani Bhattacharyya, Hayward, CA (US); Michael Joseph Pavilonis, San Francisco, CA (US); Weimin Wang, San Mateo, CA (US); Gaurav Rajpal Sharma, Alameda, CA (US); Jens Walter Heinrich Steiger, Alameda, CA (US)

(73) Assignee: Sila Nanotechnologies, Inc., Alameda, CA (US)

( * ) Notice: Subject to any disclaimer, the term of this patent is extended or adjusted under 35 U.S.C. 154(b) by 569 days.

(21) Appl. No.: 18/361,437

(22) Filed: Jul. 28, 2023

(65) Prior Publication Data

US 2024/0105984 A1 Mar. 28, 2024

Related U.S. Application Data

(60) Provisional application No. 63/369,746, filed on Jul. 28, 2022.

(51) Int. Cl.

*H01M 10/0525* (2010.01)
*H01M 4/04* (2006.01)
*H01M 10/0587* (2010.01)

(52) U.S. Cl.

CPC ..... *H01M 10/0525* (2013.01); *H01M 4/0404* (2013.01); *H01M 10/0587* (2013.01)

(58) Field of Classification Search

CPC ....... H01M 4/386; H01M 4/582; H01M 4/625
See application file for complete search history.

(56) References Cited

U.S. PATENT DOCUMENTS

2023/0343968 A1* 10/2023 Brewer ................. H01M 4/625

FOREIGN PATENT DOCUMENTS

WO WO2022005999 * 1/2022

* cited by examiner

*Primary Examiner* — Christopher P Domone

(74) *Attorney, Agent, or Firm* — Muncy, Geissler, Olds & Lowe, P.C.; Daniel Podhajny

(57) ABSTRACT

A lithium-ion battery and methods thereof are disclosed. In an aspect, the lithium-ion battery includes an anode component, a cathode component, a separator, and an electrolyte. The anode component includes an anode current collector and a respective anode coating on each side of the anode current collector. An anode coating includes composite particles including carbon and silicon. A mass fraction of the silicon in the composite particles of the anode coatings may be in a range of about 5 wt. % to about 70 wt. % of the anode coatings. The anode component undergoes a maximum areal expansion ($A_{max}$) during the multiple charging and discharging cycles. The anode current collector comprises a copper foil, the copper foil being characterized, before the respective anode coatings are formed thereon, by an ultimate tensile stress (UTS) and a strain at the UTS ($\varepsilon_{UTS}$).

32 Claims, 17 Drawing Sheets

TABLE 1

| Foil # | Foil Thickness (μm) | Measured Yield Strength (MPa) | Max. Areal Expansion (%) | Cracked (Y)/ Did not crack (N) |
|---|---|---|---|---|
| 1-1 | 10 | 206.0 | 3.92 | Y |
| 1-2 | 8 | 229.1 | 8.76 | Y |
| 1-3 | 8 | 136.3 | 10.98 | Y |
| 1-4 | 10 | 128.3 | 8.69 | Y |
| 1-5 | 10 | 347.0 | 0.56 | N |
| 1-6 | 8 | 307.3 | 2.57 | N |
| 1-7 | 10 | 291.4 | 1.97 | N |
| 1-8 | 10 | 326.7 | 0.86 | N |
| 1-9 | 10 | 434.5 | 0.79 | N |
| 1-10 | 8 | 295.1 | 3.76 | Y |
| 1-11 | 8 | 168.8 | 9.44 | Y |
| 1-12 | 10 | 548.4 | 0.53 | N |
| 1-13 | 10 | 476.4 | 0.53 | N |
| 1-14 | 10 | 278.3 | 2.3 | N |
| 1-15 | 8 | 304.9 | 5.19 | Y |

*FIG. 11B*

TABLE 2

| Foil # | Foil thickness (μm) | Elongation at Break (%) | Yield Strength (MPa) | Cracked (Y)/ Did not crack (N) |
|---|---|---|---|---|
| 2-1 | 10 | 3.2 | 548.4 | Y |
| 2-2 | 10 | 2.7 | 476.4 | Y |
| 2-3 | 10 | 12.3 | 194.4 | N |

*FIG. 12B*

Table 3

| Cell ID | Cu Foil | Cu Foil Thickness (µm) | Si-C fraction (wt. %) | Young's modulus (GPa) | Force at Yield (N) | Yield Strength (MPa) | UTS (MPa) | Strain @UTS (%) | Strain at break (%) | Max. Areal Expansion (%) | Pass or Fail | Failure Mode | Form Factor Examples |
|---|---|---|---|---|---|---|---|---|---|---|---|---|---|
| 1 | 3-1-8 | 8 | 50 | 63 | 30 | 293 | 400 | 3.50 | 3.70 | 2.50 | Pass | Micro Edge Cracks | |
| 2 | 3-2-8 | 8 | 50 | 76 | 44 | 428 | 566 | 2.00 | 2.27 | 2.00 | Fail | Macro Edge Cracks | |
| 3 | 3-2-10 | 10 | 50 | 69 | 52 | 408 | 580 | 2.21 | 3.00 | 0.60 | Pass | | Stacked pouch, Wound pouch |
| 4 | 3-2-10 | 10 | 100 | 69 | 52 | 408 | 580 | 2.21 | 3.00 | 3.00 | Fail | Fatigue Cracks | |
| 5 | 3-3-8 | 8 | 50 | 83 | 26 | 258 | 333 | 10.80 | 12.50 | 0.30 | Pass | | Stacked pouch |
| 6 | 3-3-10 | 10 | 100 | 74 | 31 | 245 | 318 | 9.00 | 11.00 | 9.00 | Fail | Macro Edge Cracks | |
| 7 | 3-4-8 | 8 | 50 | 74 | 45 | 449 | 641 | 2.38 | 3.00 | 1.16 | Fail | Fatigue Cracks | |
| 8 | 3-5-8 | 8 | 50 | 70 | 40 | 394 | 527 | 2.85 | 3.17 | 2.00 | Fail | Macro Edge Cracks, Fatigue Cracks | |
| 9 | 3-5-10 | 10 | 50 | 70 | 44 | 348 | 488 | 4.00 | 5.00 | 1.00 | Pass | | Stacked pouch, Wound pouch |
| 10 | 3-5-10 | 10 | 100 | 70 | 44 | 348 | 488 | 4.00 | 5.00 | 8.00 | Fail | Macro Edge Cracks | |
| 11 | 3-6-10 | 10 | 100 | 74 | 32 | 252 | 326 | 9.50 | 11.30 | 9.00 | Fail | Macro Edge Cracks | |
| 12 | 3-7-10 | 10 | 100 | 74 | 29 | 224 | 301 | 11.40 | 13.00 | 11.00 | Fail | Macro Edge Cracks | |
| 13 | 3-8-10 | 10 | 100 | 56 | 43 | 340 | 459 | 4.22 | 4.54 | 5.00 | Fail | Fatigue Cracks | |
| 14 | 3-8-10 | 10 | 50 | 56 | 43 | 340 | 459 | 4.22 | 4.54 | 1.00 | Pass | | Stacked pouch |
| 15 | 3-9-10 | 10 | 100 | 76 | 48 | 385 | 491 | 4.90 | 9.70 | 2.80 | Fail | Fatigue Cracks | |
| 16 | 3-9-10 | 10 | 50 | 76 | 48 | 385 | 491 | 4.90 | 9.70 | 0.40 | Pass | | |
| 17 | 3-10-6 | 6 | 50 | 76 | 25 | 330 | 387 | 5.30 | 8.60 | 4.00 | Fail | Macro Edge Cracks | |
| 18 | 3-10-8 | 8 | 50 | 87.9 | 35 | 339 | 408 | 6.20 | 8.00 | 1.80 | Pass | | Stacked pouch, Wound pouch |
| 19 | 3-10-10 | 10 | 50 | 79 | 42 | 330 | 422 | 7.00 | 10.00 | 0.60 | Pass | | Stacked pouch, Wound pouch |
| 20 | 3-10-10 | 10 | 100 | 79 | 42 | 330 | 422 | 7.00 | 10.00 | 6.00 | Pass | Micro Edge Cracks | |

*FIG. 18A*

Table 3 (CONT.)

| Cell ID | Cu Foil | Cu Foil Thickness (µm) | Si-C fraction (wt. %) | Young's modulus (GPa) | Force at Yield (N) | Yield Strength (MPa) | UTS (MPa) | Strain @UTS (%) | Strain at break (%) | Max. Areal Expansion (%) | Pass or Fail | Failure Mode | Form Factor Examples |
|---|---|---|---|---|---|---|---|---|---|---|---|---|---|
| 21 | 3-11-6 | 6 | 50 | 80 | 26 | 341 | 410 | 4.80 | 6.75 | 4.00 | Fail | Macro Edge Cracks | |
| 22 | 3-11-8 | 8 | 50 | 78 | 36 | 356 | 427 | 7.00 | 8.90 | 3.00 | Pass | | Stacked pouch, Wound pouch |
| 23 | 3-11-10 | 10 | 100 | 79 | 40 | 315 | 392 | 9.00 | 11.00 | 4.00 | Pass | | |
| 24 | 3-11-10 | 10 | 50 | 79 | 40 | 315 | 392 | 9.00 | 11.00 | 0.10 | Pass | | Stacked pouch, Wound pouch |
| 25 | 3-12-6 | 6 | 50 | 70 | 19 | 246 | 310 | 9.26 | 11.00 | 6.00 | Fail | Macro Edge Cracks | |
| 26 | 3-12-8 | 8 | 50 | 78 | 25 | 247 | 309 | 7.50 | 9.00 | 3.27 | Pass | | Wound poch |
| 27 | 3-13-8 | 8 | 50 | 61 | 17.3 | 170 | 255 | 9.60 | 12.00 | 5.00 | Pass | | Stacked pouch, Cylindrical |
| 28 | 3-14-10 | 10 | 50 | 61 | 31 | 243 | 316 | 18.00 | 20.00 | 5.00 | Pass | | Cylindrical |
| 29 | 3-14-8 | 8 | 50 | 73 | 25 | 246 | 319 | 13.00 | 14.00 | 4.70 | Pass | | Cylindrical |
| 30 | 3-15-8 | 8 | 50 | 76 | 42 | 417 | 598 | 3.10 | 4.12 | 2.20 | Fail | Fatigue Cracks | |
| 31 | 3-16-8 | 8 | 50 | 77 | 25 | 238 | 320 | 13.50 | 16.00 | 4.50 | Pass | | Wound pouch, Cylindrical |
| 32 | 3-16-10 | 10 | 100 | 78 | 33 | 260 | 337 | 11.00 | 14.80 | 11.40 | Fail | Macro Edge Cracks | |
| 33 | 3-16-10 | 10 | 50 | 78 | 33 | 260 | 337 | 11.00 | 14.80 | 5.00 | Pass | | Wound pouch, Cylindrical |
| 34 | 3-17-8 | 8 | 50 | 70 | 24.7 | 243 | 318 | 12.70 | 13.50 | 5.00 | Pass | | Wound pouch, Cylindrical |
| 35 | 3-17-10 | 10 | 50 | 65 | 29 | 230 | 309 | 13.18 | 14.00 | 3.50 | Pass | | Wound pouch, Cylindrical |
| 36 | 3-18-8 | 8 | 50 | 70 | 20.5 | 203 | 286 | 7.00 | 8.40 | 8.00 | Fail | Macro Edge Cracks | |
| 37 | 3-18-10 | 10 | 100 | 62 | 32 | 250 | 368 | 3.30 | 3.30 | 5.00 | Pass | Micro Edge Cracks | |
| 38 | 3-18-10 | 10 | 50 | 62 | 32 | 250 | 368 | 3.30 | 3.30 | 1.00 | Pass | | Stacked pouch, Wound pouch |
| 39 | 3-19-8 | 8 | 50 | 66 | 25 | 252 | 319 | 9.00 | 9.90 | 9.00 | Fail | Macro Edge Cracks | |
| 40 | 3-19-10 | 10 | 100 | 72 | 30 | 236 | 307 | 11.00 | 12.40 | 12.00 | Fail | Macro Edge Cracks | |

FIG. 18B

LI-ION BATTERY CELL USING IMPROVED ANODE CURRENT COLLECTOR

CROSS-REFERENCE TO RELATED APPLICATIONS

The present Application for Patent claims the benefit of U.S. Provisional Application No. 63/369,746, entitled "LI-ION BATTERY CELL USING IMPROVED ANODE CURRENT COLLECTOR," filed Jul. 28, 2022, assigned to the assignee hereof, and expressly incorporated herein by reference in its entirety.

BACKGROUND

Field

The present disclosure relates generally to energy storage devices, and more particularly to metal-ion battery technology and the like.

Background

For today's lithium-ion (Li-ion) battery technologies, Cu and Al foils are commonly used current collectors for the anode and cathode, respectively. It would be preferable to adopt current collectors that are as light as possible (e.g., as thin as possible, as porous as possible). There has been tremendous progress in advanced Li-ion battery technologies in which silicon-based materials are used in the anode. Because of the large volumetric changes in silicon-based anodes during cycling, there are stringent requirements on the properties of the copper current foils. On the one hand, the copper foils should be as thin as possible, but on the other hand, the copper foils must be able to withstand the repetitive swelling of the silicon-based anode materials during multiple charging and discharging cycles.

SUMMARY

Embodiments disclosed herein address the above stated needs by providing improved manufacturing processes, related equipment and materials, and electrode materials and batteries made using such improved manufacturing processes, equipment, and materials.

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a lithium-ion battery configured to undergo multiple charging and discharging cycles includes an anode component, comprising an anode current collector and a respective anode coating on each side of the anode current collector; a cathode component, comprising a cathode current collector and a respective cathode coating on each side of the cathode current collector; a separator interposed between the anode component and the cathode component; and an electrolyte infiltrated in the separator between the anode component and the cathode component, wherein: the anode coatings comprise composite particles comprising carbon and silicon, a mass fraction of the silicon in the composite particles of the anode coatings being in a range of about 5 wt. % to about 70 wt. % of the anode coatings; the anode component undergoes a maximum areal expansion ($A_{max}$) during the multiple charging and discharging cycles, expressed as a percentage of an area of the anode component before the multiple charging and discharging cycles; the anode current collector comprises a copper foil, the copper foil being characterized, before the respective anode coatings are formed thereon, by an ultimate tensile stress (UTS) and a strain at the UTS (εUTS), expressed in %; and the maximum areal expansion and the strain at the UTS are related as follows:

$$A_{max} \leq \varepsilon_{UTS}. \qquad \text{(Formula 1)}$$

In some aspects, the maximum areal expansion and the strain at the UTS are related as follows:

$$A_{max} \leq a\varepsilon_{UTS} - b; \qquad \text{(Formula 2)}$$

a is in a range of about 0.6 to about 1.0; and b is in a range of about 0.0 to about 0.7

In some aspects, the a is in a range of about 0.6 to about 0.7; and the b is in a range of about 0.6 to about 0.7.

In some aspects, the strain at the UTS is in a range of about 2% to about 18%.

In some aspects, the maximum areal expansion is in a range of about 0.1% to about 6.0%.

In some aspects, the UTS is about 250 MPa or greater.

In some aspects, the mass fraction of the silicon in the composite particles of the anode coatings is in a range of about 15 wt. % to about 40 wt. % of the anode coatings.

In some aspects, the mass fraction of the silicon in the composite particles of the anode coatings is in a range of about 10 wt. % to about 65 wt. % of the anode coatings.

In some aspects, a capacity of the silicon in the composite particles of the anode coatings is in a range of about 500 mAh/g to about 1500 mAh/g.

In some aspects, the copper foil is an electrodeposited copper foil.

In some aspects, the copper foil exhibits a yield strength of about 170 MPa or greater.

In some aspects, a thickness of the copper foil is in a range of about 7 μm to about 12 μm.

In some aspects, the thickness of the copper foil is in a range of about 8 μm to about 10 μm.

In some aspects, an average thickness of the anode coatings is in a range of about 25 μm to about 75 μm.

In some aspects, the anode coatings comprise graphite.

In some aspects, the anode component is a first anode component; the lithium-ion battery comprises a plurality of the first anode components; the cathode component is a first cathode component; the lithium-ion battery comprises a plurality of the first cathode components; and the plurality of the first anode components and the plurality of the first cathode components are stacked along a stacking direction perpendicular to a plane of the plurality of the first anode components and the plurality of the first cathode components, the plurality of the first anode components and the plurality of the first cathode components alternating along the stacking direction.

In some aspects, the lithium-ion battery is configured as a pouch cell, a prismatic cell, or a coin cell.

In some aspects, the anode component, the cathode component, and the separator are wound around a common core.

In some aspects, the lithium-ion battery is configured as a cylindrical cell, a coin cell, or a jelly roll cell.

In an aspect, a method of making a lithium-ion battery configured to undergo multiple charging and discharging cycles includes (A1) providing an anode component comprising an anode current collector and a respective anode coating on each side of the anode current collector; (A2) providing a cathode component comprising a cathode current collector and a respective cathode coating on each side the cathode current collector; and (A3) assembling the lithium-ion battery with a separator interposed between the anode component and the cathode component and an electrolyte infiltrated in the separator between the anode component and the cathode component, wherein: the anode coatings comprise composite particles comprising carbon and silicon, a mass fraction of the silicon in the composite particles of the anode coatings being in a range of about 5 wt. % to about 70 wt. % of the anode coatings; the anode component undergoes a maximum areal expansion ($A_{max}$) during the multiple charging and discharging cycles, expressed as a percentage of an area of the anode component before the multiple charging and discharging cycles; the anode current collector comprises a copper foil, the copper foil being characterized, before the respective anode coatings are formed thereon, by an ultimate tensile stress (UTS) and a strain at the UTS ($\varepsilon_{UTS}$), expressed in %; and the maximum areal expansion and the strain at the UTS are related as follows:

$$A_{max} \leq \varepsilon_{UTS}. \quad \text{(Formula 1)}$$

In some aspects, the maximum areal expansion and the strain at the UTS are related as follows:

$$A_{max} \leq a\varepsilon_{UTS} - b; \quad \text{(Formula 2)}$$

a is in a range of about 0.6 to about 1.0; and b is in a range of about 0.0 to about 0.7.

In some aspects, the a is in a range of about 0.6 to about 0.7; and the b is in a range of about 0.6 to about 0.7.

In some aspects, the strain at the UTS is in a range of about 2% to about 18%.

In some aspects, the maximum areal expansion is in a range of about 0.1% to about 6.0%.

In some aspects, the mass fraction of the silicon in the composite particles of the anode coatings is in a range of about 15 wt. % to about 40 wt. % of the anode coatings.

In some aspects, the mass fraction of the silicon in the composite particles of the anode coatings is in a range of about 10 wt. % to about 65 wt. % of the anode coatings.

In some aspects, a capacity of the silicon in the composite particles of the anode coatings is in a range of about 500 mAh/g to about 1500 mAh/g.

In some aspects, the copper foil is an electrodeposited copper foil.

In some aspects, a thickness of the copper foil is in a range of about 7 μm to about 12 μm.

In some aspects, the thickness of the copper foil is in a range of about 8 μm to about 10 μm.

In some aspects, an average thickness of the anode coating is in a range of about 25 μm to about 75 μm.

In some aspects, the anode coatings comprise graphite.

In one aspect, a lithium-ion battery configured to undergo multiple charging and discharging cycles includes at least one anode component, at least one cathode component, and a separator and an electrolyte interposed between adjacent ones of the anode components and the cathode components. Each of the anode components includes an anode current collector and a respective anode coating on each side of the anode current collector. Each of the cathode components includes a cathode current collector and a respective cathode coating on each side of the cathode current collector. In some embodiments, the anode components and the cathode components are stacked along a stacking direction perpendicular to a plane of the anode components and the cathode components (e.g., with a separator in between those), the anode components and the cathode components alternating along the stacking direction. Such a lithium-ion battery may be referred to as a stacked cell. In some implementations, a lithium-ion battery (e.g., a stacked cell) may be configured as a pouch cell or a prismatic cell. In other embodiments, the anode components and the cathode components (e.g., with a separator in between) are wound to form a lithium-ion battery cell (e.g., into a wound pouch cell or a wound prismatic cell or a wound cylindrical cell).

In another aspect, at least one of the anode components (e.g., in a stacked cell or in a wound cell) undergoes a maximum areal expansion in a range of about 0% to about 3.5% during one or multiple charging and discharging cycles. In some implementations, the maximum areal expansion in an anode (or at least one of the anode components) is in a range of about 0% to about 2%.

In yet another aspect, at least one of the anode coatings of the at least one of the anode components (e.g., of a stacked cell) may include silicon-carbon composite (or silicon-carbon nanocomposite) (e.g., active material) particles (or, more broadly, silicon oxide-silicon-carbon composite particles or silicon oxide-carbon composite particles or silicon oxide-silicon-silicon carbide-carbon composite particles or silicon-silicon carbide-carbon composite particles or silicon oxide-silicon nitride-carbon composite particles or silicon oxide-silicon-silicon nitride-carbon composite particles or silicon oxide-silicon-silicon carbide-silicon nitride-carbon composite particles or other silicon element-comprising and carbon element-comprising composite particles, including but not limited to nanocomposite silicon particles), which may comprise silicon nanoparticles and other (silicon element-comprising or not comprising silicon element) component(s). In some implementations, a weight fraction of silicon in the silicon-carbon composite (or nanocomposite) active material particles (or, more broadly, silicon element-comprising and carbon element-comprising composite particles, including but not limited to nanocomposite silicon particles) may be in a range of about 30 wt. % to about 90 wt. %. In some implementations, the weight fraction of silicon may be in a range of about 40 wt. % to about 80 wt. %. In some implementations, the weight fraction of silicon may be in a range of about 45 wt. % to about 75 wt. %. In some implementations, the specific reversible capacity of the silicon-carbon composite (or nanocomposite) active material particles (or, more broadly, silicon element-comprising and carbon element-comprising composite particles, including but not limited to nanocomposite silicon particles) may range from about 1200 mAh/g to about 2600 mAh/g (in some implementations, from about 1200 mAh/g to about 1500 mAh/g; in some implementations, from about 1500 mAh/g to about 1700 mAh/g; in some implementations, from about 1700 mAh/g to about 1900 mAh/g; in some implementations, from about 1900 mAh/g to about 2100 mAh/g; in some implementations, from about 2100 mAh/g to about 2300 mAh/g; in some implementations, from about 2300 mAh/g to about 2600 mAh/g). In some implementations, the weight-average size of the silicon-carbon composite (or silicon-carbon nanocomposite) (or, more broadly, silicon element-comprising and carbon element-comprising composite particles, including but not limited to nanocomposite silicon particles) may be in a range of about 1 micron (μm) to about 25 micron. In some implementations, the weight-average size may be in a range of about 3 micron to about 15 micron. In some implementations, the weight-average size may be in a range of about 5 micron to about 12 micron. In some implementations, a weight fraction of (elemental) silicon in the at least one anode coating (e.g., elemental Si in Si—C(nano)composite anode particles) may be in a range of about 5 wt. % to about 70 wt. %. In some implementations, the weight fraction of silicon may be in a range of about 5 wt. % to about 25 wt. %. In some implementations, the weight fraction of silicon may be in a range of about 15 wt. % to about 40 wt. %. In some implementations, the weight fraction of silicon may be in a range of about 10 wt. % to about 65 wt. %. In some implementations, the weight fraction of silicon may be in a range of about 25 wt. % to about 40 wt. %. In some implementations, the weight fraction of silicon may be in a range of about 40 wt. % to about 55 wt. %. In some implementations, the weight fraction of silicon may be in a range of about 55 wt. % to about 70 wt. %.

In yet another aspect, the anode current collector of the at least one of the anode components (e.g., of a stacked cell) includes a copper foil. The copper foil (or, more broadly, copper-dominant alloy foil with copper element content in excess of about 80 wt. %; in some designs—in excess of about 90 wt. %; in yet some designs—in excess of about 95 wt. %) is characterized, before the respective anode coatings are formed thereon, by a yield strength of at least 220 MPa. In some implementations, the yield strength is in a range of about 220 MPa to about 700 MPa (in some designs, from about 220 MPa to about 350 MPa; in other designs, from about 350 MPa to about 500 MPa; in yet other designs, from about 500 to about 700 MPa). In some implementations, the copper foil is an electrodeposited copper foil. In some implementations, the thickness of the copper foil is in a range of about 6 μm to about 12 μm. In some implementations, the thickness of the copper foil is in a range of about 6 μm to about 8 μm. In some implementations, the thickness of the copper foil is in a range of about 8 μm to about 10 μm. In some implementations, the thickness of the copper foil is in a range of about 10 μm to about 12 μm.

In yet another aspect, areal capacity loading of the at least one of the anode coatings (e.g., of a stacked cell) is in a range of about 2 mAh/cm$^2$ to about 20 mAh/cm$^2$ (in some designs, from about 2 mAh/cm$^2$ to about 4 mAh/cm$^2$; in other designs, from about 4 mAh/cm$^2$ to about 6 mAh/cm$^2$; in other designs, from about 6 mAh/cm$^2$ to about 8 mAh/cm$^2$; in other designs, from about 8 mAh/cm$^2$ to about 10 mAh/cm2; in other designs, from about 10 mAh/cm$^2$ to about 14 mAh/cm$^2$; in other designs, from about 14 mAh/cm$^2$ to about 20 mAh/cm$^2$).

In some implementations, the at least one of the anode coatings includes graphite (e.g., natural or synthetic graphite) or hard carbon or soft carbon. In some implementations, the at least one of the anode coatings includes a binder, which may, in some designs, advantageously comprise a styrene-butadiene rubber or another type of a styrene-comprising rubber. In some implementations, the at least one of the anode coatings may include a buffer layer. In some implementations, a thickness of the at least one of the anode coatings is in a range of 25 μm to 200 μm (in some designs, in a range of about 25 μm to about 40 μm; in other designs, in a range of about 40 μm to about 70 μm; in other designs, in a range of about 70 μm to about 100 μm; in other designs, in a range of about 100 μm to about 150 μm; in other designs, in a range of about 150 μm to about 200 μm).

In yet another aspect, a lithium-ion battery (e.g., stacked cell) includes (1) a wrapper wrapped around the anode components and the cathode components and (2) a container. In some implementations, the anode components, the cathode components, the separator, the electrolyte, and the wrapper are sealed in the container. In some implementations, the wrapper includes an adhesive tape adhered to at least some portion of the anode components and/or the cathode components.

In yet another aspect, the at least one anode component (e.g., of a stacked cell or a wound cell) includes a plurality of anode components. In some implementations, the respective anode current collectors are electronically coupled to each other. In some implementations, the separator is discontiguous (e.g., separator layers are not joined together).

In yet another aspect, the at least one cathode component (e.g., of a stacked cell or a wound cell) includes a plurality of cathode components. In some implementations, the respective cathode current collectors are electronically coupled to each other. In some implementations, the separator is discontiguous.

In yet another aspect, a lithium-ion battery configured to undergo multiple charging and discharging cycles includes an anode component, a cathode component, and at least one separator and an electrolyte interposed between the anode component and the cathode component. The anode component includes an anode current collector and a respective anode coating on each side of the anode current collector. The cathode component includes a cathode current collector and a respective cathode coating on each side of the cathode current collector. In some embodiments, the anode component, the cathode component, and the at least one separator are wound a common core. Such a lithium-ion battery may be referred to as a wound cell. In some implementations, a lithium-ion battery (e.g., a wound cell) may be configured as a cylindrical cell, a coin cell, a prismatic cell, a pouch cell or a jelly roll cell.

In yet another aspect, the anode current collector (e.g., of a wound cell) includes a copper foil. In some implementations, the copper foil is characterized, before the respective anode coatings are formed thereon, by (1) a yield strength in a range of about 100 MPa to about 400 MPa, and/or (2) an elongation at break parameter in a range of about 4% to about 20%. In some implementations, the yield strength is in a range of 100 MPa to 200 MPa. In other implementations, the yield strength is in a range of about 200 MPa to about 300 MPa. In other implementations, the yield strength is in a range of about 300 MPa to about 400 MPa. In some implementations, the elongation at break parameter is in a range of about 4% to about 7.5%. In some implementations, the elongation at break parameter is in a range of about 7.5% to about 13%. In some implementations, the copper foil is an electrodeposited copper foil. In some implementations, the elongation at break parameter is in a range of about 13% to about 20%. In some implementations, a thickness of the copper foil is in a range of about 6 μm to about 12 μm. In some implementations, the thickness of the copper foil is in a range of about 6 μm to about 8 μm. In some implementations, the thickness of the copper foil is in a range of 8 μm to 10 μm. In some implementations, the thickness of the copper foil is in a range of about 10 μm to about 12 μm.

In yet another aspect, at least one of the anode coatings of the at least one of the anode components (e.g., of a wound cell) may include silicon-carbon composite (or silicon-carbon nanocomposite) (e.g., active material) particles (or, more broadly, silicon oxide-silicon-carbon composite particles or silicon oxide-carbon composite particles or silicon oxide-silicon-silicon carbide-carbon composite particles or silicon-silicon carbide-carbon composite particles or silicon oxide-silicon nitride-carbon composite particles or silicon oxide-silicon-silicon nitride-carbon composite particles or silicon oxide-silicon-silicon carbide-silicon nitride-carbon composite particles or other silicon element-comprising and carbon element-comprising composite particles, including but not limited to nanocomposite silicon particles), which may comprise silicon nanoparticles and other (silicon element-comprising or not comprising silicon element) component(s). In some implementations, a weight fraction of silicon in the silicon-carbon composite (or nanocomposite) active material particles (or, more broadly, silicon element-comprising and carbon element-comprising composite particles, including but not limited to nanocomposite silicon particles) may be in a range of about 30 wt. % to about 90 wt. %. In some implementations, the weight fraction of silicon may be in a range of about 40 wt. % to about 80 wt. %. In some implementations, the weight fraction of silicon may be in a range of about 45 wt. % to about 75 wt. %. In some implementations, the weight-average size of the silicon-carbon composite (or silicon-carbon nanocomposite) (or, more broadly, silicon element-comprising and carbon element-comprising composite particles, including but not limited to nanocomposite silicon particles) may be in a range of about 1 micron (μm) to about 25 micron. In some implementations, the weight-average size may be in a range of about 3 micron to about 15 micron. In some implementations, the weight-average size may be in a range of about 5 micron to about 12 micron. In some implementations, a weight fraction of (elemental) silicon in the at least one anode coating (e.g., elemental Si in Si—C(nano)composite anode particles) may be in a range of about 5 wt. % to about 70 wt. %. In some implementations, the weight fraction of silicon may be in a range of about 5 wt. % to about 25 wt. %. In some implementations, the weight fraction of silicon may be in a range of about 15 wt. % to about 40 wt. %. In some implementations, the weight fraction of silicon may be in a range of about 10 wt. % to about 65 wt. %. In some implementations, the weight fraction of silicon may be in a range of about 25 wt. % to about 40 wt. %. In some implementations, the weight fraction of silicon may be in a range of about 40 wt. % to about 55 wt. %. In some implementations, the weight fraction of silicon may be in a range of about 55 wt. % to about 70 wt. %.

In yet another aspect, a capacity loading of the at least one of the anode coatings (e.g., of a wound cell) is in a range of about 2 $mAh/cm^2$ to about 20 $mAh/cm^2$ (in some designs, from about 2 $mAh/cm^2$ to about 4 $mAh/cm^2$; in other designs, from about 4 $mAh/cm^2$ to about 6 $mAh/cm^2$; in other designs, from about 6 $mAh/cm^2$ to about 8 $mAh/cm^2$; in other designs, from about 8 $mAh/cm^2$ to about 10 $mAh/cm^2$; in other designs, from about 10 $mAh/cm^2$ to about 14 $mAh/cm^2$; in other designs, from about 14 $mAh/cm^2$ to about 20 $mAh/cm^2$).

In some implementations, the at least one of the anode coatings includes graphite (e.g., natural or synthetic graphite) or hard carbon or soft carbon. In some implementations, the at least one of the anode coatings may include a binder comprising a styrene-butadiene rubber. In some implementations, the at least one of the anode coatings may include a buffer layer. In some implementations, a thickness of the at least one of the anode coatings is in a range of about 25 μm to about 200 μm (in some designs, in a range of about 25 μm to about 40 μm; in other designs, in a range of about 40 μm to about 70 μm; in other designs, in a range of about 70 μm to about 100 μm; in other designs, in a range of about 100 μm to about 150 μm; in other designs, in a range of about 150 μm to about 200 μm).

In yet another aspect, a lithium-ion battery (e.g., wound cell) may include a container. In some implementations, the anode component, the cathode component, the at least one separator, and the electrolyte are sealed in the container.

In yet another aspect, a method of making a lithium-ion battery configured to undergo multiple charging and discharging cycles is disclosed. The method includes (A1), (A2), (A3), and (A4). (A1) includes providing at least one anode component. Each of the anode components includes an anode current collector and a respective anode coating on each side of the anode current collector. (A2) includes providing at least one cathode component. Each of the cathode components includes a cathode current collector and a respective cathode coating on each side the cathode current collector. (A3) includes stacking the anode components and the cathode components along a stacking direction perpendicular to a plane of the anode components and the cathode components. The anode components and the cathode components alternate along the stacking direction. A separator is interposed between adjacent ones of the anode components and the cathode components. (A4) includes infiltrating an electrolyte between adjacent ones of the anode components and the cathode components. Such a method may be referred to as a method of making a stacked cell. In some implementations, a lithium-ion battery (e.g., according to a method of making a stacked cell) may be configured as a pouch cell or a prismatic cell or a coin cell. In some implementations, (A1) includes providing a roll of the anode current collector, forming the respective anode coatings on the roll of the anode current collector, and forming the anode component from the roll of the anode current collector and the anode coatings.

In yet another aspect, at least one of the anode components (e.g., according to a method of making a stacked cell) undergoes a maximum areal expansion in a range of about 0% to about 3.5% during one or the multiple charging and discharging cycles. In some implementations, the maximum areal expansion is in a range of about 0% to about 2%.

In yet another aspect, at least one of the anode coatings of the at least one of the anode components (e.g., according to a method of making a stacked cell) includes silicon-carbon composite particles (or, more broadly, silicon oxide-silicon-carbon composite particles or silicon oxide-carbon composite particles or silicon oxide-silicon-silicon carbide-carbon composite particles or other silicon element-comprising and carbon element-comprising composite particles), which may comprise silicon nanoparticles. In some implementations, a weight fraction of silicon (element) in the at least one anode coating may be in a range of about 5 wt. % to about 70 wt. %. In some implementations, the weight fraction of silicon may be in a range of about 5 wt. % to about 25 wt. %. In some implementations, the weight fraction of silicon may be in a range of about 15 wt. % to about 40 wt. %. In some implementations, the weight fraction of silicon may be in a range of about 10 wt. % to about 65 wt. %. In some implementations, the weight fraction of silicon may be in a range of about 25 wt. % to about 55 wt. %. In some implementations, the weight fraction of silicon may be in a range of about 55 wt. % to about 70 wt. %.

In yet another aspect, the anode current collector of the at least one of the anode components (e.g., according to a method of making a stacked cell) includes a copper foil (or, more broadly, copper-dominant alloy foil with copper element content in excess of about 80 wt. %; in some designs—in excess of about 90 wt. %; in yet some designs—in excess of about 95 wt. %). The copper foil is characterized, before the respective anode coatings are formed thereon, by a yield strength of at least about 220 MPa. In some implementations, the yield strength is in a range of about 220 MPa to about 700 MPa (in some designs, from about 220 MPa to about 400 MPa; in other designs, from about 400 MPa to about 600 MPa; in other designs, from about 600 MPa to about 700 MPa). In some implementations, the copper foil is an electrodeposited copper foil. In some implementations, a thickness of the copper foil is in a range of about 6 μm to about 12 μm. In some implementations, the thickness of the copper foil is in a range of about 6 μm to about 8 μm. In some implementations, the thickness of the copper foil is in a range of 8 μm to 10 μm. In some implementations, the thickness of the copper foil is in a range of about 10 μm to about 12 μm.

In yet another aspect, a capacity loading of the at least one of the anode coatings (e.g., according to a method of making a stacked cell) is in a range of about 2 $mAh/cm^2$ to about 20 $mAh/cm^2$ (in some designs, from about 2 $mAh/cm^2$ to about 4 $mAh/cm^2$; in other designs, from about 4 $mAh/cm^2$ to about 6 $mAh/cm^2$; in other designs, from about 6 $mAh/cm^2$ to about 8 $mAh/cm^2$; in other designs, from about 8 $mAh/cm^2$ to about 10 $mAh/cm^2$; in other designs, from about 10 $mAh/cm^2$ to about 14 $mAh/cm^2$; in other designs, from about 14 $mAh/cm^2$ to about 20 $mAh/cm^2$). In some implementations, the at least one of the anode coatings includes graphite (or soft or hard carbon or their various mixtures). In some implementations, the at least one of the anode coatings includes a binder, which may comprise a styrene-butadiene rubber. In some implementations, the at least one of the anode coatings includes a buffer layer. In some implementations, a thickness of the at least one of the anode coatings is in a range of about 25 μm to about 200 μm (in some designs, in a range of about 25 μm to about 40 μm; in other designs, in a range of about 40 μm to about 70 μm; in other designs, in a range of about 70 μm to about 100 μm; in other designs, in a range of about 100 μm to about 150 μm; in other designs, in a range of about 150 μm to about 200 μm).

In yet another aspect, at least one of the cathode coatings of the at least one of the cathode components (e.g., according to a method of making a stacked cell) comprises one or more of the following classes of active materials: lithium cobalt oxide (LCO), lithium nickel cobalt manganese oxide (NCM), lithium nickel cobalt aluminum oxide (NCA), lithium nickel cobalt manganese oxide (NCMA), other types of layered nickel-comprising lithium metal oxides (in some designs, with Ni content in the range from about 50 at. % to about 95 at. % relative to all transition metals in such oxides), lithium manganese oxide (LMO), lithium manganese nickel oxide (LMNO), disordered rocksalt lithium metal oxides (DRX), lithium iron phosphate (LFP), lithium iron manganese phosphate (LFMP).

In yet another aspect, a method of making a lithium-ion battery (e.g., a method of making a stacked cell) additionally includes (B1) and (B2). (B1) includes wrapping a wrapper around the anode components and the cathode components. (B2) includes sealing the anode components, the cathode components, the separator, the electrolyte, and the wrapper in a container. In some implementations, the anode components, the cathode components, the separator, the electrolyte, and the wrapper are sealed in the container. In some implementations, the wrapper includes an adhesive tape adhered to at least some portion of the anode components and/or the cathode components. In some embodiments, the cathode active material in the cathode component comprises one or more of the following classes of active materials: lithium cobalt oxide (LCO), lithium nickel cobalt manganese oxide (NCM), lithium nickel cobalt aluminum oxide (NCA), lithium nickel cobalt manganese oxide (NCMA), other types of layered nickel-comprising lithium metal oxides (in some designs, with Ni content in the range from about 50 at. % to about 95 at. % relative to all transition metals in such oxides), lithium manganese oxide (LMO), lithium manganese nickel oxide (LMNO), disordered rocksalt lithium metal oxides (DRX), lithium iron phosphate (LFP), lithium iron manganese phosphate (LFMP).

In yet another aspect, the at least one anode component (e.g., according to a method of making a stacked cell) includes a plurality of anode components. In some implementations, the method of making a lithium-ion battery (e.g., a method of making a stacked cell) additionally includes electronically coupling the respective anode current collectors to each other. In some implementations, the separator is discontiguous.

In yet another aspect, the at least one cathode component (e.g., according to a method of making a stacked cell) includes a plurality of cathode components. In some implementations, the method of making a lithium-ion battery (e.g., a method of making a stacked cell) additionally includes electronically coupling the respective cathode current collectors to each other. In some implementations, the separator is discontiguous.

In yet another aspect, a method of making a lithium-ion battery configured to undergo multiple charging and discharging cycles is disclosed. The method includes (C1), (C2), (C3), and (C4). (C1) includes providing an anode component including an anode current collector and a respective anode coating on each side of the anode current collector. (C2) includes providing a cathode component including a cathode current collector and a respective cathode coating on each side of the cathode current collector. (C3) includes winding the anode component, the cathode component, and at least one separator interposed between the anode component and the cathode component around a common core. (C4) includes infiltrating an electrolyte between the anode component and the cathode component. Such a method may be referred to as a method of making a wound cell. In some implementations, a lithium-ion battery (e.g., according to a method of making a wound cell) may be configured as a cylindrical cell, a coin cell, or a jelly roll cell. In some implementations, (C1) includes providing a roll of the anode current collector, forming the respective anode coatings on the roll of the anode current collector, and forming the anode component from the roll of the anode current collector and the anode coatings.

In yet another aspect, the anode current collector (e.g., according to a method of making a wound cell) includes a copper foil. In some implementations, the copper foil (or, more broadly, copper-dominant alloy foil with copper element content in excess of about 80 wt. %; in some designs—in excess of about 90 wt. %; in yet some designs—in excess of about 95 wt. %) is characterized, before the respective anode coatings are formed thereon, by (1) a yield strength in a range of about 100 MPa to about 400 MPa, and/or (2) an elongation at break parameter in a range of about 4% to about 20%. In some implementations, the yield strength is in a range of about 100 MPa to about 250 MPa. In some implementations, the elongation at break parameter is in a range of about 7.5% to about 13%. In some implementations, the copper foil is an electrodeposited copper foil. In some implementations, a thickness of the copper foil is in a range of about 6 μm to about 12 μm. In some implementations, a thickness of the copper foil is in a range of about 7 μm to about 12 μm. In some implementations, the thickness of the copper foil is in a range of about 6 μm to about 8 μm. In some implementations, the thickness of the copper foil is in a range of about 8 μm to about 10 μm. In some implementations, the thickness of the copper foil is in a range of about 10 μm to about 12 μm.

In yet another aspect, at least one of the anode coatings of the anode component (e.g., according to a method of making a wound cell) may include silicon-carbon composite (or silicon-carbon nanocomposite) (e.g., active material) particles (or, more broadly, silicon oxide-silicon-carbon composite particles or silicon oxide-carbon composite particles or silicon oxide-silicon-silicon carbide-carbon composite particles or silicon-silicon carbide-carbon composite particles or silicon oxide-silicon nitride-carbon composite particles or silicon oxide-silicon-silicon nitride-carbon composite particles or silicon oxide-silicon-silicon carbide-silicon nitride-carbon composite particles or other silicon element-comprising and carbon element-comprising composite particles, including but not limited to nanocomposite silicon particles), which may comprise silicon nanoparticles (or porous silicon) and other (silicon element-comprising or not comprising silicon element) component(s). In some implementations, a weight fraction of silicon in the silicon-carbon composite (or nanocomposite) active material particles (or, more broadly, silicon element-comprising and carbon element-comprising composite particles, including but not limited to nanocomposite silicon particles) may be in a range of about 30 wt. % to about 90 wt. %. In some implementations, the weight fraction of silicon may be in a range of about 40 wt. % to about 80 wt. %. In some implementations, the weight fraction of silicon may be in a range of about 45 wt. % to about 75 wt. %. In some implementations, the weight-average size of the silicon-carbon composite (or silicon-carbon nanocomposite) (or, more broadly, silicon element-comprising and carbon element-comprising composite particles, including but not limited to nanocomposite silicon particles) may be in a range of about 1 micron (μm) to about 25 micron. In some implementations, the weight-average size may be in a range of about 3 micron to about 15 micron. In some implementations, the weight-average size may be in a range of about 5 micron to about 12 micron. In some implementations, a weight fraction of (elemental) silicon in the at least one anode coating (e.g., elemental Si in Si—C (nano)composite anode particles) may be in a range of about 5 wt. % to about 70 wt. %. In some implementations, the weight fraction of silicon may be in a range of about 5 wt. % to about 25 wt. %. In some implementations, the weight fraction of silicon may be in a range of about 15 wt. % to about 40 wt. %. In some implementations, the weight fraction of silicon may be in a range of about 10 wt. % to about 65 wt. %. In some implementations, the weight fraction of silicon may be in a range of about 25 wt. % to about 40 wt. %. In some implementations, the weight fraction of silicon may be in a range of about 40 wt. % to about 55 wt. %. In some implementations, the weight fraction of silicon may be in a range of about 55 wt. % to about 70 wt. %.

In yet another aspect, areal capacity loading of the at least one of the anode coatings (e.g., according to a method of making a wound cell) is in a range of about 2 $mAh/cm^2$ to about 20 $mAh/cm^2$ (in some designs, from about 2 $mAh/cm^2$ to about 4 $mAh/cm^2$; in other designs, from about 4 $mAh/cm^2$ to about 6 $mAh/cm^2$; in other designs, from about 6 $mAh/cm^2$ to about 8 $mAh/cm^2$; in other designs, from about 8 $mAh/cm^2$ to about 10 $mAh/cm^2$; in other designs, from about 10 $mAh/cm^2$ to about 14 $mAh/cm^2$; in other designs, from about 14 $mAh/cm^2$ to about 20 $mAh/cm^2$). In some implementations, the at least one of the anode coatings includes graphite (e.g., natural or synthetic graphite) or hard carbon or soft carbon. In some implementations, the at least one of the anode coatings includes a binder, which may, in some designs, advantageously comprise a styrene-butadiene rubber. In some implementations, the at least one of the anode coatings includes a buffer layer. In some implementations, a thickness of the at least one of the anode coatings is in a range of 25 μm to 200 μm (in some designs, in a range of about 25 μm to about 40 μm; in other designs, in a range of about 40 μm to about 70 μm; in other designs, in a range of about 70 μm to about 100 μm; in other designs, in a range of about 100 μm to about 150 μm; in other designs, in a range of about 150 μm to about 200 μm).

In yet another aspect, at least one of the cathode coatings of the at least one of the cathode components (e.g., according to a method of making a wound cell) comprises one or more of the following classes of active materials: lithium cobalt oxide (LCO), lithium nickel cobalt manganese oxide (NCM), lithium nickel cobalt aluminum oxide (NCA), lithium nickel cobalt manganese oxide (NCMA), other types of layered nickel-comprising lithium metal oxides (in some designs, with Ni content in the range from about 50 at. % to about 95 at. % relative to all transition metals in such oxides), lithium manganese oxide (LMO), lithium manganese nickel oxide (LMNO), disordered rocksalt lithium metal oxides (DRX), lithium iron phosphate (LFP), lithium iron manganese phosphate (LFMP).

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of embodiments of the invention and are provided solely for illustration of the embodiments and not limitation thereof.

FIG. 11B shows a Table 1 showing the data plotted in the graphical plot of FIG. 11A.

FIG. 12B shows a Table 2 showing the data plotted in the graphical plot of FIG. 12A.

FIGS. 18A and 18B show a Table 3 containing the following data for each group of test pouch cells (each test cell ID): copper foil number, copper foil thickness, mass fraction of the silicon-carbon composite particles in the active material composition of the anode, Young's modulus of the copper foil, force at yield of the copper foil, yield strength of the copper foil, ultimate tensile stress (UTS) of the copper foil, strain at the UTS of the copper foil, strain at break of the copper foil, maximum areal expansion of the copper foil with the anode coating, failure mode of the copper foil (if any), and certain examples of possible form factors (e.g., stacked pouch, wound pouch, and/or cylindrical). Table 3 includes the data plotted in the graphical plot of FIG. 17.

DETAILED DESCRIPTION

Figure 1:
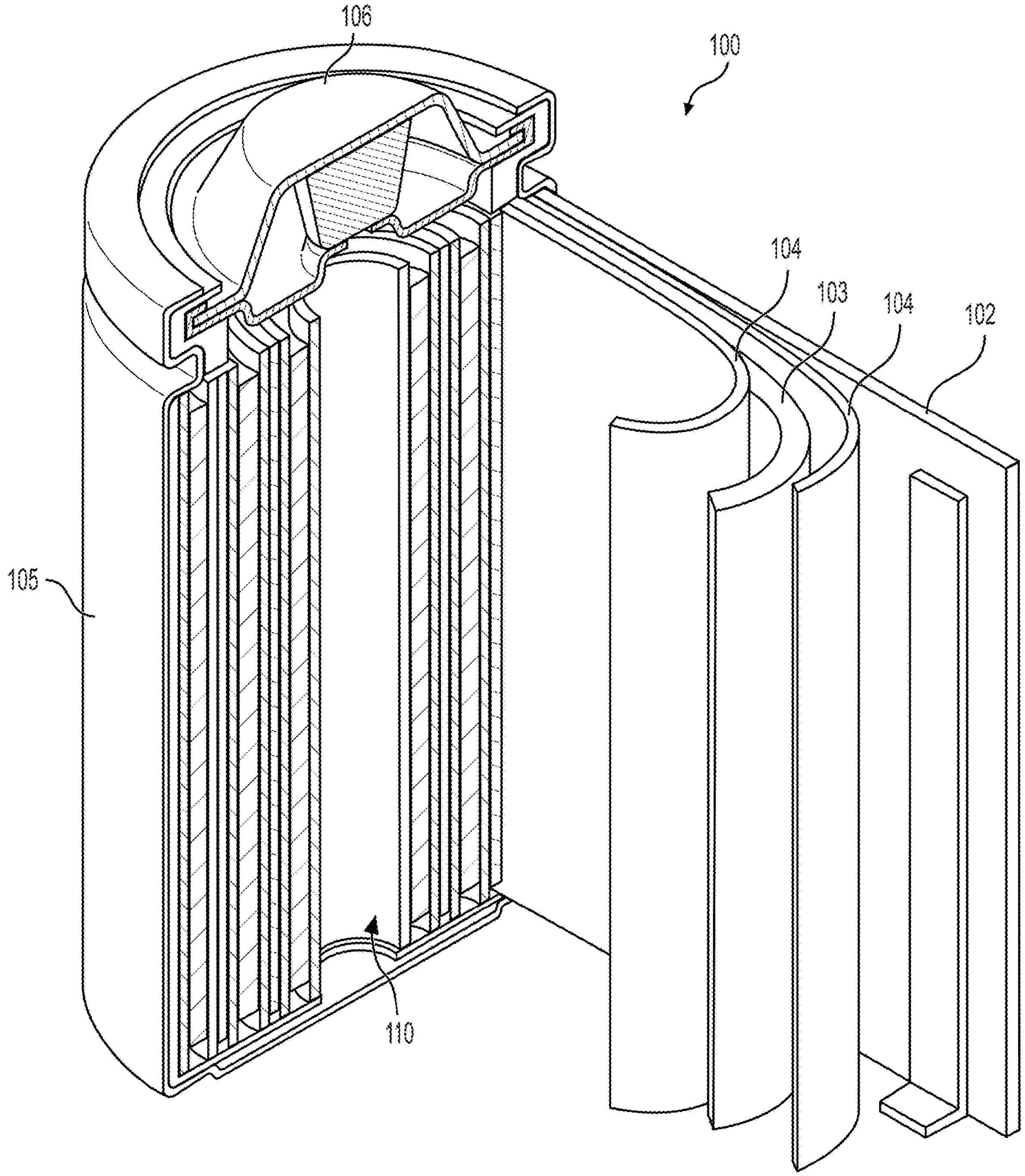
FIG. 1 illustrates a schematic cross-sectional view of a wound cylindrical cell. A wound cell is an example of a lithium-ion battery in which the materials, components, techniques, and methods as described herein can be implemented.

Aspects of the present invention are disclosed in the following description and related drawings directed to specific embodiments of the invention. The term "embodiments of the invention" does not require that all embodiments of the invention include the discussed feature, advantage, process, or mode of operation, and alternative embodiments may be devised without departing from the scope of the invention. Additionally, well-known elements of the invention may not be described in detail or may be omitted so as not to obscure other, more relevant details.

While the description below may describe certain examples in the context of particular electrode or electrode particle chemistry, composition, architecture and morphology, certain examples in the context of particular or electrode particle synthesis steps, certain examples in the context of particular electrolyte composition, certain examples in the context of particular electrolyte incorporation into an electrode or a battery cell, certain examples in the context of particular separator chemistry, composition, architecture, morphology, certain examples in the context of particular or electrode separator fabrication or integration steps, it will be appreciated that various aspects may be applicable to battery cells that advantageously incorporate various combinations of some of the described electrode chemistries, composition, architecture, electrolyte composition and integration, separator composition and integration, electrode or cell manufacturing techniques.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a temperature range from about −120° C. to about −60° C. encompasses (in ° C.) a set of temperature ranges from about −120° C. to about −119° C., from about −119° C. to about −118° C., . . . from about −61° C. to about −60° C., as if the intervening numbers (in ° C.) between −120° C. and −60° C. in incremental ranges were expressly disclosed. In yet another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range. In yet another example, a numerical range with upper and lower bounds defined at different levels of precision shall be interpreted in increments corresponding to the bound with the higher level of precision. For example, a numerical percentage range from 30.92% to 47.4% (i.e., levels of precision in units or increments of hundredths and tenths, respectively) encompasses (in %) a set of [30.92, 30.93, 30.94, . . . , 47.39, 47.40], as if 47.4% (tenths) was recited as 47.40% (hundredths) and as if the intervening numbers between 30.92 and 47.40 in units or increments of hundredths were expressly disclosed.

It will be appreciated that the level of precision of any particular measurement, threshold or other inexact parameter may vary based on various factors such as measurement instrumentation, environmental conditions, and so on. Below, reference to such measurements or thresholds may thereby be interpreted as a respective value assuming a pseudo-exact level of precision (e.g., a threshold of 80% comprises 80.0000 . . . %). Alternatively, reference to such measurements or thresholds may be described via a qualifier that captures pseudo-exact value(s) plus a range that extends above and/or below the pseudo-exact value(s). For example, the above-noted threshold of 80% may be interpreted as "about", "approximately", "around" or "~" 80%, which encompasses "exactly" 80% (e.g., 80.0000 . . . %) plus some range around 80%. In some designs, the range encompassed around a measurement or threshold via the "about", "approximately", "around" or "~" qualifier may encompass the level of precision for which the respective measurement or threshold is capable of being measured by the most accurate commercially available instrumentation as of the priority date of the subject application.

In the following description, various material properties are described so as to characterize materials (e.g., molecules, particles, powders, slurries, electrodes, separators, electrolytes, battery cells, etc.) in various states. Note that one of ordinary skill in the art is generally capable of selecting (and is herein assumed to select) the most appropriate measurement technique for any particular measurement. Moreover, in some cases, the most appropriate measurement technique may include a combination of techniques. While the following Table characterizes various measurement type options for particular material types and particular material properties, certain embodiments of the disclosure may be more specifically characterized in context with a specific measurement technique and/or specific commercially available instrumentation, if warranted. Note that while the Table below characterizes measurements with respect to active material particles, similar measurements may also be made with respect to other particle types such as precursor particles (e.g., carbon particles, etc.). Hence, unless otherwise indicated, the following Table provides examples of how such material properties may be readily measured by one of ordinary skill in the art using commercially available instrumentation:

Table of Techniques and Instrumentation for Material Property Measurements

| Material Type | Property Type | Measurement Instrumentation | Measurement Technique |
|---|---|---|---|
| Active Material | Coulombic Efficiency | Potentiostat | Charge (current) is passed to an electrode containing the active material of interest until a given voltage limit is reached. Then, the current is reversed until a second voltage limit is reached. The ratio of the charge passed determines the coulombic efficiency. |
| Active Material | Partial Vapor Pressure (e.g., Torr.) at a Temperature (e.g., K) | Manometer | The partial vapor pressure of an active material in a mixture (e.g., composite particle) at a particular temperature is given by the known vapor pressure of the active material multiplied by its mole fraction in the mixture. |
| Active Material Particle | Volume | Gas pycnometer | Gas pycnometer measures the skeletal volume of a material by gas displacement using the volume-pressure relationship of Boyle's Law. A sample of known mass is placed into the sample chamber and maintained at a constant temperature. An inert gas, typically helium, is used as the displacement medium. Note: A vol. % change may be calculated from two volume measurements of the active material particle. |
| Active Material Particle | Open Internal Pore Volume (e.g., cc/g or $cm^3/g$) | nitrogen sorption/desorption isotherm | nitrogen sorption/desorption isotherm technique |
| Active Material | Volume-Average Pore | PSA, scanning electron microscope | PSA using laser scattering, electron microscopy (SEM, |

-continued

Table of Techniques and Instrumentation for Material Property Measurements

| Material Type | Property Type | Measurement Instrumentation | Measurement Technique |
|---|---|---|---|
| Particle | Size (e.g., nm) | (SEM), transmission electron microscope (TEM), scanning transmission microscope (STEM), laser microscope, Synchrotron X-ray, X-ray microscope | TEM, STEM), laser microscopy (for larger particles), optical microscopy (for larger particles), neutron scattering, X-ray microscopy imaging |
| Active Material Particle | Closed Internal Pore Volume (e.g., cc/g or $cm^3/g$) | Gas pycnometer | Closed porosity may be measured by analyzing true density values measured by using an argon gas pycnometer and comparing to the theoretical density of the individual material components present in Si-comprising particles |
| Active Material Particle | Closed Internal Volume-Average Size (e.g., nm) | Gas pycnometer | With a pycnometer, the amount of a certain medium (liquid or Helium or other analytical gases) displaced by a solid can be determined. |
| Active Material Particle | Size (e.g., nm, μm, etc.) | TEM, STEM, SEM, X-Ray, PSA, etc. | Laser particle size distribution analysis (LPSA), laser image analysis, electron microscopy, optical microscopy or other suitable techniques transmission electron microscopy (TEM), scanning transmission electron microscopy (STEM), scanning electron microscopy (SEM)), X-ray microscopy, X-ray diffraction, neutron scattering and other suitable techniques |
| Active Material Particle | Composition (e.g., mass fraction or wt. %, mg, number of atoms, etc.) | Balance | Note #1: A wt. % change may be calculated by comparing the mass fraction of a material in the particle relative to the total particle mass.<br>Note #2: The capacity attributable to particular active material(s) in the particle may be derived from the composition, based on the known theoretical capacit(ies) of each active material.<br>Note #3: The composition of the particle may be characterized in terms of weight (e.g., mg). The composition of may alternatively be characterized by a number of atoms of a particular element (e.g., Si, C, etc.). In case of atoms, the number of atoms may be estimated from the weight of that atom in the particle (e.g., based on gas chromatography) |
| Active Material Particle, Battery Half-Cell | Specific Capacity | Potentiostat | An electrode containing an active anode or cathode material of interest is charged or discharged (by passing electrical current to the electrode) within certain potential limits using an electrochemical cell with suitable reference electrode, typically lithium metal. The total charge passed divided by the active material mass gives this quantity. The active mass is computed by multiplying the total mass of the electrode by |

-continued

Table of Techniques and Instrumentation for Material Property Measurements

| Material Type | Property Type | Measurement Instrumentation | Measurement Technique |
|---|---|---|---|
| | | | the active material mass fraction. Both reversible and irreversible capacity during charge or discharge may be calculated in this way. |
| Active Material Particle | BET SSA (e.g., $m^2/g$) | BET instrument | A sample is placed into a sealed chamber, where nitrogen is introduced. The change in pressure of the nitrogen is used to calculate the surface area of the sample. |
| Active Material Particle | Aspect Ratio | SEM, TEM | The dimensions and shape of the particles are measured in SEM or TEM. |
| Active Material Particle | True Density of Particle (e.g., g/cc or $g/cm^3$) | Argon Gas Pycnometer | True density values may be measured by using an argon gas pycnometer and comparing to the theoretical density of the individual material components present in the particle. |
| Active Material Particle Population | Particle Size Distribution (e.g., nm or μm) | Dynamic light scattering particle size analyzer, scanning electron microscope | laser particle size distribution analysis (LPSA) on well-dispersed particle suspensions in one example or by image analysis of electron microscopy images, or by other suitable techniques. While there are diverse processes of measuring PSDs, laser particle size distribution analysis (LPSA) is quite efficient for some applications. Note that other types of particle size distribution (e.g., by SEM image analysis) could also be utilized (and may even lead to more precise measurements, in some experiments). Using LPSA, particle size parameters of a population's PSD may be measured, such as: a tenth-percentile volume-weighted particle size parameter (e.g., abbreviated as $D_{10}$), a fiftieth-percentile volume-weighted particle size parameter (e.g., abbreviated as $D_{50}$), a ninetieth-percentile volume-weighted particle size parameter (e.g., abbreviated as $D_{90}$), and a ninety-ninth-percentile volume-weighted particle size parameter (e.g., abbreviated as $D_{99}$). |
| Active Material Particle Population | Width (e.g., nm) | PSA | Parameters relating to characteristic widths of the PSD may be derived from these particle size parameters, such as $D_{50}$–$D_{10}$ (sometimes referred to herein as a left width), $D_{90}$–$D_{50}$ (sometimes referred to herein as a right width), and $D_{90}$–$D_{10}$ (sometimes referred to herein as a full width). |
| Active Material Particle Population | Cumulative Volume Fraction | Computed via LPSA data | A cumulative volume fraction, defined as a cumulative volume of the composite particles with particle sizes of a threshold particle size or less, divided by a total volume of all of the composite particles, may be estimated by LPSA. |
| Active Material Particle | Composition (e.g., wt. %) | Balance | The mass of active materials added to the electrode divided by the total mass of the |

-continued

Table of Techniques and Instrumentation for Material Property Measurements

| Material Type | Property Type | Measurement Instrumentation | Measurement Technique |
|---|---|---|---|
| Population | | | electrode. |
| Active Material Particle Population | BET SSA (e.g., m2/g) | BET Isotherm | obtained from the data of nitrogen sorption-desorption at cryogenic temperatures, such as about 77K |
| Electrolyte | Salt Concentration (e.g., M or mol. %) | balance, volumetric pipette | Total volume of the solution is computed either via the sum of the volume of the constituents (measured by volumetric pipette), or by the mass of the constituents divided by the density. The molar mass of the salt is then used to calculate the total number of moles of salt in the solution. The moles of salt is then divided by the total volume to obtain the solvent concentration in M (mol/L). |
| Electrolyte | Solvent Concentration (e.g., M or mol. %) | balance, volumetric pipette | Total volume of the solution is computed either via the sum of the volume of the constituents (measured by volumetric pipette), or by the mass of the constituents divided by the density. The molar volume of each solvent is then used to calculate the total number of moles of solvent in the solution. The moles of solvent is then divided by the total volume to obtain the solvent concentration in M (mol/L). |
| Electrode | Composition (e.g., mass fraction or wt. %) | Balance | The mass fraction of a material (e.g., active material, active material particle, binder, etc.) in the electrode is calculated based on a measured or estimated mass of the material and a measured or estimated mass of the electrode, excluding the electrode current collector. Note: The mass of individual components (e.g., composite active material particles, graphite particles, binder, function additive(s), etc.) of the battery electrode composition may be measured before being mixed into a slurry to estimate their mass in a casted electrode. The mass of materials deposited onto the casted electrode may be measured by comparing the weight of the casted electrode before/after the material deposition. |
| Electrode | Areal Binder Loading (e.g., $mg/m^2$) | balance | A mass fraction of the binder in the battery electrode, divided by a product of (1) a mass fraction of the active material (e.g., Si—C nanocomposite, etc.) particles in the battery electrode, and (2) a Brunauer-Emmett-Teller (BET) specific surface area of the population |
| Electrode | Capacity Attributable to Active Material (active material capacity fraction) | Calculated | Measure mass (wt.) of active material in electrode, and calculate electrode capacity based on known theoretical capacity of the active material. For example, the average wt. % of active material in each active material particle may be measured, and used to calculate |

-continued

Table of Techniques and Instrumentation for Material Property Measurements

| Material Type | Property Type | Measurement Instrumentation | Measurement Technique |
|---|---|---|---|
| | | | the mass of the active material based on the mass of the active material particles before being mixed in slurry. This process may be repeated if the electrode includes two or more active materials to calculate the relative capacity attribution for each active material in the electrode. |
| Electrode | Capacity Attributable to Active Material Particles (active material particle capacity fraction) | Potentiostat and balance | Determine average specific capacity (g/mAh) of active material particles. For example, the average specific capacity may be estimated from the average wt. % of active material(s) in each particle and its associated known theoretical capacit(ies). Then, measure mass (wt.) of active material particles in electrode before being mixed in slurry, which may be used to calculate the capacity attributable to that active material. This process may be repeated if the electrode includes two or more active material particle types to calculate the relative capacity attribution for each active material particle type in the electrode. |
| Electrode | Mass of Active Material in Electrode | balance | The average wt. % of active material in each active material particle may be measured, and used to calculate the mass of the active material based on the mass of the active material particles before being mixed in slurry. |
| Electrode | Mass of Active Material Particle in Electrode | balance | Measure the active material particle before the active material particle type is mixed in slurry. |
| Electrode | Areal Capacity Loading (e.g., $mAh/cm^2$) | Potentiostat and balance | Areal capacity loading is weight of the coated active material per unit area ($g/cm^2$) multiplied by the gravimetric capacity of the active material (not the electrode, but the active material itself with zero binder and zero electrolyte; mAh/g). |
| Electrode | Coulombic Efficiency | Potentiostat | The change in charge inserted (or extracted) to an electrode divided by the charge extracted (or inserted) from the electrode during a complete electrochemical cycle within given voltage limits. Because the direction of charge flow is opposite for cathodes and anodes, the definition is dependent on the electrode. Coulombic Efficiency is measured for both materials by constructing a so-called half-cell, which is an electrochemical cell consisting of a cathode or anode material of interest as the working electrode and a lithium metal foil which functions as both the counter and reference electrode. Then, charge is either |

-continued

Table of Techniques and Instrumentation for Material Property Measurements

| Material Type | Property Type | Measurement Instrumentation | Measurement Technique |
|---|---|---|---|
| | | | inserted or removed from the material of interest until the cell voltage reaches an appropriate limit. Then, the process is reversed until a second voltage limit is reached, and the charge passed in both steps is used to calculate the Coulombic Efficiency, as described above. |
| Battery Cell | Rate Performance | Potentiostat | This is the time it takes to charge or discharge a battery between a given state of charge. It is measured by charging or discharging a battery and measuring the time until a specified amount of charge is passed, or until the battery operating voltage reaches a specified value. |
| Battery Cell | Cell Discharge Voltage (e.g., V) | Potentiostat | A battery consisting of a relevant anode and cathode is charged and discharged within certain voltage limits and the charge-weighted cell voltage during discharge is computed. |
| Battery Cell | Operating Temperature | Potentiostat and thermocouples | Average temperature of battery cell as measured at the positive/negative terminal/cell shaft/etc. while charging/discharging, or at a certain voltage level, or while a load is applied, etc. |
| Battery Half-Cell | Anode Discharge (de-lithiation) Potential (e.g., V) | Potentiostat | An electrode containing an active anode material (or mixture of active materials) of interest is charged and discharged (by passing electrical current to the electrode) within certain potential limits using an electrochemical cell with suitable reference electrode, typically lithium metal. The charge-averaged cell potential upon discharge (corresponding to de-lithiation of the anode) is computed. |
| Battery Half-Cell | Cathode Discharge (lithiation) Potential (e.g., V) | Potentiostat | An electrode containing an active cathode material (or mixture of active materials) of interest is charged and discharged (by passing electrical current to the electrode) within certain potential limits using an electrochemical cell with suitable reference electrode, typically lithium metal. The charge-averaged cell potential upon discharge (corresponding to lithiation of the cathode) is computed. |
| Battery Cell | Volumetric Energy Density (VED) | Potentiostat | the VED is calculated by first calculating the energy per unit area of the battery, and then dividing the energy per unit area by the sum of the illustrative anode, cathode, separator, and current collector thicknesses |

-continued

| Table of Techniques and Instrumentation for Material Property Measurements | | | |
|---|---|---|---|
| Material Type | Property Type | Measurement Instrumentation | Measurement Technique |
| Battery Cell | Internal Resistance (impedance) | Potentiostat | The internal resistance (also known as impedance in many contexts) is measured by applying small pulses of current to the battery cell and recording the instantaneous change in cell voltage. |

In some embodiments described below, certain parameters (e.g., temperature, state-of-charge (SOC), etc.) may be defined in terms of relative terminology such as low, reduced, high, increased, elevated, and so on. With regard to temperature, unless otherwise stated, this relative terminology may be characterized relative to battery cell storage temperature or battery cell operating temperature, depending on the context of the relevant example. With regard to SOC, unless otherwise stated, a high SOC may be defined as higher than about 70% SOC (e.g., in some designs, about 70-80% SOC; in some designs, about 80-90% SOC; in some designs, about 90-100% SOC).

Further, while the description below may also describe certain examples of polymer particles or polymer-derived particles or porous particles or composite particles having spherical or spheroidal three dimensional (3D) shape, it will be appreciated that various aspects may be applicable to particles having other shapes, including, for example, irregular shapes, elongated two-dimensional (2D), such as (nano)composite platelets or porous carbon sheets, etc.) shapes or one dimensional (1D, such as, for example, (nano)composite nanofibers and fibers or porous carbon nanofibers and fibers, etc.) shapes.

While the description below may describe certain embodiments in the context of improved battery electrodes or improved battery cells, it will be appreciated that improved battery modules or packs may be enabled with different aspects of the disclosed technologies. Such modules or packs, for example, may be smaller, lighter, safer, simpler, less expensive, provide more energy, provide higher power, provide longer cycle life, provide longer calendar life, provide better operation at low temperatures, provide better operation at high temperatures and other important features. It will similarly be appreciated that improved electronic devices, improved electric scooters, electric bicycles, electric cars, electric trucks, electric buses, electric ships, electric planes and, more broadly, improved electric and hybrid electric ground, sea, and aerial (flying) vehicles (including heavy vehicles, autonomous vehicles, unmanned vehicles, planes, space vehicles, satellites, submarines, etc.), improved robots, improved stationary home or stationary utility energy storage units and improved other end products may be enabled with different aspects of the disclosed technologies. Such devices may be smaller, lighter, offer longer range, faster charging, faster acceleration, better operation at different temperatures, lower cost, longer calendar life, slower degradation with repeated charging and discharging, better safety, etc.

While the description below may also describe certain examples of the material formulations in a Li-free state (for example, as in silicon-comprising nanocomposite anodes or metal fluoride cathodes or sulfur cathodes, etc.), it will be appreciated that various aspects may be applicable to Li-comprising electrodes and active materials (for example, partially or fully lithiated Si-comprising anodes or partially or fully lithiated Si-comprising anode particles, partially or fully lithiated metal fluoride comprising cathodes (such as a mixture of LiF and metals such as Cu, Fe, Ni, Bi, Zr, Ti, Mg, Nb, and various other metals and metal alloys and mixtures of such and other metals, etc.) or partially or fully lithiated metal halide comprising cathode particles, partially or fully lithiated chalcogenides (such as $Li_2S$, $Li_2S$/metal mixtures, $Li_2Se$, $Li_2Se$/metal mixtures, $Li_2S$—$Li_2Se$ mixtures, various other compositions comprising lithiated chalcogenides etc.), partially or fully lithiated metal oxides (such as $Li_2O$, $Li_2O$/metal mixtures, etc.), partially or fully lithiated intercalation-type cathode materials, partially or fully lithiated carbons, among others). In some designs, various material properties (e.g., at particle level, at inter-particle level, at electrode level, etc.) may change based on whether active material particle(s) are in a Li-free state, a partially lithiated state, or a fully lithiated state. Such Li-dependent material properties may include particle pore volume, electrode pore volume, and so on. Below, unless stated or implied otherwise, reference to such Li-dependent anode material properties (e.g., at particle level, at inter-particle level, at electrode level, etc.) may be assumed to be provided as if the active material particles are in the Li-free state. Further, some examples below are characterized at the electrode level (e.g., as opposed to particle level or interparticle level or cell level, etc.). Below, unless stated or implied otherwise, reference to such electrode level properties (e.g., electrode porosity or areal capacity loading or gravimetric/volumetric capacity, etc.) may be assumed to refer to the electrode components (e.g., active material particles, binder, conductive additives, etc.), excluding the current collector. FIG. 1 illustrates an example Li-ion battery in a cylindrical wound cell configuration. In the example shown, the wound cell 100 includes a negative electrode component (anode electrode component or anode component) 102, a positive electrode component (cathode electrode component or cathode component) 103, a separator 104 interposed between the anode component 102 and the cathode component 103, an electrolyte (shown implicitly) infiltrating the separator 104, a battery case 105, and a sealing member 106 sealing the battery case 105. The electrolyte ionically couples the anode (negative electrode) and the cathode (positive electrode). The electrolyte is interposed between the anode component and the cathode component. The electrolyte is infiltrated between the anode component and the cathode component. In the wound cell 100, the anode component 102, the cathode component 103, and the separator 104 are wound around a common core 110. For example, a lithium-ion battery of a wound cell configuration may be configured as a cylindrical cell, a coin cell, or a jelly roll cell. Illustrative examples of cylindrical cells include, but are not limited to 18650 cells, 21700 cells, 4680 cells (or, broadly, 46xy cells), among others.

Figure 2:
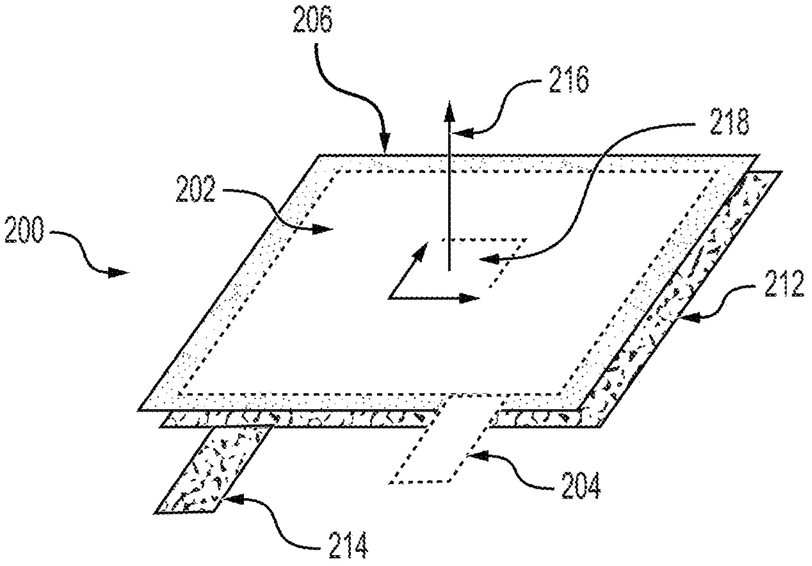
FIG. 2 illustrates a schematic perspective view of a stacked cell including one anode component and one cathode component. A stacked cell is an example of a lithium-ion battery in which the materials, components, techniques, and methods as described herein can be implemented.

FIG. 2 illustrates a Li-ion battery in a stacked cell configuration. In the example shown, the stacked cell 200 includes a cathode component 202 (shown with no fill), an anode component 212 (shown with speckled pattern), and a separator 206 (shown with dotted-fill) interposed between the anode component 212 and the cathode component 202. In addition, there is a cathode tab 204 connected extending from the cathode component 202 and an anode tab 214 extending from the anode component 212. The cathode component 202 may include a cathode current collector and a respective cathode coating formed on both sides of the cathode current collector. The cathode tab 204 may be a bare cathode current collector, with no cathode coating thereon. The anode component 212 may include an anode current collector and a respective anode coating formed on both sides of the anode current collector. The anode tab 214 may be a bare anode current collector, with no anode coating thereon. Electrical connections to outside of the battery (stacked cell 200) are made via the cathode tab 204 and the anode tab 214. In addition, there is an electrolyte infiltrated in the separator 206. The electrolyte is interposed between the anode component and the cathode component. The electrolyte is infiltrated between the anode component and the cathode component. The cathode component 202 and the anode component 212 are stacked along a stacking direction 216. In the example shown, the stacking direction is perpendicular to a plane 218 that is approximately parallel to the cathode component 202 and the anode component 212. Herein, the plane 218 may be characterized as a plane of the anode component 212 and the cathode component 202.

Figure 3:
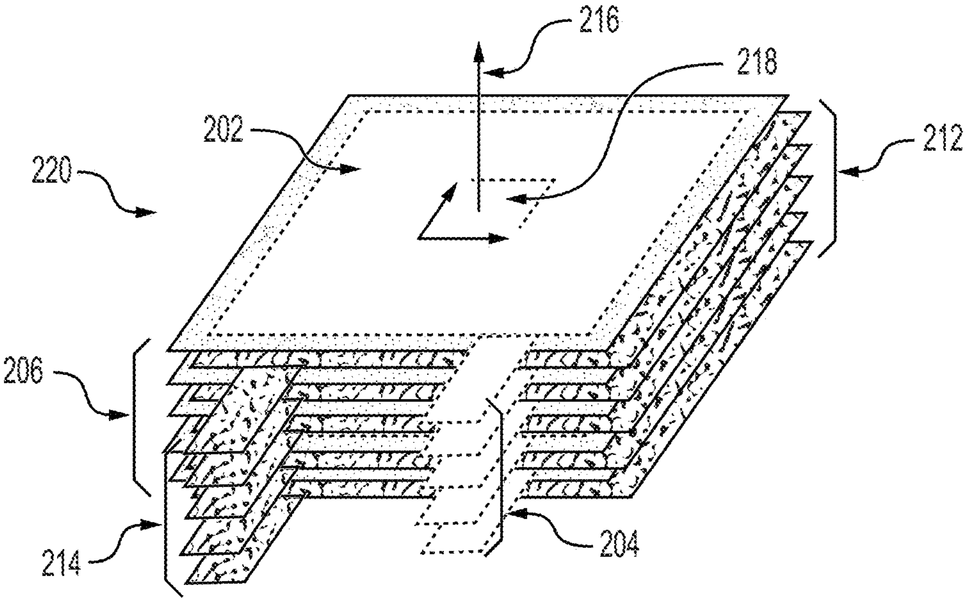
FIG. 3 illustrates a schematic perspective view of a stacked cell including five anode components and five cathode components.

FIG. 3 illustrates another Li-ion battery in a stacked cell configuration. In the example shown, the stacked cell 220 includes a plurality of cathode components 202 (quantity 5 in this example) and a plurality of anode components 212 (quantity 5 in this example). There is a separator 206 interposed between adjacent one of the anode components 212 and the cathode components 202. In some designs, the separator 206 (or a portion of the separator, a separator layer) may be integrated onto (e.g., coated onto before cell assembly) the anode components 212 or the cathode components 202 or both. In addition, there is an electrolyte infiltrated in each instance of the separator 206. The electrolyte is interposed between adjacent one of the anode components and the cathode components. The electrolyte is infiltrated between adjacent one of the anode components and the cathode components. The cathode components 202 and the anode components 212 are stacked along a stacking direction 216. In implementations in which there are multiple cathode components 202, the cathode tabs 204 may be electronically coupled to each other (e.g., connected by welding). In implementations in which there are multiple anode components 212, the anode tabs 214 may be electronically coupled to each other (e.g., connected by welding). Electrical connections to outside of the battery (stacked cell 220) are made via the cathode tabs 204 and the anode tabs 214.

Figure 4:
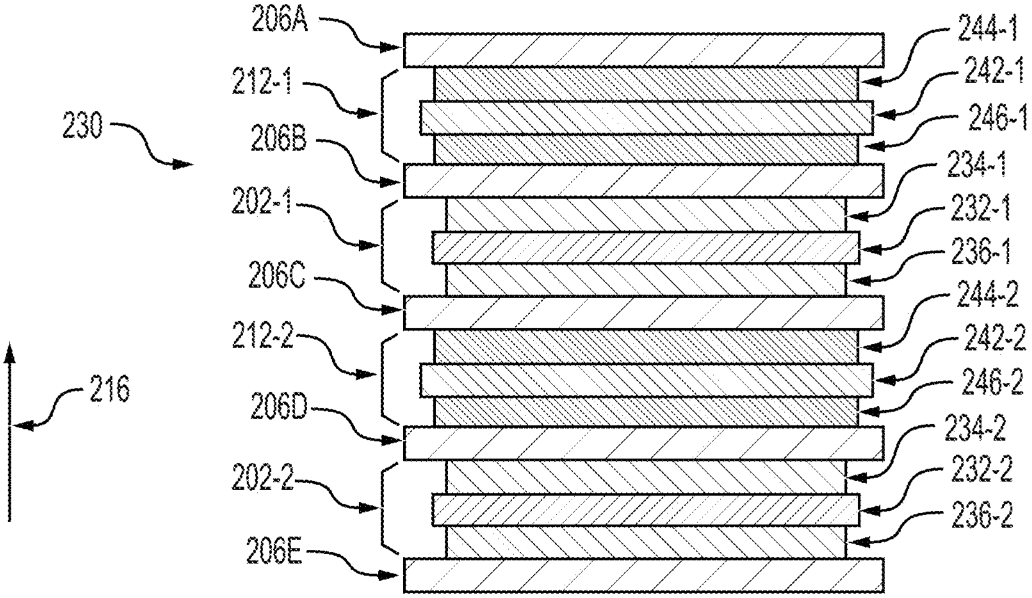
FIG. 4 illustrates a schematic cross-sectional view of a stacked cell in which the separator is discontiguous.

FIG. 4 shows a schematic cross-sectional view of yet another Li-ion battery in a stacked cell configuration. In the example shown, stacked cell 230 includes two cathode components (202-1, 202-2) and two anode components (212-1, 212-2) stacked along the stacking direction 216. There is a respective separator (206B, 206C, 206D) interposed between adjacent ones of the anode components and the cathode components. In some designs, a separator (or a portion of the separator, a separator layer) may be integrated onto (e.g., coated before cell assembly) the anode components or the cathode components or both. These components are stacked so that the anode components and the cathode components alternate along the stacking direction (e.g., so that the electrolyte infiltrated in separator 206B ionically couples an adjacent anode (anode coating) 246-1 and an adjacent cathode (cathode coating) 234-1). Each cathode component (202-1, 202-2) includes a cathode current collector (232-1, 232-2) and a respective cathode coating (234-1, 236-1, 234-2, 236-2) on each side of the cathode current collector. In some implementations, a foil of aluminum or an aluminum alloy may be used as a cathode current collector. Each anode component (212-1, 212-2) includes an anode current collector (242-1, 242-2) and a respective anode coating (244-1, 246-1, 244-2, 246-2) on each side of the anode current collector. In some implementations, a foil of copper or a copper alloy may be used as anode current collector. Herein, a foil of copper or a copper alloy is referenced as a "copper foil". In the example shown, each current collector (anode or cathode) has an electrode coating (anode coating or cathode coating) on both sides of the current collector. Other implementations are possible in which an electrode coating is formed on only one side of a current collector.

Figure 5:
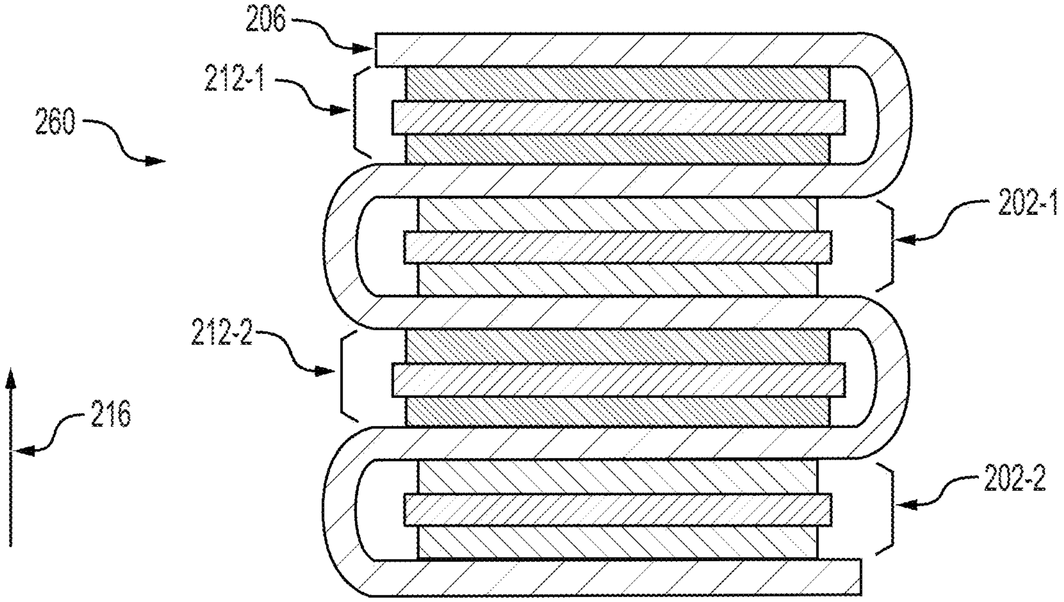
FIG. 5 illustrates a schematic cross-sectional view of a stacked cell in which the separator is contiguous.

Stacked cell 230 includes a respective separator (206B, 206C, 206D) interposed between adjacent ones of the anode components and the cathode components. In the example shown, there is also a "top outer" separator 206A, adjacent to (in contact with) anode component 212-1 and a "bottom outer" separator 206E, adjacent to (in contact with) cathode component 202-2. FIG. 5 shows yet another stacked cell 260 which differs from stacked cell 230 in that the separator 206 is contiguous and is folded into a z-like pattern. In stacked cell 230 (FIG. 4), the separator is discontiguous, being separated into respective segments (206A, 206B, 206C, 206D, 206E) in contact with a respective anode component and/or cathode component.

Figure 6:
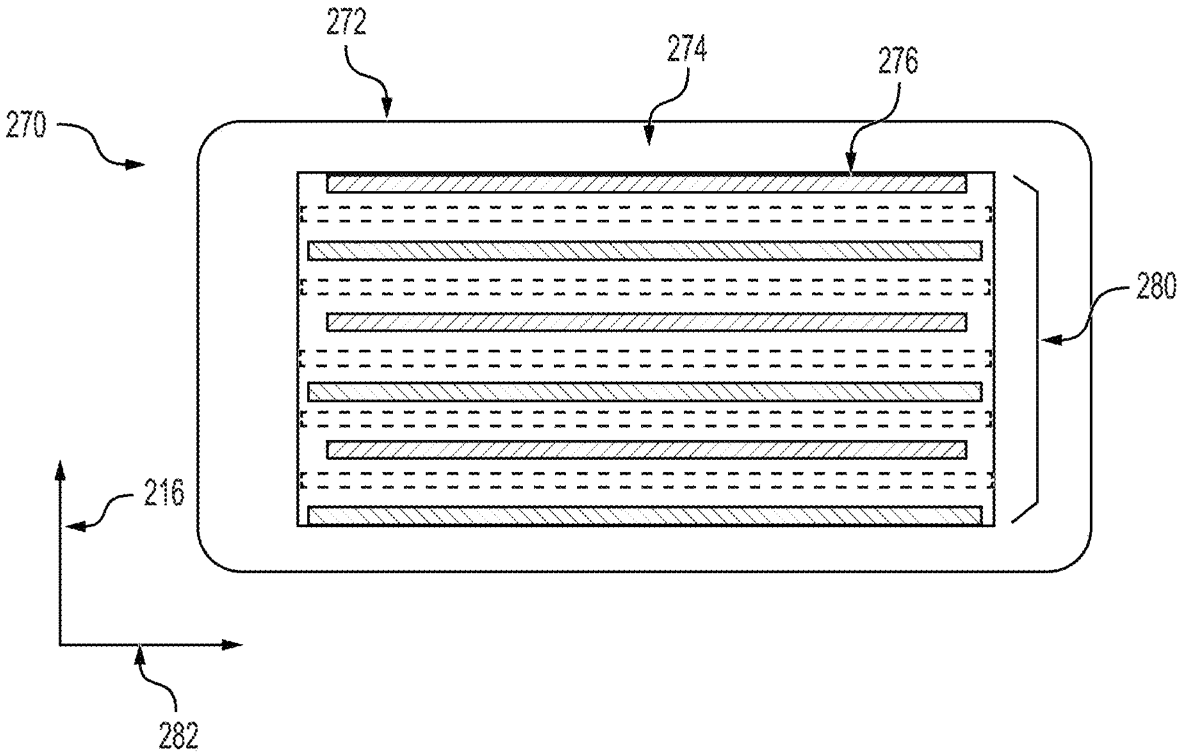
FIG. 6 illustrates a schematic cross-sectional view of a stacked cell enclosed in a container and including a wrapper wrapped around the anode components and the cathode components.

For brevity of illustration, containers (e.g., battery cases, sealing members) have been omitted from the views of stacked cells of FIGS. 2, 3, 4, and 5. FIG. 6 illustrates a stacked cell 270 in schematic cross-sectional view. Stacked cell 270 includes a container 272 and an electrolyte 274 (e.g., a liquid electrolyte) contained in the container 272. For example, a lithium-ion battery of a stacked cell configuration may be configured as a pouch cell (e.g., container 270 is a pouch) or a prismatic cell (e.g., container 270 is a rigid casing). Stacked cell 270 includes stack components 280 (e.g., anode component(s), cathode component(s), separator) which are stacked along a stacking direction 216. In some implementations, stacked cell 270 includes a wrapper 276 wrapped around the stack components 280. The stack components 280 (e.g., anode components, the cathode components, the separator), the electrolyte 274, and the wrapper 276 are sealed in the container 272. In some designs, the wrapper 276 may include an adhesive tape adhered to at least some portion of the stack components 280 (e.g., the outer portions in direct contact with the wrapper). In some designs, the wrapper 276 can prevent one or more of the stack components 280 from becoming displaced. Depending on factors such as how tightly the wrapper 276 is wrapped around the stack components 280, the elasticity of the wrapper 276, and the strength of adhesion of any adhesive material on the wrapper 276, expansion of the stack components 280 (e.g., anode components, cathode components) along the stacking direction 216 and/or along a lateral direction 282 (e.g., a direction along a plane of the anode components and cathode components) may be limited.

Figure 7:
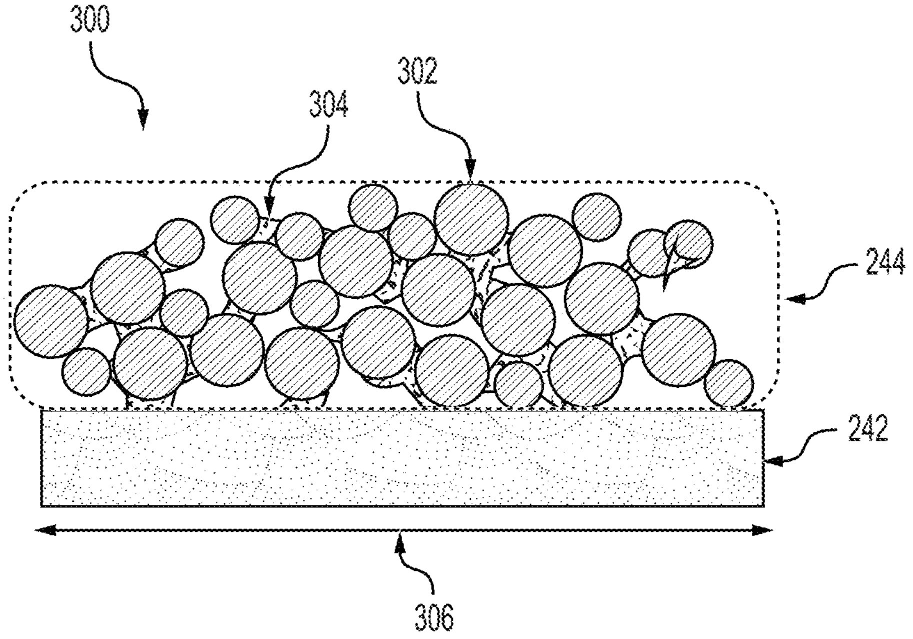
FIG. 7 illustrates a schematic side view of an anode component of a cell, before any cycling.
Figure 8:
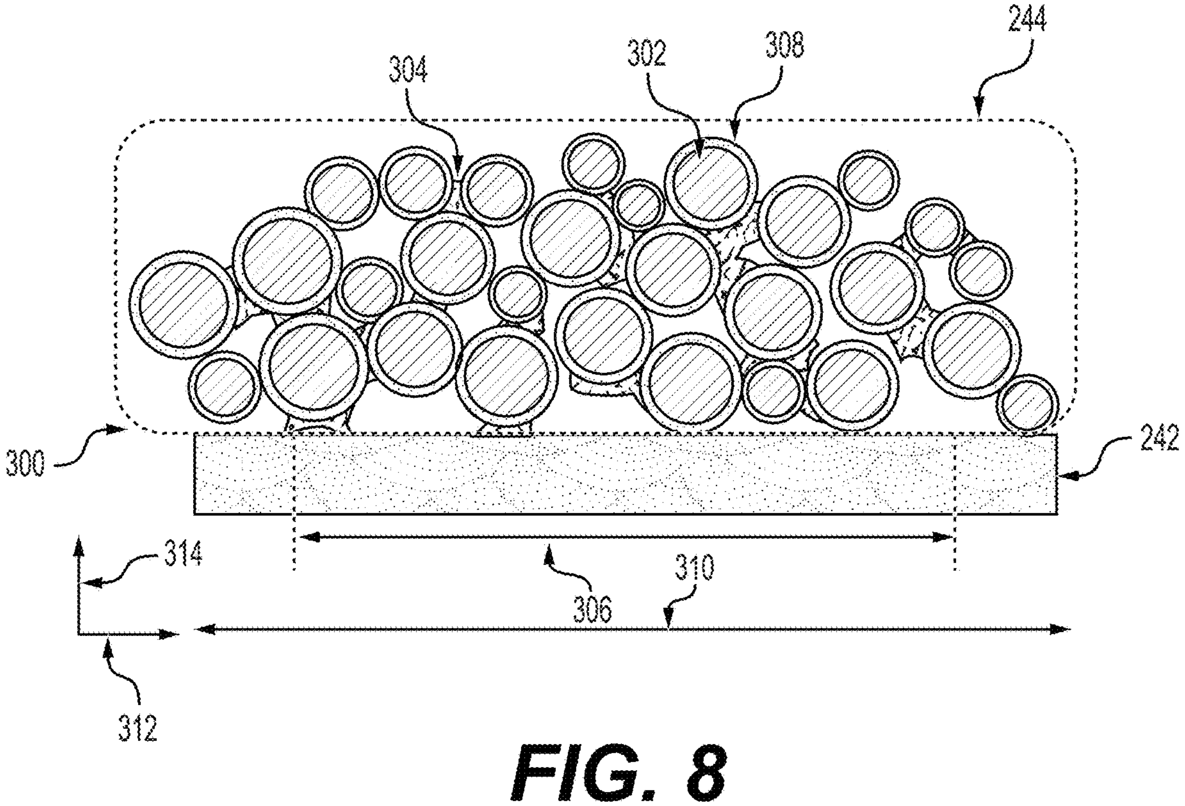
FIG. 8 illustrates a schematic side view of the anode component of FIG. 7, after initial charging (lithiation).
Figure 9:
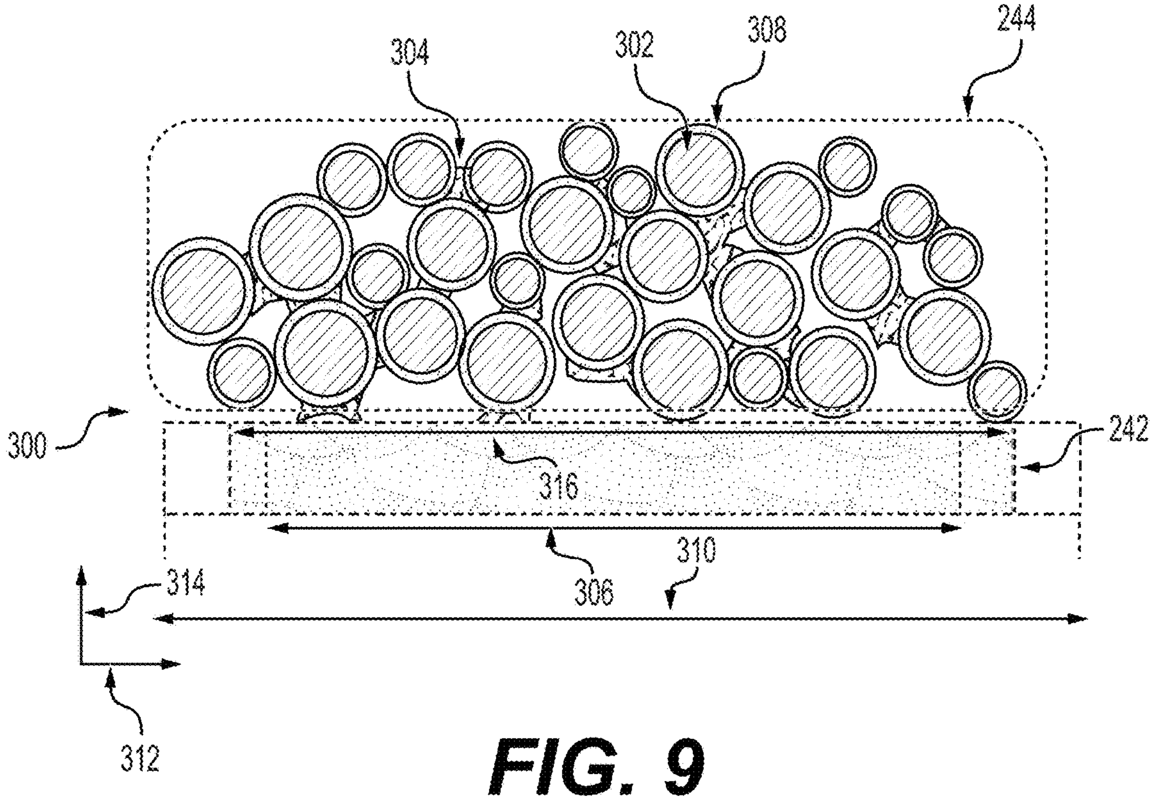
FIG. 9 illustrates a schematic side view of the anode component of FIG. 7, after initial charging and discharging (lithiation and delithiation).

FIGS. 7, 8, and 9 illustrate expansion and contraction of an anode component of a cell resulting from carrying out charging and discharging cycles. In the example shown, anode component 300 includes an anode current collector 242 and an anode coating 244 formed on one side of the anode current collector 242. In other implementations, an anode component may include an anode coating formed on both sides of the anode current collector. The anode coating 244 includes active material particles 302 and a binder 304 that adhere the particles 302 to each other and to the anode current collector 242. For example, the active material particles 302 may include silicon-carbon composite (or nanocomposite) particles, including those where silicon nanoparticles embedded in the pores of the composite particles. While the active material particles 302 are illustrated as being substantially spherical, the particles may be of other shapes. In actual implementation, the anode component 300 could be part of an anode component in a stacked cell, a wound cell, or a cell that is neither a stacked cell nor a wound cell. FIG. 7 is a schematic illustration of a state of the anode component 300 before any charging or discharging. The anode current collector has an initial length $L_0$ (indicated as 306).

Subsequently, the anode component 300 undergoes initial charging, which includes lithiation of the active material particles 302. FIG. 8 is a schematic illustration of a state of the anode component 300 after the initial charging. As the particles 302 undergo lithiation, the particles expand in size. This expansion occurs in all directions, including a "horizontal" direction 312 parallel to a plane of the current collector 242 and a "vertical" direction 314 perpendicular to the current collector plane. Since the active material particles 302 are adhered to the current collector 242, the current collector 242 expands because of forces applied to it by the expanding active material particles 302. Accordingly, the current collector 242 has an expanded length $L_1$ (indicated as 310). The current collector 242 would undergo an areal expansion. In some cases, the current collector may crack as it expands. Cracking of the current collector may lead to degradation of the anode component and eventual failure of the cell. Cracking of the current collector should be avoided or reduced. Concurrently, as the anode coating 244 is exposed to the electrolyte, a solid electrolyte interphase (SEI) layer 308 is formed on the active material particles from the decomposition products of the electrolyte and/or other materials that are present (e.g., lithium compounds).

Subsequently, the anode component 300 undergoes initial discharging, which includes delithiation of the active material particles 302. FIG. 9 is a schematic illustration of a state of the anode component 300 after the initial discharging. As the particles 302 undergo delithiation, the particles contract in size. This contraction occurs in all directions, including the directions 312 and 314. The current collector 242 contracts because of forces applied to it by the contracting active material particles 302. Accordingly, the current collector 242 has a length $L_2$ (indicated as 316), which is less than the expanded length $L_1$ (310) but may not be as small as the initial length $L_0$ (306). The current collector 242 undergoes areal contraction. The initial charging and discharging cycle represented by FIGS. 8 and 9 is sometimes referred to as a formation cycle because it involves the formation of the SEI layer. As the cell subsequently undergoes repeated charging and discharging cycles, the anode component (e.g., current collector 242 and anode coating 244) undergoes repeated areal expansion and areal contraction, which may result in cracking of the current collector in some cases.

Figure 10:
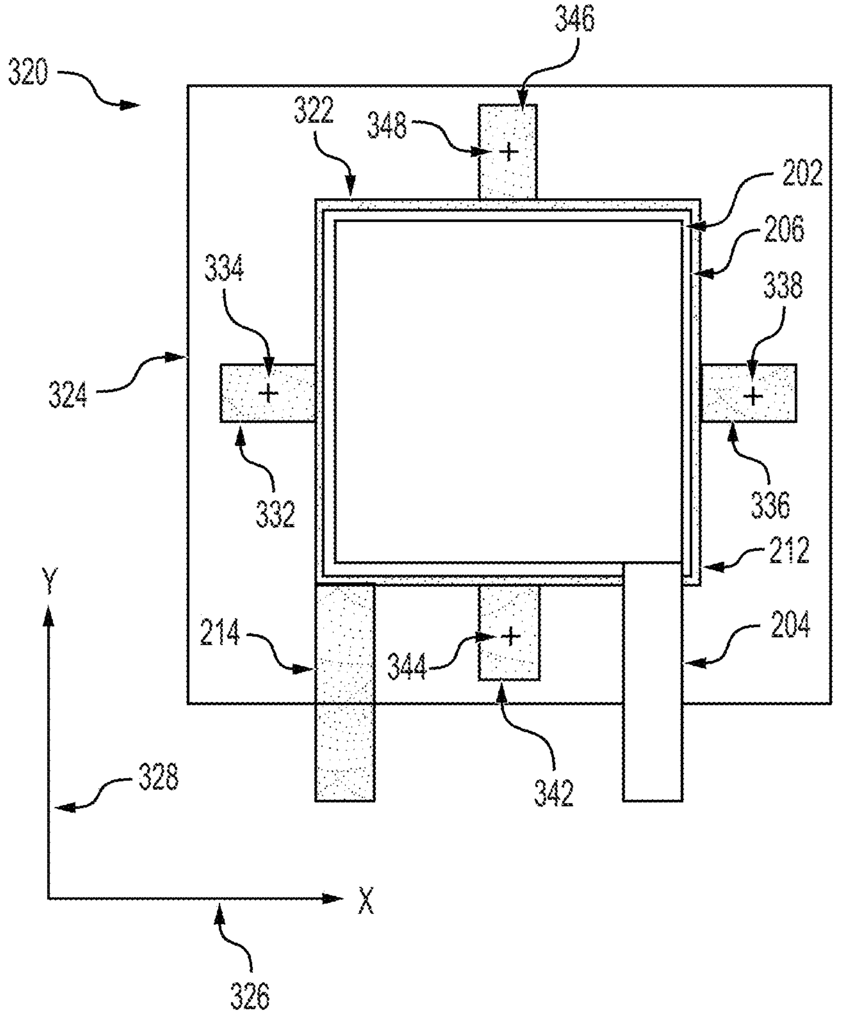
FIG. 10 illustrates a schematic plan view of an experimental technique of measuring areal expansion (and contraction) of a component (e.g., anode component) of a battery cell during cycling of the battery cell.

FIG. 10 is a schematic plan view of an experimental technique for measuring the areal expansion (and contraction) of an anode component during the cycling of a battery cell 320. This experimental technique may be modified to measure the areal expansion and contraction of a cathode component during the cycling. Battery cell 320 is of a stacked cell configuration and includes a component stack 322 which includes a cathode component 202, a separator 206, and an anode component 212. The component stack 322 and an electrolyte are housed and sealed in a transparent container 324. The transparent container 324 makes the anode component visible to an external imaging system. Cathode tab 204 extends from the cathode component 202 to outside of the transparent container 324. Anode tab 214 extends from the anode component 212 to outside of the transparent container 324. Electrical connections can be made via cathode tab 204 and anode tab 214. Current collector extensions 332, 336, 342, and 346 extend from the left, right, bottom, and top edges of the anode component 212, respectively. Each of the current collector extensions 332, 336, 342, and 346 is marked with a respective fiducial marker 334, 338, 344, and 348, which can be captured by the imaging system. In particular, the imaging system is used to determine changes to the dimension of the anode component along the X-axis 326 (X-distance), which is represented by changes in distance between fiducial markers 334 and 338, and changes to the dimension of the anode component along the Y-axis 328 (Y-distance), which is represented by changes in distance between fiducial markers 344 and 348. An areal change (expansion or contraction) is determined from comparing the product of the X-distance and Y-distance before and after the areal change.

Multiple copper foils were characterized and incorporated into lithium-ion battery test cells for evaluation. Table 1 (FIG. 11B) lists examples of 15 different tested copper foils (denoted as 1-1, 1-2, . . . , 1-15), the foil thickness (μm), the yield strength (MPa), the maximum areal expansion (%), and a determination of whether the foil cracked or did not crack in a stacked cell. Both electrodeposited foils and rolled foils are represented in Table 1.

Figure 11A:
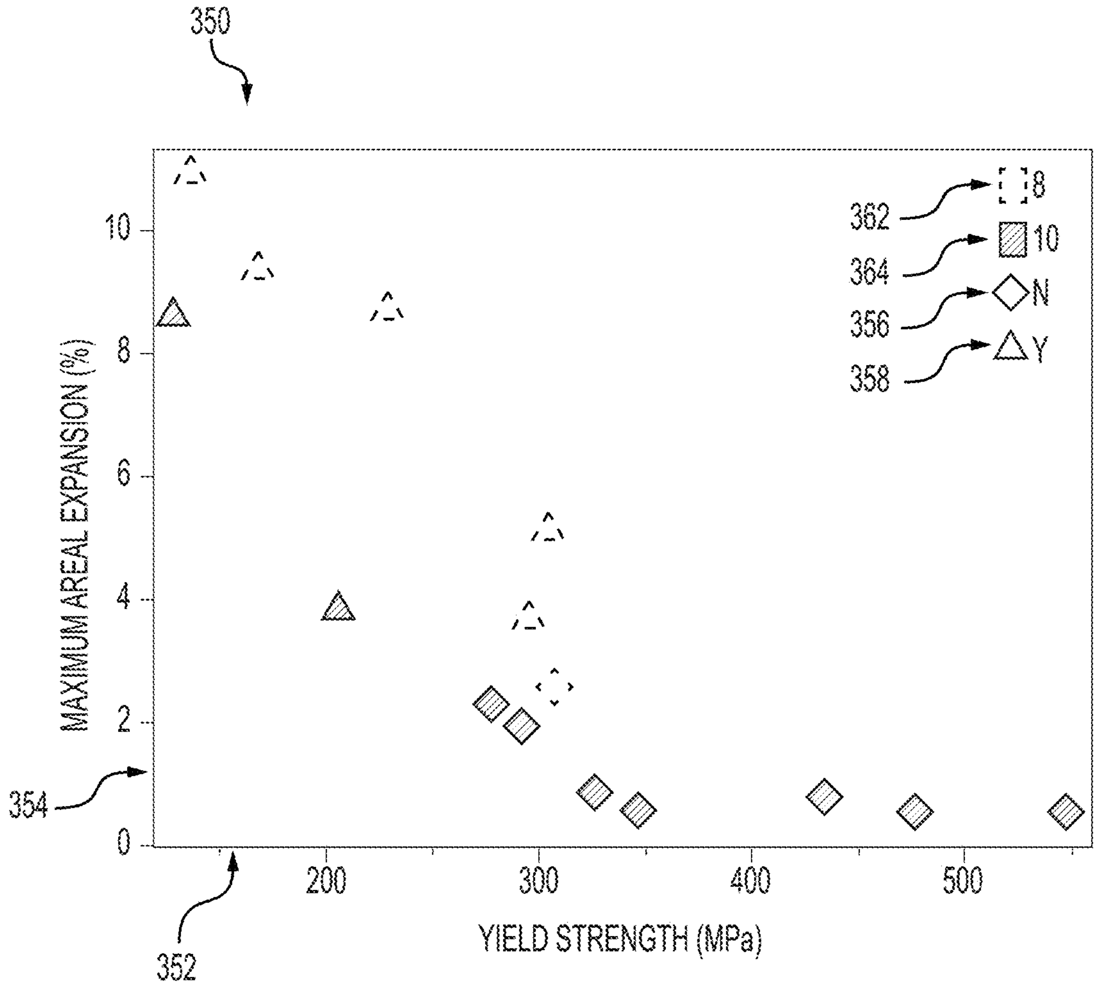
FIG. 11A is a graphical plot showing, for each copper foil, (1) whether the copper foil exhibited cracking (Y indicates cracking was observed, N indicates no cracking was observed) when integrated into an anode component of a stacked battery cell and the battery cell underwent cycling, (2) a thickness of the foil (8 indicates 8 μm thick foil, 10 indicates 10 μm thick foil), and (3) the maximum areal expansion of the respective anode component during cycling as a function of the yield strength of the respective copper foil.

FIG. 11A shows a graphical plot 350 which plots the maximum areal expansion (%) as a function of the yield strength (MPa) for the copper foils listed in Table 1 (FIG. 11B). The yield strength is plotted along the x-axis 352 and the areal expansion is plotted along the y-axis 354. Each data point indicates whether the copper foil is about 8 μm in thickness (dotted-line data point, sample shown as 362) or about 10 μm in thickness (hatched fill data point, sample shown as 364). Each data point further shows whether the copper foil cracked (Y for yes it did crack) (triangles, sample shown as 358) or did not crack (N for no it did not crack) (diamonds, sample shown as 356).

Tensile testing was conducted on bare copper foils before formation of anode coatings thereon. A stress-strain curve was obtained for each copper foil. Measurements of the stress-strain curve were carried out using the INSTRON Universal Tensile Machine 5900 series. Cu foils were cut in dogbone shape with 1.2 cm width and 5 cm gauge length. The specimens were gripped securely to ensure axial alignment and minimize bending and then pulled in tension until failure in accordance with the IPC-TM-650 tensile test method. For each copper foil, the yield strength was defined as the stress at 0.2% plastic strain offset on the respective stress-strain curve.

For the areal expansion, test cells of the stacked cell configuration (containing one anode component and one cathode component, with a separator between them, infiltrated with liquid electrolyte) were formed and were observed in the experimental setup described with reference to FIG. 10. Areal expansion (and contraction) was observed for each lithiation (charging) stage as well as for delithiation (discharging) stage; the areal expansion was calculated relative to the initial anode component area before initial charging. Generally, the areal expansion varied from cycle to cycle. In some cases, the maximum areal expansion was observed during the initial charging stage (formation cycle). In some other cases, the maximum areal expansion was observed during a subsequent charging stage after the formation cycle. The maximum areal expansion that was observed during the first 20 cycles was determined to be the maximum areal expansion as reported in Table 1 (FIG. 11B) and FIG. 11A. In addition, test cells were disassembled after cycling for 20 or more cycles, and the anode current collector (copper foil) was observed for cracking after removing the anode coating therefrom.

Test cells of the stacked cell configuration were fabricated for areal expansion and cracking observations. The anode component included a respective anode coating on both sides of the anode current collector (copper foil). The anode coating included Si-based nanocomposite active material (with specific reversible capacity of 1550 mAh/g (for the experimental results reported in FIGS. 11A, 11B, 12A, and 12B) and 1657 mAh/g (for the experimental results reported in FIGS. 17, 18A, and 18B), normalized by the weight of the respective Si-based nanocomposite active materials), casted on a Cu current collector foil from an aqueous suspension including a polyacrylic acid (PAA)-based binder and a carbon black conductive additive. In the examples reported in FIGS. 11A, 11B, 12A, and 12B, the Si-based nanocomposite active material (e.g., composite particles comprising silicon and carbon) was the sole active material in the respective anode coatings (excluding binders and additives such as conductive additives). On the other hand, in the examples reported in FIGS. 17, 18A, and 18B, the same or similar Si-based nanocomposite active material (e.g., composite particles comprising silicon and carbon elements) made up either about 50 wt. % or about 100 wt. % of all active material in the respective anode coatings (excluding binders and additives such as conductive additives). In the cases in which the Si-based nanocomposite active material was about 50 wt. %, the remainder of about 50 wt. % was graphite. Note, however, that in some configurations, the wt. % of the Si-based nanocomposite active material may range from about 5 wt. % to about 100 wt. % (relative to the weight of all active materials in the anode, the remaining being, for example, natural or synthetic graphite, soft carbon, hard carbon, or other active anode materials) (e.g., in some configurations, from about 5 wt. % to about 15 wt. %; in some configurations, from about 15 wt. % to about 25 wt. %; in some configurations, from about 25 wt. % to about 35 wt. %; in some configurations, from about 35 wt. % to about 50 wt. %; in some configurations, from about 50 wt. % to about 75 wt. %; in some configurations, from about 75 wt. % to about 100 wt. %). Also note that the higher fraction of the Si-based nanocomposite active material in the anode, the higher capacity of the Si-based nanocomposite active material, the higher anode density, the higher hardness of the binder use—typically increase the requirements for specific mechanical properties (e.g., ultimate strength, yield strength, fracture toughness, yield strain, strain at fracture, fatigue resistance, etc.) of the current collector foils (e.g., Cu or Cu alloys) to attain sufficiently good or superior performance in lithium-ion battery (LIB) cells. The cathode coating included high-voltage NMC811 (with an approximate composition of $LiNi_{0.8}Co_{0.1}Mn_{0.1}O_2$) active material (with specific reversible capacity of ~200 mAh/g when normalized by the weight of active materials in the cathode) casted on A1 current collector foil from an organic solvent suspension including a polyvinylidene fluoride (PVDF)-based binder and a carbon black conductive additive. The anode:cathode areal capacity ratio (N:P ratio) was in a range of about 1.11 to about 1.17:1 and the charge voltage was about 4.2 V. A polymer-ceramic separator was interposed between the anode coating and the cathode coating. In the examples herein, carbon-containing nanocomposite particles containing silicon nanoparticles were used as the Si-based nanocomposite active material. An electrolyte was infiltrated in between the anode coating and the cathode coating. In one example, the electrolyte composition comprised: about 8.7 mol. % $LiPF_6$ (as primary lithium salt), about 1.7 mol. % LiFSI (lithium bis(fluorosulfonyl)imide, as lithium salt additive), about 0.4 mol. % LiDFP (LFO or $LiPO_2F_2$, as another lithium salt additive), about 14.4 mol. % FEC (fluoroethylene carbonate, a fluorinated cyclic carbonate), about 4.1 mol. % VC (vinylene carbonate, a cyclic carbonate), about 5.7 mol. % PC (propylene carbonate, a cyclic carbonate), about 13.1 mol. % EC (ethylene carbonate, a cyclic carbonate), about 7.2 mol. % DEC (diethyl carbonate, a linear carbonate), about 43.9 mol. % ethyl propionate (an ester), about 0.4 mol. % adiponitrile (ADN, a nitrogen-comprising additive, comprising two nitrile groups), and about 0.3 mol. % of HTCN (1,3,6-hexanetricarbonitrile, a nitrogen-comprising additive, comprising three nitrile groups). In one example implementation, the median anode coating thickness was about 42.4 μm, the median cathode thickness was about 75 μm, the median anode loading was about 3.53 $mg/cm^2$, and the median cathode loading was about 23 $mg/cm^2$.

To avoid cracking of the copper foils in stacked cells in some designs, it may be preferable to choose copper foils that are characterized by a yield strength of at least about 220 MPa, or in a range of about 220 MPa to about 600 MPa. In some designs, yield strength may be interpreted as one indicator of the resistance of a material to deformation. However, there are copper foils with yield strengths of at least about 220 MPa or in range of about 220 MPa to about 600 MPa that exhibit cracking (e.g., foil #1-2, which has a yield strength of about 229.1 MPa, foil #1-10 which has a yield strength of about 295.1 MPa, and foil #1-15, which has a yield strength of about 304.9 MPa, were observed to crack in test cells). Therefore, in the examples considered, yield strength has not been a sole indicator of the "resistance" of a copper foil to cracking. Accordingly, other material properties such as the strain at the ultimate tensile strength (UTS) and strain at fracture (also known as strain at break or elongation at break or fracture strain) are also considered. The anode components that incorporated these copper foils exhibited maximum areal expansion of greater than about 3.5% (e.g., foil #1-2 exhibited a maximum areal expansion of about 8.76%, foil #1-10 exhibited a maximum areal expansion of about 3.76%, and foil #1-15 exhibited a maximum areal expansion of about 5.19%). Accordingly, in some designs, it may be preferable to choose a copper foil such that its yield strength is at least about 220 MPa, or in a range of about 220 MPa to about 600 MPa (e.g., typically higher for anodes having a higher density or higher fraction of silicon, etc.), and to fabricate an anode component incorporating the copper foil that undergoes a maximum areal expansion in a range of about 0% to about 3.5% during the multiple charging and discharging cycles, or a maximum areal expansion in a range of about 0% to about 2% during the multiple charging and discharging cycles, or both.

As shown in Table 1 (FIG. 11B) and FIG. 11A, the maximum areal expansion may vary over a relatively wide range (e.g., from about 0.53% to about 10.98% for the foils considered in Table 1) for test cells (stacked configuration) that were fabricated under similar conditions except for the differences in copper foils. In addition to the copper foil selection, other factors may affect the areal expansion characteristics. In some designs, there may be a negative correlation, under certain conditions, between copper foil thickness and areal expansion (e.g., about 10 μm thick foils tend to exhibit smaller areal expansion than about 8 μm thick foils). In some designs, there may be a positive correlation, under certain conditions, between calendered anode coating density (g/cm$^3$) and areal expansion and a positive correlation between areal capacity (mAh/cm$^2$) and areal expansion. These factors relate to the areal density of silicon-based nanocomposite particles that undergo significant volume expansion during lithiation.

Si-based nanocomposite active particles (including, but not limited to silicon-comprising and carbon-comprising composite particles) may have a relatively high weight fraction (concentration) of silicon, and exhibit moderately high volume changes (e.g., about 8-180 vol. %) during the first charge-discharge cycle and moderate volume changes (e.g., about 5-50 vol. %) during the subsequent charge-discharge cycles.

The calendared anode coating density and areal capacity (also referred to as capacity loading) relate to the areal density of Si-based nanocomposite active particles (e.g., silicon-carbon nanocomposite particles) that undergo significant volume expansion (also referred to as swelling) during lithiation. In some designs, the calendared anode coating density may range from about 0.9 g/cc to about 1.75 g/cc (depending on the wt. % of Si element in the anodes and the wt. % of graphite in the anodes). In some implementations (e.g., when 70-100% of anode capacity is provided by the Si-based nanocomposite active particles), the calendared anode coating density may range from about 0.9 g/cc to about 1.1 g/cc or from about 1.1 g/cc to about 1.3 g/cc or from about 1.3 g/cc to about 1.5 g/cc or from about 1.5 g/cc to about 1.6 g/cc. In other implementations (e.g., when 5-70% of anode capacity is provided by the Si-based nanocomposite active particles), the calendared anode coating density may be higher and may range from about 1.4 g/cc to about 1.8 g/cc or from about 1.4 g/cc to about 1.5 g/cc or from about 1.5 g/cc to about 1.6 g/cc or from about 1.6 g/cc to about 1.7 g/cc or from about 1.7 g/cc to about 1.75 g/cc or from about 1.75 g/cc to about 1.8 g/cc, depending on the cell design requirements. Because of the relatively large volume changes of silicon during lithiation and delithiation in some designs, these silicon-carbon composite particles may exhibit moderately high volume changes (e.g., about 8-180 vol. %) during the first charge-discharge cycle and moderate volume changes (e.g., about 5-50 vol. %) during the subsequent charge-discharge cycles.

In some implementations, a weight fraction of silicon in the anode coating may be in a range of about 35 wt. % to about 55 wt. %. To increase the charge capacity of the silicon-carbon composite particles, it may be preferable for the weight fraction of silicon in the anode coating to be in a range of about 55 wt. % to about 60 wt. %, or in a range of about 60 wt. % to about 65 wt. %, or in a range of about 65 wt. % to about 70 wt. %. On the other hand, in some designs, it may be preferable to reduce the areal expansion of the anode component, and one technique for reducing the areal expansion is to reduce the weight fraction of silicon in the anode coating. Accordingly, in some designs, it may be preferable for the weight fraction of silicon to be in a range of about 25 wt. % to about 35 wt. %, or in a range of about 15 wt. % to about 25 wt. %, or in a range of about 5 wt. % to about 15 wt. %. In some implementations, a weight fraction of silicon in the anode coating of a lithium-ion battery (e.g., stacked cell configuration) may be in a range of about 5 wt. % to about 70 wt. %. In some implementations, a weight fraction of silicon in the anode coating of a lithium-ion battery (e.g., stacked cell configuration) may be in a range of about 10 wt. % to about 65 wt. %. In some implementations, a weight fraction of silicon in the anode coating of a lithium-ion battery (e.g., stacked cell configuration) may be in a range of about 15 wt. % to about 65 wt. %. In some implementations, a weight fraction of silicon in the anode coating of a lithium-ion battery (e.g., stacked cell configuration) may be in a range of about 25 wt. % to about 60 wt. %. In some implementations, a weight fraction of silicon in the anode coating of a lithium-ion battery (e.g., stacked cell configuration) may be in a range of about 35 wt. % to about 55 wt. %. In some implementations, a specific (gravimetric) reversible capacity of (e.g., the silicon-graphite blended) anode coating of a LIB (e.g., wound cell configuration) may be in a range of about 500 mAh/g to about 1900 mAh/g (normalized by the total weight of the active materials, binder, conductive and other additives and, if present, a buffer layer, but not counting the weight of the electrolyte or current collector foils; as measured in half cell configuration according to the standard procedure described above—e.g., by anode lithiation at an approximately 0.1 C current density rate to 0.01 V vs. $Li/Li^+$ cutoff potential and then at an approximately 0.01 C current density rate to the same 0.01 V vs. $Li/Li^+$ cutoff potential and discharging at 0.1 C rate to 1.5V vs. $Li/Li^+$ cutoff potential); in some configurations, from about 500 mAh/g to about 800 mAh/g; in some configurations, from about 800 mAh/g to about 1200 mAh/g; in some configurations from about 1200 mAh/g to about 1500 mAh/g; in some configurations from about 1500 mAh/g to about 1900 mAh/g. In some implementations, a thickness of an anode coating of a lithium-ion battery (e.g., stacked cell configuration) may be in a range of about 25 μm to about 75 μm. In some implementations, a capacity loading of an anode coating of a lithium-ion battery (e.g., stacked cell configuration) may be in a range of about 2 mAh/cm$^2$ to about 10 mAh/cm$^2$ (e.g., from about 2 mAh/cm$^2$ to about 4 mAh/cm$^2$ or 4 mAh/cm$^2$ to about 6 mAh/cm$^2$ or 6 mAh/cm$^2$ to about 8 mAh/cm$^2$ or 8 mAh/cm$^2$ to about 10 mAh/cm$^2$).

The areal expansion can be reduced by increasing the current collector (e.g., copper or copper alloy foil) thickness. However, a thicker foil lowers a battery's overall capacity and increases its cost. In many battery implementations, it is preferable to adopt copper foils (or broadly, current collector) with thicknesses of about 20 μm or less, or about 12 μm or less, because of these cost and capacity constraints. On the other hand, extremely thin current collectors (e.g., copper or copper alloy foils) (e.g., thinner than about 6 μm) may be unable to withstand the repeated areal expansion and contraction. Accordingly, in some implementations, a thickness of a current collector (e.g., copper or copper alloy foil) in a lithium-ion battery (e.g., stacked cell configuration) may be in a range of about 6 μm to about 12 μm. In some implementations, a thickness of a current collector (e.g., copper or copper alloy foil) in a lithium-ion battery (e.g., stacked cell configuration) may be in a range of about 8 μm to about 10 μm. Note that in some designs, a polymer sheet coated with a copper layer (e.g., on both sides) may be used instead of copper (or copper alloy) foils to reduce current collector weight or enable thermal shutdown behavior or enhance specific (e.g., weight-normalized) mechanical properties.

In the case of LIBs, silicon is an example of an alloying-type electrode material. Other examples of alloying-type electrode materials are germanium, antimony, aluminum, magnesium, zinc, gallium, arsenic, phosphorus, silver, cadmium, indium, tin, lead, bismuth, and their alloys. These materials typically offer higher gravimetric and volumetric capacity than so-called intercalation-type electrode materials (e.g., graphite) commonly used in commercial Li-ion batteries. Silicon-comprising electrode materials are particularly advantageous for use in certain high-capacity anodes for Li-ion batteries. Silicon-carbon (Si—C) composite particle-based anodes (where Si and C comprise over 90 at. % of all elements in the particles) may be particularly attractive for such applications.

One technique for reducing areal expansion of an anode component is to use low-swell anode materials. Such a low-swell anode material may include a mixture of alloying-type silicon-comprising active material (e.g., a Si-comprising nanocomposite material, where Si may be in a pure or doped form and/or in the form of silicon oxide or silicon nitride or silicon phosphide or silicon carbide, for example) and graphite (or graphite-like lithium intercalation materials, such as soft carbon or hard carbon), which may be referred to broadly as a silicon-graphite blend. In such blended anode the Si-based nanocomposite (which may comprise silicon nanoparticles in some designs) is from about 20% to about 95% by capacity, while the rest of the capacity (e.g., 5-80%) is from graphite. Such materials offer much higher volumetric and gravimetric energy density than the intercalation-type graphite electrodes commonly used in commercial Li-ion batteries. In addition, in such blended anode, the graphite can be composed of natural, artificial or a mixture of natural and artificial graphites. In some designs, it is more advantageous to use natural graphite or a mixture of natural and artificial graphites since they exhibit different mechanical properties (e.g., different hardness or different elastic modulus or different porosity), different size and different swell at the graphite particle level. This may be advantageous to reducing the overall anode swell in blends since such graphite particles may be able to accommodate stresses caused by the high-swelling Si particles. Such properties of Si-based (e.g., Si—C) nanocomposite-graphite blends may offer overall moderate volume changes during the first cycle and low volume changes during the subsequent charging cycles. In some implementations, an anode coating in a lithium-ion battery (e.g., stacked cell configuration) may include graphite.

Another technique for reducing areal expansion of an anode component may be to use a buffer layer (e.g., composed of one or more polymer(s) or co-polymers, one or more conductive additive particles and pores, among other optional components) at an interface between the anode coating and the anode current collector (e.g., copper foil). The buffer layer (e.g., having an average typical thickness from about 0.05 micron to about 2 micron; in some designs—from about 0.1 micron to about 1 micron) may be configured to absorb some of the stress from the swelling anode coating and reduce stress concentration in those areas that may initiate crack formation and propagation, for example, upon repeated stresses. In some implementations, an anode coating of a lithium-ion battery (e.g., stacked cell configuration) may include a buffer layer. Yet another technique for reducing areal expansion of an anode component may be to use a binder comprising a rubber such as styrene-butadiene rubber (SBR) or another type of styrene-containing rubber in an anode coating. In some implementations, an anode coating of a lithium-ion battery (e.g., stacked cell configuration) may include a binder comprising a styrene-butadiene rubber or another styrene-comprising rubber (e.g., with about 25-90 wt. % styrene; in some designs with about 35-55 wt. % styrene) or another rubber.

Commercially available copper foils were characterized and incorporated into lithium-ion battery test cells (wound cell configuration) for evaluation. Table 2 (FIG. 12B) lists, for 3 commercially available copper foils, the foil thickness (μm), the elongation at break (also referred to as strain at break) parameter (%), the yield strength (MPa), and a determination of whether the foil cracked or did not crack in a wound cell. Both electrodeposited foils and rolled foils are represented in Table 2.

Figure 12A:
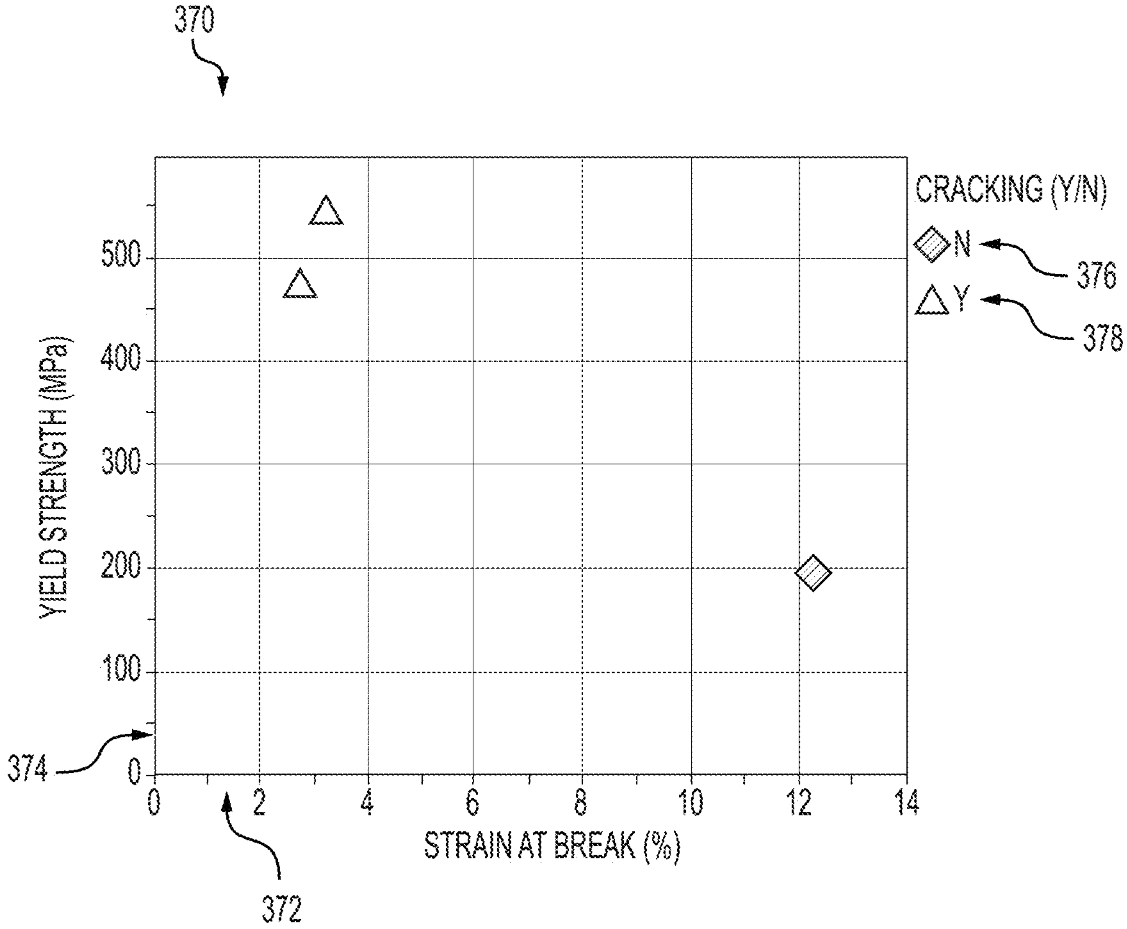
FIG. 12A is a graphical plot showing, for each copper foil, (1) whether the copper foil exhibited cracking (Y indicates cracking was observed, N indicates no cracking was observed) when integrated into an anode component of a wound battery cell and the battery cell underwent cycling, and (2) the yield strength as a function of the elongation at break parameter (also referred to as strain at break parameter) of the respective copper foil. The copper foils represented in FIG. 12A are 10 μm thick foils.

FIG. 12A shows a graphical plot 370 which plots the yield strength (MPa) as a function of the elongation at break (strain at break) (%) for the copper foils listed in Table 2. The elongation at break parameter is plotted along the x-axis 372 and the yield strength is plotted along the y-axis 374. Each data point whether the copper foil cracked (triangles, sample shown as 378) or did not crack (diamonds, sample shown as 376).

Test cells of the wound cell configuration were fabricated for cracking observations. These cells used anode materials, cathode materials, and electrolytes similar to those reported herein for the stacked cell testing.

As shown in Table 2 (FIG. 12B) and FIG. 12A, copper foils exhibiting relatively high yield strengths (e.g., foil #2-1 exhibited a yield strength of 548.4 MPa and foil #2-2 exhibited a yield strength of 476.4 MPa) cracked in wound cells. On the other hand, a softer copper foil exhibiting a relatively low yield strength (e.g., foil #2-3 exhibited a yield strength of 194.4 MPa) did not crack in wound cells. To avoid cracking of the copper foils in wound cells, it may be preferable to choose copper foils that are characterized by a yield strength in a range of about 100 MPa to about 600 MPa, or a yield strength in a range of about 100 MPa to about 250 MPa. Another salient point of distinction between copper foils that cracked and did not crack in wound cells is that copper foils that cracked exhibited relatively low elongation at break values (e.g., foil #2-1 exhibited an elongation at break value of 3.2% and foil #2-2 exhibited an elongation at break value of 2.7%) and the copper foil that did not crack exhibited a relatively high elongation at break value of 12.3%). These trends in yield strength and elongation at break may generally indicate that copper foils that are relatively ductile may be preferable for integration in wound cells. To avoid cracking of the copper foils in wound cells, it may be preferable to choose copper foils that are characterized by an elongation at break parameter in a range of about 4% to about 40% (e.g., in some designs, in a range of about 4% to about 20%), or an elongation at break parameter in a range of about 5% to about 20% or an elongation at break parameter in a range of about 7.5% to about 13%.

The findings about areal expansion of the anode components in stacked cells may also be applicable to wound cells. It may be preferable to reduce the areal expansion of the anode components in wound cells. In some implementations, a weight fraction of silicon (element) in the anode coating of a LIB (e.g., wound cell configuration) may be in a range of about 5 wt. % to about 70 wt. %. In some implementations, a weight fraction of silicon in the anode coating of a LIB (e.g., wound cell configuration) may be in a range of about 10 wt. % to about 65 wt. %. In some implementations, a weight fraction of silicon in the anode coating of a lithium-ion battery (e.g., wound cell configuration) may be in a range of about 15 wt. % to about 60 wt. %. In some implementations, a weight fraction of silicon in the anode coating of a lithium-ion battery (e.g., wound cell configuration) may be in a range of about 20 wt. % to about 55 wt. %. In some implementations, a weight fraction of silicon in the anode coating of a lithium-ion battery (e.g., wound cell configuration) may be in a range of about 25 wt. % to about 50 wt. %. In some implementations, a weight fraction of silicon-carbon nanocomposite (particles) in the blended anode coating of a LIB (e.g., wound cell configuration) may be in a range of about 10 wt. % to about 95 wt. % (as a wt. % of all active anode material in the anode coating, including graphite or soft carbon or hard carbon). In some implementations, a weight fraction of silicon-carbon nanocomposite (particles) in the blended anode coating of a LIB (e.g., wound cell configuration) may be in a range of about 15 wt. % to about 90 wt. % (as a wt. % of all active anode material in the anode coating). In some implementations, a weight fraction of silicon-carbon nanocomposite (particles) in the blended anode coating of a LIB (e.g., wound cell configuration) may be in a range of about 20 wt. % to about 80 wt. % (as a wt. % of all active anode material in the anode coating). In some implementations, a weight fraction of silicon-carbon nanocomposite (particles) in the blended anode coating of a LIB (e.g., wound cell configuration) may be in a range of about 25 wt. % to about 70 wt. % (as a wt. % of all active anode material in the anode coating). In some implementations, a weight fraction of silicon-carbon nanocomposite (particles) in the blended anode coating of a LIB (e.g., wound cell configuration) may be in a range of about 30 wt. % to about 60 wt. % (as a wt. % of all active anode material in the anode coating). In some implementations, a weight fraction of silicon-carbon nanocomposite (particles) in the blended anode coating of a LIB (e.g., wound cell configuration) may be in a range of about 35 wt. % to about 55 wt. % (as a wt. % of all active anode material in the anode coating). In some implementations, a specific (gravimetric) reversible capacity of (e.g., the silicon-graphite blended) anode coating of a LIB (e.g., wound cell configuration) may be in a range of about 500 mAh/g to about 1900 mAh/g (normalized by the total weight of the active materials, binder, conductive and other additives and, if present, a buffer layer, but not counting the weight of the electrolyte or current collector foils; as measured in half cell configuration according to the standard procedure described above—e.g., by anode lithiation at an approximately 0.1 C current density rate to 0.01 V vs. $Li/Li^+$ cutoff potential and then at an approximately 0.01 C current density rate to the same 0.01 V vs. $Li/Li^+$ cutoff potential and discharging at 0.1 C rate to 1.5V vs. $Li/Li^+$ cutoff potential); in some configurations, from about 500 mAh/g to about 800 mAh/g; in some configurations, from about 800 mAh/g to about 1200 mAh/g; in some configurations from about 1200 mAh/g to about 1500 mAh/g; in some configurations from about 1500 mAh/g to about 1900 mAh/g. In some implementations, a thickness of an anode coating (counting the thickness of the buffer layer, if present) of a LIB (e.g., wound cell configuration) may be in a range of about 25 μm to about 75 μm. In some implementations, a capacity loading of an anode coating of a lithium-ion battery (e.g., wound cell configuration) may be in a range of about 2 $mAh/cm^2$ to about 10 $mAh/cm^2$. In some implementations, a thickness of a copper foil in a lithium-ion battery (e.g., wound cell configuration) may be in a range of about 7 μm to about 12 μm. In some implementations, a thickness of a copper foil in a lithium-ion battery (e.g., wound cell configuration) may be in a range of about 8 μm to about 10 μm. In some implementations, an anode coating in a lithium-ion battery (e.g., wound cell configuration) may include graphite. In some implementations, an anode coating of a lithium-ion battery (e.g., wound cell configuration) may include a buffer layer. In some implementations, an anode coating of a lithium-ion battery (e.g., wound cell configuration) may include a binder including a styrene-butadiene rubber or another styrene-comprising rubber.

Figure 13:
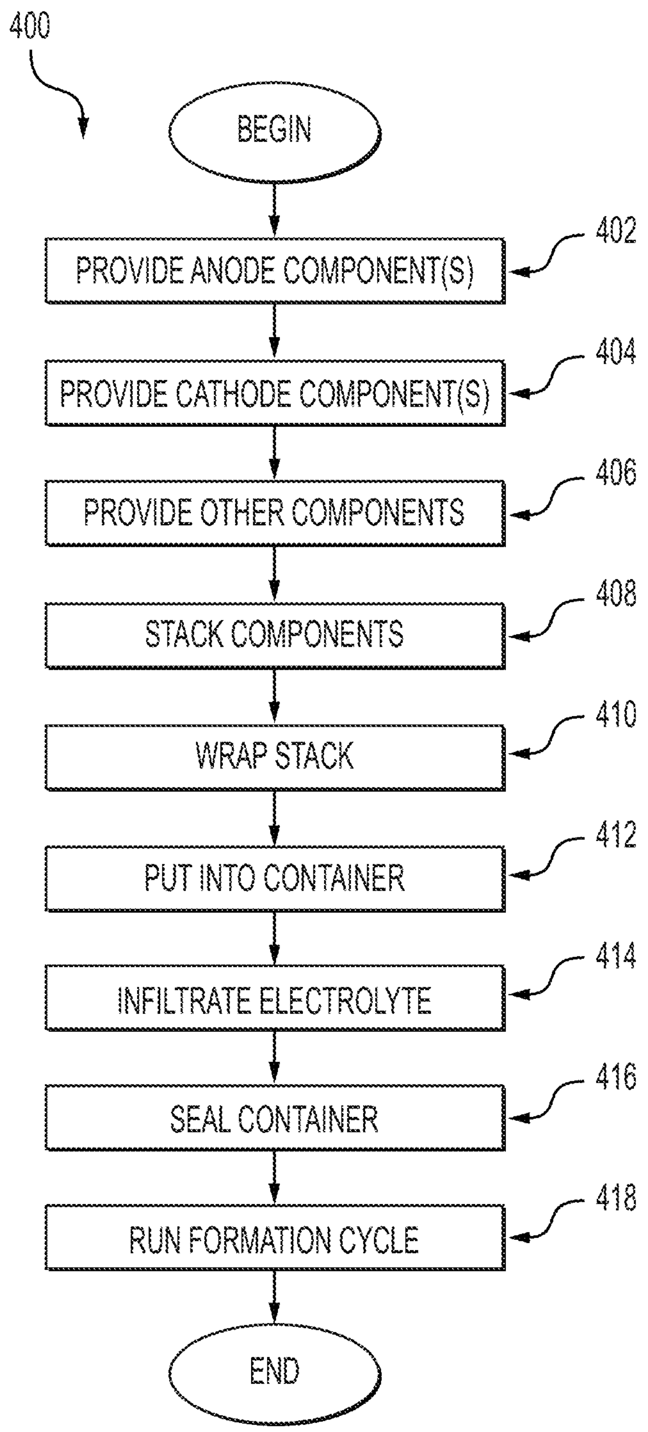
FIG. 13 shows a flow diagram of a method of making a lithium-ion battery including stacked anode components and cathode components.

FIG. 13 is a flow diagram of a method 400 of making a LIB (e.g., stacked cell configuration) configured to undergo multiple charging and discharging cycles. Method 400 includes steps 402, 404, 406, 408, 410, 412, 414, 416, and 418. The steps may be carried out in the order shown by the arrows. In some cases, the steps may be carried out in an order that differs from that shown by the arrows. Also, unless stated expressly, despite the use of the term "step", a step-plus-function interpretation is not intended.

At step 402, at least one anode component is provided. In some designs, each of the anode components includes an anode current collector and a respective anode coating on each side of the anode current collector. In some implementations, step 402 may include (1) providing a roll of the anode current collector, (2) forming the respective anode coatings on the roll of the anode current collector, and (3) forming the anode component from the roll of the anode current collector and the anode coatings. In the foregoing, (3) may include cutting the anode component from the roll. In some designs, the anode current collector of the at least one of the anode components includes a copper foil. In some implementations, the copper foil is characterized, before the respective anode coatings are formed thereon, by a yield strength of at least about 220 MPa. In some implementations, the yield strength is in a range of about 220 MPa to about 600 MPa. In some implementations, the copper foil is an electrodeposited copper foil. In some implementations, a thickness of the copper foil is in a range of about 7 μm to about 12 μm. In some implementations, the thickness of the copper foil is in a range of about 8 μm to about 10 μm.

In some designs, at least one of the anode components undergoes a maximum areal expansion in a range of about 0% to about 3.5% during the multiple charging and discharging cycles. In some implementations, the maximum areal expansion is in a range of about 0% to about 2%. In some designs, at least one of the anode coatings of the at least one of the anode components includes silicon-carbon composite particles, which may comprise silicon nanoparticles. In some implementations, a weight fraction of silicon (element) in the at least one anode coating may be in a range of about 5 wt. % to about 70 wt. %. In some implementations, the weight fraction of silicon may be in a range of about 15 wt. % to about 65 wt. %. In some implementations, the weight fraction of silicon may be in a range of about 20 wt. % to about 60 wt. % (e.g., in some designs, in a range of about 25 wt. % to about 60 wt. %). In some implementations, the weight fraction of silicon may be in a range of about 25 wt. % to about 55 wt. %. In some implementations, the weight fraction of silicon may be in a range of about 30 wt. % to about 50 wt. %. In some implementations, the weight fraction of silicon may be in a range of about 35 wt. % to about 45 wt. %. In some implementations, a weight fraction of silicon-carbon nanocomposite (particles) in the blended anode coating of a LIB (e.g., wound cell configuration) may be in a range of about 10 wt. % to about 95 wt.

% (as a wt. % of all active anode material in the anode coating, including graphite or soft carbon or hard carbon). In some implementations, a weight fraction of silicon-carbon nanocomposite (particles) in the blended anode coating of a LIB (e.g., wound cell configuration) may be in a range of about 15 wt. % to about 90 wt. % (as a wt. % of all active anode material in the anode coating). In some implementations, a weight fraction of silicon-carbon nanocomposite (particles) in the blended anode coating of a LIB (e.g., wound cell configuration) may be in a range of about 20 wt. % to about 80 wt. % (as a wt. % of all active anode material in the anode coating). In some implementations, a weight fraction of silicon-carbon nanocomposite (particles) in the blended anode coating of a LIB (e.g., wound cell configuration) may be in a range of about 25 wt. % to about 70 wt. % (as a wt. % of all active anode material in the anode coating). In some implementations, a weight fraction of silicon-carbon nanocomposite (particles) in the blended anode coating of a LIB (e.g., wound cell configuration) may be in a range of about 30 wt. % to about 60 wt. % (as a wt. % of all active anode material in the anode coating). In some implementations, a weight fraction of silicon-carbon nanocomposite (particles) in the blended anode coating of a LIB (e.g., wound cell configuration) may be in a range of about 35 wt. % to about 55 wt. % (as a wt. % of all active anode material in the anode coating). In some implementations, a specific (gravimetric) reversible capacity of the silicon-graphite blended anode coating of a LIB (e.g., wound cell configuration) may be in a range of about 500 mAh/g to about 1900 mAh/g (normalized by the total weight of the active materials, binder, conductive and other additives and, if present, a buffer layer, but not counting the weight of the electrolyte or current collector foils); in some configurations, from about 500 mAh/g to about 800 mAh/g; in some configurations, from about 800 mAh/g to about 1200 mAh/g; in some configurations from about 1200 mAh/g to about 1500 mAh/g; in some configurations from about 1500 mAh/g to about 1900 mAh/g.

At step 404, at least one cathode component is provided. Each of the cathode components includes a cathode current collector and a respective cathode coating on each side the cathode current collector. At step 406, other components are provided. Examples of other components are a separator, an electrolyte, a wrapper, and a container (including a sealing member).

At step 408, the anode components and the cathode components are stacked along a stacking direction perpendicular to a plane of the anode components and the cathode components. The anode components and the cathode components alternate along the stacking direction. A separator is interposed between adjacent ones of the anode components and the cathode components.

In implementations in which there are multiple anode components in the stack, method 400 also includes electronically coupling the respective anode current collectors to each other (e.g., welding the tabs that extend from the anode components). This optional step may be carried out at a suitable time after step 408. In implementations in which there are multiple cathode components in the stack, method 400 also includes electronically coupling the respective cathode current collectors to each other (e.g., welding the tabs that extend from the cathode components). This optional step may be carried out after step 408.

At step 410, the wrapper is wrapped around a stack of the anode components and the cathode components. In some implementations, the wrapper includes an adhesive tape adhered to at least some portion of the anode components and/or the cathode components. Step 410 may be an optional step. At step 412, the stack of anode components and the cathode components and the wrapper, if any, are inserted into the container.

At step 414, the electrolyte is infiltrated between adjacent ones of the anode components and the cathode components. At step 416, the anode components, the cathode components, the separator, the electrolyte, and the wrapper may be sealed in the container. Step 416 may also include making electrical connections to the anode and cathode tabs from outside of the container. At step 418, a formation cycle is carried out, leading to the formation of the SEI layer. At this point, the lithium-ion battery is ready to undergo multiple charging and discharging cycles.

Figure 14:
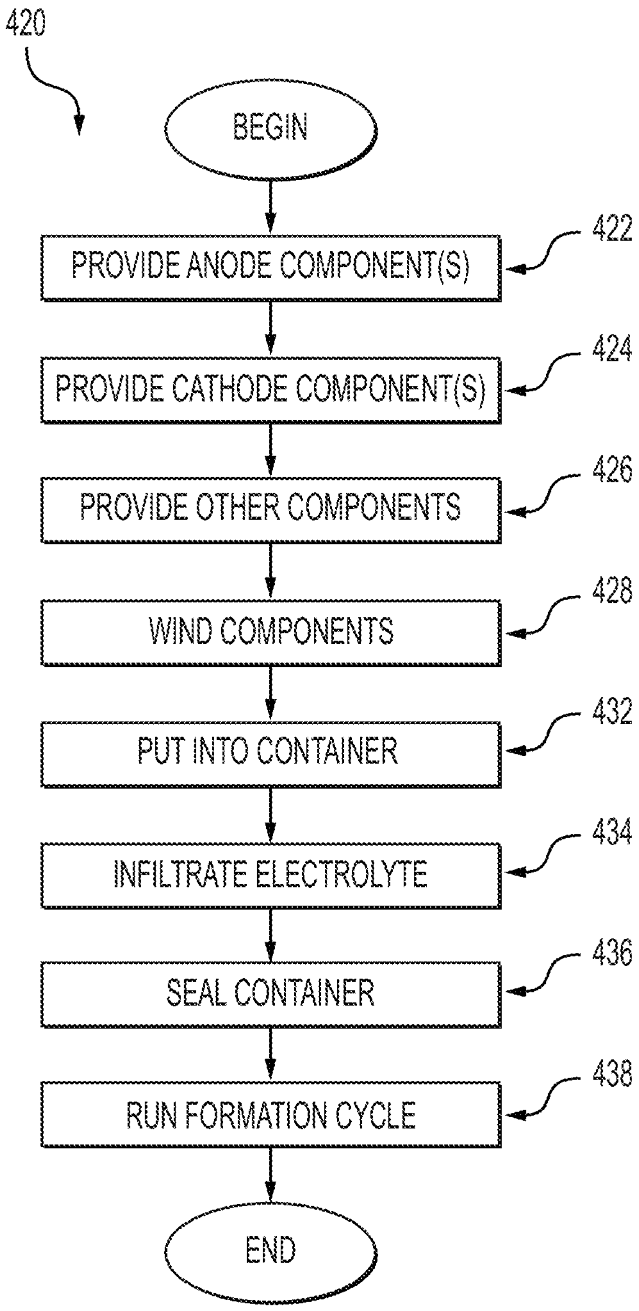
FIG. 14 shows a flow diagram of a method of making a lithium-ion battery including wound anode components and cathode components.

FIG. 14 is a flow diagram of a method 420 of making a lithium-ion battery (e.g., wound cell configuration) configured to undergo multiple charging and discharging cycles. Method 420 includes steps 422, 424, 426, 428, 432, 434, 436, and 438. The steps may be carried out in the order shown by the arrows. In some cases, the steps may be carried out in an order that differs from that shown by the arrows. Also, unless stated expressly, despite the use of the term "step", a step-plus-function interpretation is not intended.

At step 422, an anode component is provided. In some designs, the anode component includes an anode current collector and a respective anode coating on each side of the anode current collector. In some implementations, step 422 may include (1) providing a roll of the anode current collector, (2) forming the respective anode coatings on the roll of the anode current collector, and (3) forming the anode component from the roll of the anode current collector and the anode coatings. In the foregoing, (3) may include cutting the anode component from the roll. The anode current collector includes a copper foil. In some implementations, the copper foil is characterized, before the respective anode coatings are formed thereon, by a yield strength in a range of about 100 MPa to about 400 MPa. In some implementations, the yield strength is in a range of about 100 MPa to about 250 MPa. In some implementations, the copper foil is characterized, before the respective anode coatings are formed thereon, by an elongation at break parameter in a range of about 4% to about 20%. In some implementations, the elongation at break parameter is in a range of about 7.5% to about 13%. In some implementations, the copper foil is an electrodeposited copper foil. In some implementations, a thickness of the copper foil is in a range of about 7 μm to about 12 μm. In some implementations, the thickness of the copper foil is in a range of about 8 μm to about 10 μm.

In some designs, at least one of the anode coatings of the anode component includes silicon-carbon composite particles, which may be comprise silicon nanoparticles. In some implementations, a weight fraction of silicon (element) in the at least one anode coating may be in a range of about 5 wt. % to about 70 wt. %. In some implementations, the weight fraction of silicon may be in a range of about 15 wt. % to about 65 wt. %. In some implementations, the weight fraction of silicon may be in a range of about 20 wt. % to about 60 wt. %. In some implementations, the weight fraction of silicon may be in a range of about 25 wt. % to about 55 wt. %. In some implementations, the weight fraction of silicon may be in a range of about 30 wt. % to about 55 wt. %. In some implementations, the weight fraction of silicon may be in a range of about 35 wt. % to about 50 wt. %.

At step 424, a cathode component is provided. In some designs, the cathode component includes a cathode current collector and a respective cathode coating on each side of the cathode current collector. At step 426, other components are provided. Examples of other components are at least one separator, an electrolyte, and a container (including a sealing member).

At step 428, the anode component, the cathode component, and at least one separator interposed between the anode component and the cathode component are wound around a common core. At step 432, the assembly of the anode components, the cathode components, and the at least one separator are inserted into the container.

At step 434, the electrolyte is infiltrated between the anode component and the cathode component. At step 436, the anode component, the cathode component, the at least one separator, and the electrolyte may be sealed in the container. In some designs, step 436 may also include making electrical connections to the anode and cathode tabs from outside of the container. At step 438, a formation cycle is carried out, leading to the formation of the SEI layer. At this point, the lithium-ion battery is ready to undergo multiple charging and discharging cycles.

Figure 15A:
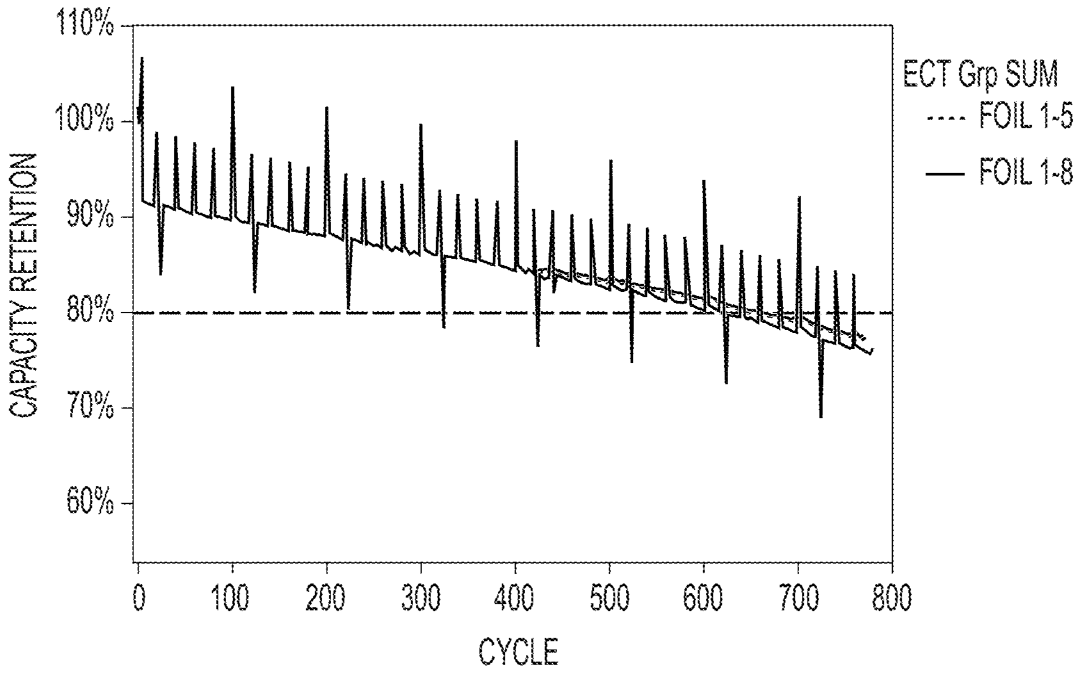
FIG. 15A shows a graphical plot of the capacity retention (in % of initial capacity) as a function of cycle number for lithium-ion stacked battery cells according to some embodiments.
Figure 15B:
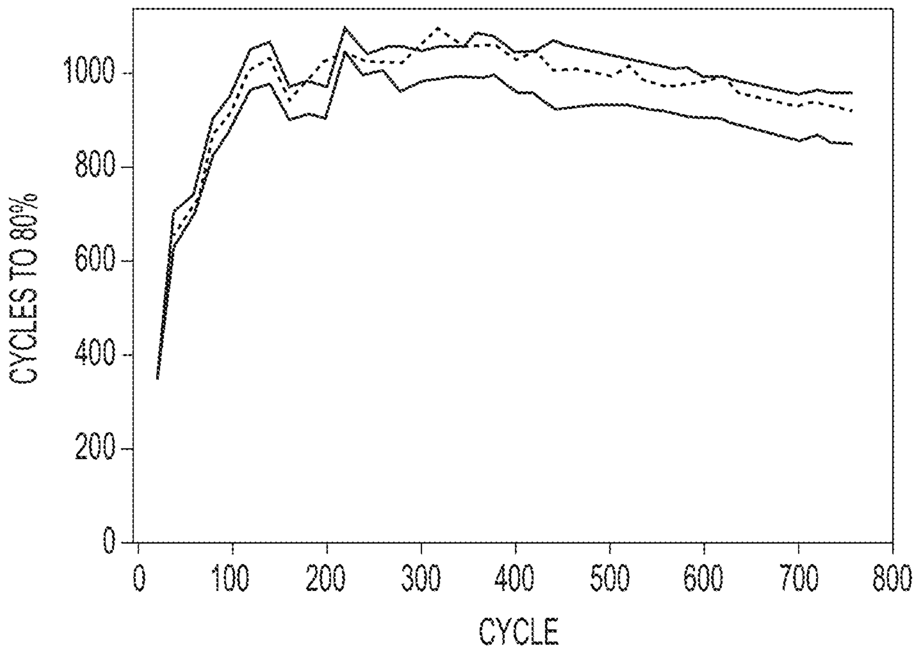
FIG. 15B shows a graphical plot of the estimated number of cycles to 80% of initial capacity as a function of cycle number for lithium-ion stacked battery cells according to some embodiments.

FIGS. 15A and 15B show cycle test results for LIB test cells in the stacked cell configuration. The stacked test cells were made using copper foils #1-5 and #1-8 (as shown in Table 1), respectively. The anode, cathode, and electrolyte compositions are as reported herein for areal expansion and cracking observations. FIG. 15A is a graphical plot of the capacity retention (in % of initial capacity) as a function of cycle number for the respective lithium-ion battery test cells. FIG. 15B is a graphical plot of the estimated number of cycles to 80% of initial capacity as a function of cycle number for the respective lithium-ion battery test cells. These test cells exhibited excellent cycling characteristics for multiple charging and discharging cycles.

Figure 16:
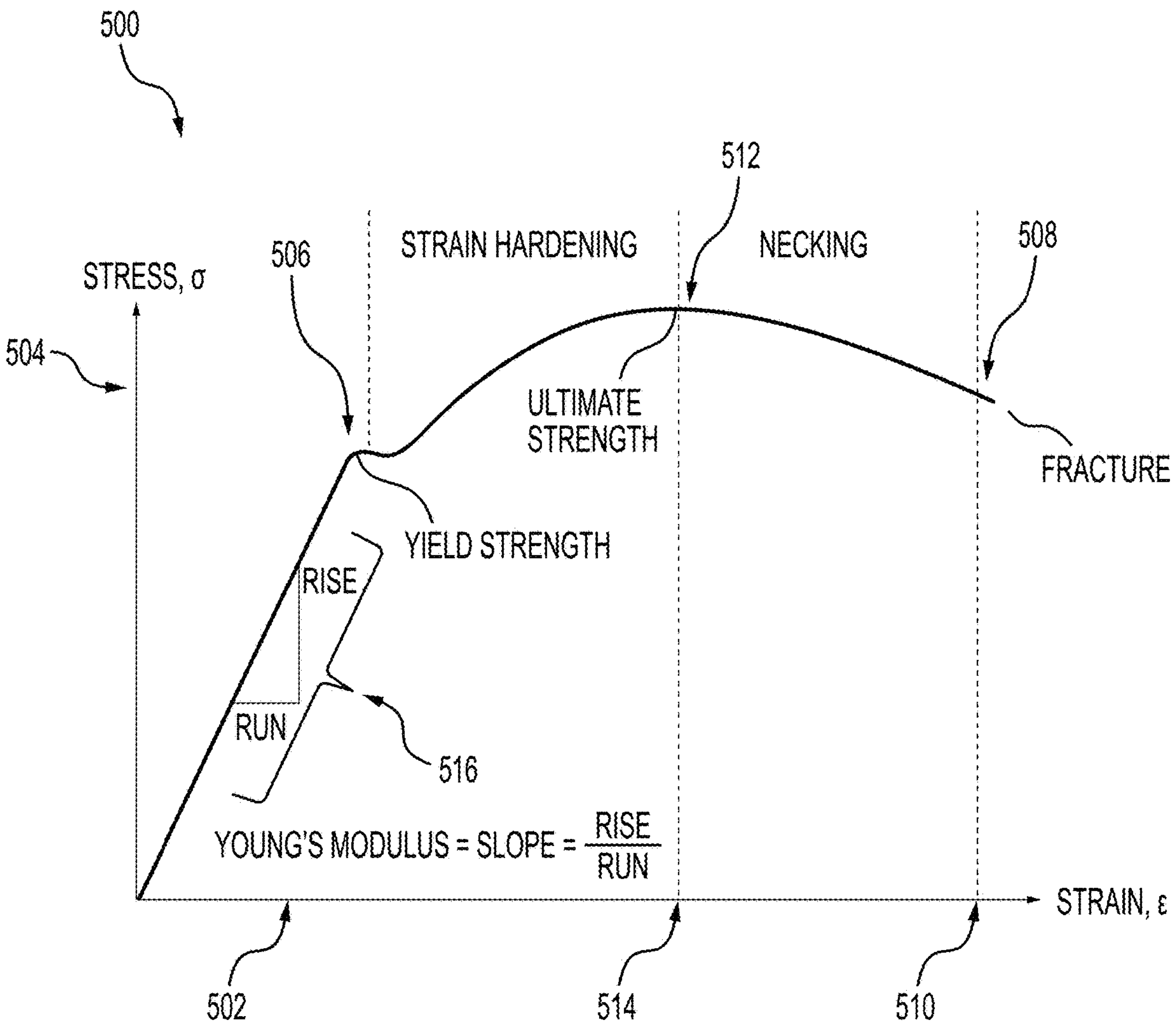
FIG. 16 shows a graphical plot illustrating a typical relationship between stress and strain in a ductile material (e.g., steel).

For illustration, FIG. 16 shows a graphical plot 500 illustrating a typical relationship between stress and strain (stress-strain curve) in a ductile material (e.g., steel). The x-axis 502 represents the strain in the example ductile material and the y-axis 504 represents the stress in the example ductile material. The yield strength (shown at 506) is the stress corresponding to the yield point at which the ductile material begins to deform plastically. In the examples shown in FIGS. 11A, 11B (Table 1), 12A, and 12B (Table 2), 17, 18A (Table 3), and 18B (Table 3), the 0.2% offset yield strength, defined as the stress that results in a plastic strain of about 0.2%, was determined to be the yield strength. The fracture (also referred to as the break) of the ductile material is shown at 508. The strain at break (also referred to as the elongation at break) is shown at 510 along the x-axis 502. Furthermore, the ultimate tensile strength (UTS), shown at 512, is the maximum stress that the material can withstand. The strain at the UTS is shown at 514 along the x-axis 502. Young's modulus (also referred to as modulus of elasticity) is the tensile stress divided by the axial strain in the linear elastic region (e.g., the region indicated by 516) of the ductile material.

Tensile testing was conducted on bare copper foils before formation of anode coatings thereon. A stress-strain curve was obtained for each copper foil. For each copper foil, the yield strength was defined as the stress at 0.2% plastic strain offset on the respective stress-strain curve. From the actual measurement, the force at yield (expressed in N) is initially obtained, and the yield strength (expressed in MPa) is obtained by dividing the force at yield by a cross-sectional area of the copper foil. Measurements of certain mechanical properties of copper foils using the INSTRON Universal Tensile Machine 5900 series were conducted after the respective copper foils had been annealed at an anneal temperature of about 100° C. for a period of about 24 hours. Cu foils were cut in strip shape with about 1.2 cm width and about 5 cm gauge length. The specimens were gripped securely to ensure axial alignment and minimize bending and then pulled in tension until failure in accordance with the IPC-TM-650 tensile test method. The measured mechanical properties included the following: Young's modulus (express in GPa), the force at yield (N), the yield strength (expressed in MPa), the ultimate tensile strength (also sometimes referred to as ultimate tensile stress and abbreviated as UTS, and expressed in MPa), strain at the UTS (expressed in %), and strain at break (expressed in %). The measured data are tabulated in FIGS. 18A and 18B (Table 3). All of the foils in Table 3 are electrodeposited copper foils. There is a copper foil number for each entry (row) in Table 3. Each copper foil number is expressed as three sets of numbers separated by hyphens. The first number set is 3 and shows that these copper foils are listed in Table 3. The second number set is a sequential number in a range of 1 to 19. Each of these sequential numbers is assigned to a respective copper foil series (e.g., a respective copper foil product of a respective manufacturer). The third number set is 6, 8, or 10 and indicates an approximate foil thickness of 6 μm, 8 μm, or 10 μm, respectively. For each copper foil, an approximate copper foil thickness (6 μm, 8 μm, or 10 μm) is shown. For example, copper foils 3-2-8 and 3-2-10 are shown in Table 3. Copper foils 3-2-8 and 3-2-10 are of the same product but differ in foil thickness. For each entry (row) in Table 3, a sample battery cell identifier (ID) (1 through 40) is shown. For each battery cell ID, approximately three stacked pouch cells incorporating the respective copper foil as the anode current collector underwent cycling (including formation cycling and subsequent cycles 1 through 10). For each stacked pouch cell corresponding to a respective battery cell ID, the maximum areal expansion during cycles 1 through 10 was measured, and an average of the maximum areal expansion values of the stacked pouch cells was determined to be the "maximum areal expansion" and reported in FIGS. 17, 18A, and 18B (Table 3). In addition, test cells were disassembled after cycling for 10 or more cycles, and the anode current collector (copper foil) was observed for cracking after removing the anode coating therefrom. There are two types of anode compositions represented in Table 3: (1) anode compositions in which about 100% the active materials is silicon-carbon nanocomposite particles comprising silicon and carbon; in addition to the active material, the anode composition includes the binder and conductive additives (e.g., single-wall carbon nanotubes, carbon black); these are shown as Si—C weight fraction of 100 wt. %; and (2) anode compositions in which about 50 wt. % the active material is silicon-carbon composite particles comprising silicon and carbon and about 50 wt. % of the active material is graphite; in addition to the active material, the anode composition includes the binder and conductive additives (e.g., single-wall carbon nanotubes, carbon black); these are shown as Si—C nanocomposite particles with a weight fraction of 50 wt. % relative to all active anode materials in the anode coating. In some cases, there are two sample IDs associated with one copper foil number because there is a respective sample ID associated with each of the foregoing anode compositions (Si—C nanocomposite particles at 100 wt. % or 50 wt. % relative to all active anode materials in the anode coating).

Test cells of the stacked pouch cell configuration were fabricated for areal expansion and cracking observations. The test cells were evaluated for the presence of cracks upon conclusion of cycle 10; a determination of pass or fail was made for each test cell ID comprising approximately three test cells. The following categories of cracks were seen under microscope observation at high magnification and reported in Table 3 under the Failure Mode column: (a) micro edge cracks are characterized as cracks with crack widths smaller than about 200 μm around the edge of the foil, (b) fatigue stress cracks or stress corrosion cracks are described as a collection of transverse or longitudinal hair-line cracks on the body of the foil (shown as fatigue cracks in Table 3), (c) macro edge cracks are characterized as cracks with crack widths larger than about 200 μm. A test cell ID was determined to have passed the cracking test if no cracks were observed, or only micro edge cracks were observed. Otherwise, a test cell ID was determined to have failed the cracking test if cracks other than micro cracks were observed.

Figure 17:
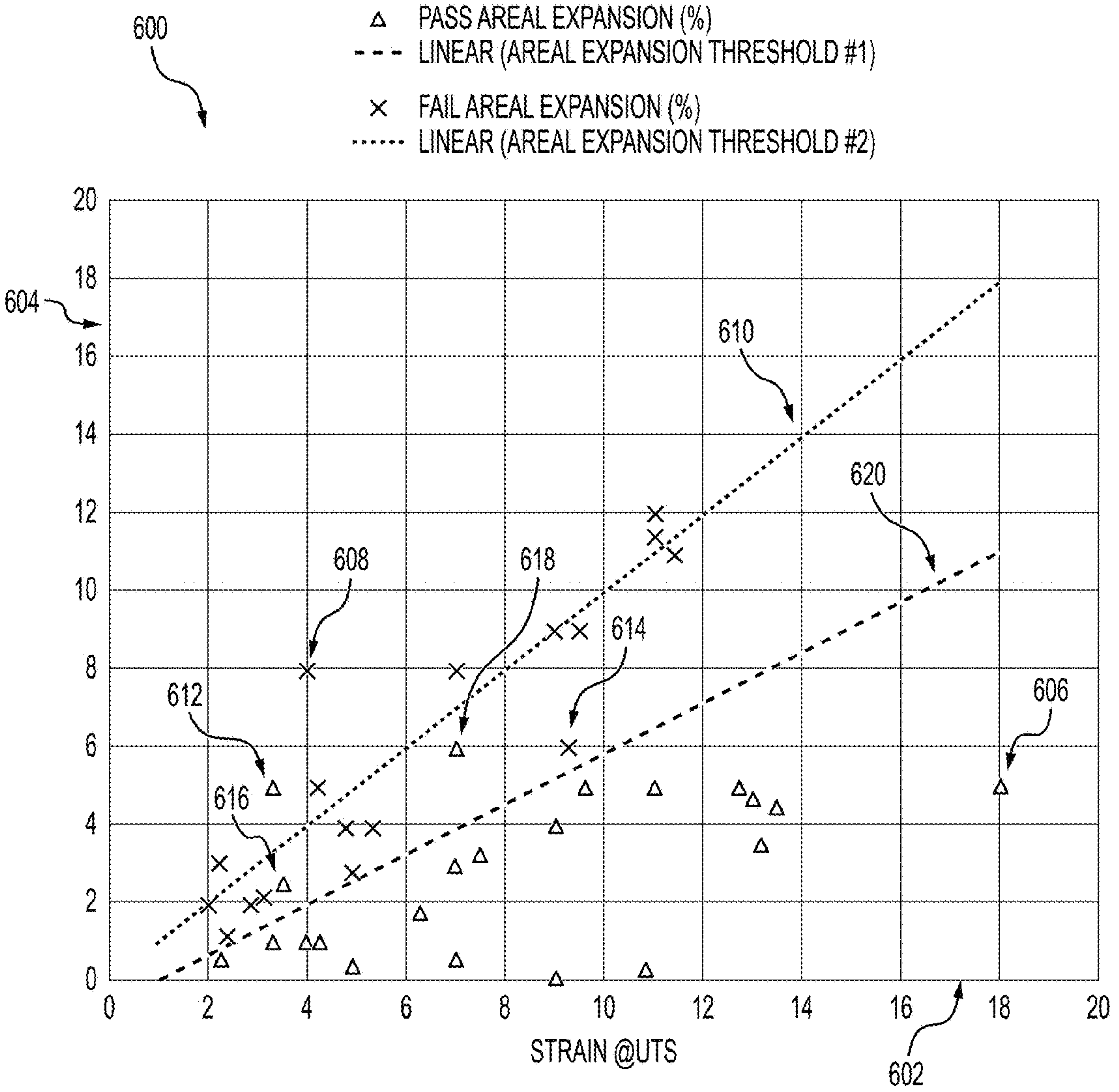
FIG. 17 shows a graphical plot, for each group of test pouch cells, (1) whether the copper foil passed or failed the cracking test when integrated into an anode component of a test pouch cell and the test pouch cell underwent cycling, and (2) the maximum areal expansion of the respective anode component during cycling as a function strain at ultimate tensile stress (UTS) of the respective copper foil.

FIG. 17 shows a graphical plot 600 of the strain at the UTS ($\varepsilon_{UTS}$, plotted along the x-axis 602) and the maximum areal expansion ($A_{max}$, plotted along the y-axis 604) for each test cell ID reported in FIGS. 18A and 18B (Table 3). Data points corresponding to test cells that passed (no cracks, or micro cracks only) are shown as black triangles (an example shown as 606) and data points corresponding to test cells that failed (cracks other than micro cracks) are shown as X's (an example shown as 608). For the test cell IDs that were determined to have passed, the strain at the UTS was in a range of about 2% to about 18% and the maximum areal expansion was in a range of about 0.1% to about 6.0%. For the test cell IDs that were determined to have failed, the strain at the UTS were in a range of about 2% to about 11.4% and the maximum areal expansion was in a range of about 1.1% to about 12.0%. Accordingly, there is an overlap between the strain at the UTS parameters of the passing and failing test cell IDs, and an overlap between the maximum areal expansion parameters of the passing and failing test cell IDs.

Some trends may be discerned from the graphical plot 600. Dotted line (thinner dotted line) 610 represents a linear relationship between the maximum areal expansion and the strain at the UTS according to the following Formula 1A: $A_{max}=\varepsilon_{UTS}$ (Formula 1A). Data points for 21 out of the 22 passing test cell IDs are located to the right and below dotted line 610. Accordingly, copper foils that satisfy a condition that the maximum areal expansion and the strain at the UTS are related by the following Formula 1 may have a higher likelihood of passing the cracking test: $A_{max}\leq\varepsilon_{UTS}$ (Formula 1). Herein, the term "higher likelihood" is used to refer to a higher likelihood than copper foils that do not meet the limitations of Formula 1. A data point for one out of the 22 passing test cell IDs is located to the left and above dotted line 610 (this data point is shown as 612). Data point 612 corresponds to test cell ID 37, for which the copper foils (Foil #3-18-10) exhibited micro edge cracks. Accordingly, although test cell ID 37 was determined to have passed the cracking test, test cell ID 37 may not be as preferable as other test cells that did not exhibit any cracks. For example, although micro edge cracks were observed after test cell ID 37 had undergone cycling to cycle 10, there is a possibility that larger cracks (e.g., cracks larger than micro edge cracks) may appear in the respective copper foil (Foil #3-18-10) during subsequent cycling after cycle 10. For example, although micro edge cracks were observed in Foil #3-18-10 in test cell ID 37, which had been configured as a stacked pouch cell, there is a possibility that larger cracks (e.g., cracks larger than micro cracks) may appear in the respective copper foil (Foil #3-18-10) when employed in other battery cells (e.g., battery cells of other configurations such as wound cells or cylindrical cells).

The region of the right and below dotted line 610 includes data points corresponding to passing test cell IDs (an example shown as 606) and data points corresponding to failing test cell IDs (an example shown as 614). In some implementations, it may be preferable to adopt a modified condition that can include most or all of the data points corresponding to passing test cell IDs and exclude at least some of the data points corresponding to failing test cell IDs. Such a modified condition may be envisioned by adjusting the vertical position along the Y-axis 604 (for example, downwards) and the slope (for example, decreasing the slope) of the dotted line 610. For example, dotted line (thicker dotted line) 620 represents a linear relationship between the maximum areal expansion and the strain at the UTS according to the following Formula 2A: $A_{max}=a\varepsilon_{UTS}-b$ (Formula 2A) with a and b being respective constants. In the example of dotted line 620 shown in FIG. 17, a=0.65 and b=0.65. In some implementations, the constant a may be less than 1, corresponding to a decreased slope compared to dotted line 610. In some implementations, the constant b may be greater than 0, corresponding to a straight line being vertically displaced downwards compared to dotted line 610. In some implementations, the constant a may be in a range of 0.6 to 1.0. In some implementations, the constant a may be in a range of 0.6 to 0.7. In some implementations, the constant a may be in a range of 0.6 to 0.9, or in a range of 0.6 to 0.8. In some implementations, the constant b may be in a range of 0.0 to 0.7. In some implementations, the constant a may be in a range of 0.6 to 0.7. In some implementations, the constant a may be in a range of 0.2 to 0.7, or in a range of 0.4 to 0.7. Accordingly, copper foils that satisfy a condition that the maximum areal expansion and the strain at the UTS are related by the following Formula 2 may have a higher likelihood of passing the cracking test: $A_{max}\leq a\varepsilon_{UTS}-b$ (Formula 2) with a and b being respective constants, a being less than or equal to 1 or a being in a range of 0.6 to 1.0 or in a range of 0.6 to 0.9 or in a range of 0.6 to 0.8 or in a range of in a range of 0.6 to 0.7, and b being greater than or equal to 0 or b being in a range of 0.0 to 0.7 or in a range of 0.2 to 0.7 or in a range of 0.4 to 0.7 or in a range of 0.6 to 0.7. Additionally, copper foils that do not satisfy the condition indicated by Formula 2 may have a higher likelihood of failing the cracking test.

The region between dotted lines 610 and 620 includes about 11 data points corresponding to failing test cell IDs (an example shown as 614) and 2 data points corresponding to passing test cell IDs (shown as 616 and 618). These data points correspond to test cell IDs that meet the limitations of Formula 1 but do not meet the limitations of Formula 2 (with a=0.65 and b=0.65). Data point 616 corresponds test cell ID 1, for which the copper foils (Foil #3-1-8) exhibited micro cracks. Accordingly, although test cell ID 1 was determined to have passed the cracking test, test cell ID 37 may not be as preferable as other test cells that did not exhibit any cracks. Data point 618 corresponds test cell ID 20, for which the copper foils (Foil #3-10-10) exhibited micro cracks. Accordingly, although test cell ID 20 was determined to have passed the cracking test, test cell ID 20 may not be as preferable as other test cells that did not exhibit any cracks.

For the test cell IDs that were determined to have passed, Young's modulus was in a range of about 56 GPa to about 88 GPa. For the test cell IDs that were determined to have failed, Young's modulus was in a range of about 56 GPa to about 80 GPa. Accordingly, there is an overlap between Young's moduli of the passing and failing test cell IDs. These Young's modulus data are shown in Table 3 (FIGS. 18A, 18B).

For the test cell IDs that were determined to have passed, the UTS was in a range of about 255 MPa to about 580 MPa. For the test cell IDs that were determined to have failed, the UTS was in a range of about 286 MPa to about 641 MPa. Accordingly, there is an overlap between the UTS values of the passing and failing test cell IDs. These UTS data are shown in Table 3 (FIGS. 18A, 18B). In some implementations, it may be preferable for the UTS to be about 250 MPa or greater. In some implementations, it may be preferable for the UTS of the copper foil to be in a range of about 250 MPa to about 580 MPa.

For the test cell IDs that were determined to have passed, the strain at break was in a range of about 3% to about 20%. For the test cell IDs that were determined to have failed, the strain at break was in a range of about 2.27% to about 14.8%. Accordingly, there is an overlap between the strain at break values of the passing and failing test cell IDs. These strain at break data are shown in Table 3 (FIGS. 18A, 18B). In some implementations, it may be preferable for the strain at break of the copper foil to be in a range of about 3% to about 20%.

For the test cell IDs that were determined to have passed, the force at yield was in a range of about 17.3 N to about 52 N and the yield strength was in a range of about 170 MPa to about 408 MPa. For the test cell IDs that were determined to have failed, the force at yield was in a range of about 19 N to about 52 N and the yield strength was in a range of about 203 MPa to about 449 MPa. Accordingly, there is an overlap between force at yield data of the passing and failing test cell IDs, and there is an overlap between yield strength data of the passing and failing test cell IDs. These force at yield and yield strength data are shown in Table 3 (FIGS. 18A, 18B). In some implementations, it may be preferable for the force at yield of the copper foil to be about 17 N or greater. In some implementations, it may be preferable for the force at yield of the copper foil to be in a range of about 17 to about 52 N. In some implementations, it may be preferable for the yield strength of the copper foil to be about 170 MPa or greater. In some implementations, it may be preferable for the yield strength of the copper foil to be in a range of about 170 MPa to about 410 MPa.

Each of the following pairs of test cell IDs is associated with a respective copper foil series (product) and includes a first test cell ID associated with a thinner copper foil and a second test cell ID associated with a thicker copper foil: (1) test cell IDs 2, 3 (foils 3-2-8, 3-2-10), (2) test cell IDs 8, 9 (foils 3-5-8, 3-5-10), (3) test cell IDs 18, 19 (foils 3-10-8, 3-10-10), (4) test cell IDs 25, 26 (foils 3-12-6, 3-12-8), (5) test cell IDs 29, 28 (foils 3-14-8, 3-14-10), (6) test cell IDs 34, 35 (foils 3-17-8, 3-17-10), and (7) test cell IDs 36, 38 (foils 3-18-8, 3-18-10). For each of these test cell IDs, the Si—C nanocomposite weight fraction (relative to all active anode materials) is about 50 wt. %. For each of these test cell ID pairs, except the pair with test cell IDs 25, 26 (foils 3-12-6, 3-12-8), the thinner copper foil is about 8 μm and the thicker copper foil is about 10 μm. For the pair with test cell IDs 25, 26, the thinner copper foil is about 6 μm and the thicker copper foil is about 8 μm. For some of these test cell ID pairs, the thinner copper foil exhibits a greater yield strength than the thicker copper foil (e.g., foil 3-2-8 is 428 MPa and foil 3-2-10 is 408 MPa, foil 3-5-8 is 394 MPa and foil 3-5-10 is 348 MPa, foil 3-10-8 is 339 MPa and foil 3-10-10 is 330 MPa, foil 3-14-8 is 246 MPa and foil 3-14-10 is 243 MPa, foil 3-17-8 is 243 MPa and foil 3-17-10 is 230 MPa). However, for each of the seven test cell ID pairs, the thinner copper foil has a smaller force at yield than the thicker copper foil (e.g., the force at yield of foil 3-2-8 is 44 N and the force at yield of foil 3-2-10 is 52 N). Accordingly, in some cases, it may be more likely for the thinner foil of a copper foil series (product) than the thicker foil of the same product to fail the cracking test. In four of these test cell ID pairs, the thinner foils failed the cracking test and the thicker foils passed the cracking test, namely (1) test cell IDs 2, 3 (foils 3-2-8, 3-2-10), (2) test cell IDs 8, 9 (foils 3-5-8, 3-5-10), (4) test cell IDs 25, 26 (foils 3-12-6, 3-12-8), and (7) test cell IDs 36, 38 (foils 3-18-8, 3-18-10).

There may be various aspects that explain why the forces at yield are smaller for thinner copper foils compared to thicker copper foils. For example, a ratio to/G (to is the thickness of the foil, G is a grain size) may be taken to represent an average number of grains that are in the foil along the foil's thickness direction. Presuming that two foils of different thicknesses have the same material composition including the same grain sizes, the thinner foil would have a smaller number of grains along the thickness direction and consequently would be able to withstand a smaller force at yield point. The force at yield could be an indicator for foil cracking test performance. Additionally, the grain sizes in these polycrystalline copper foils may be sufficiently small that grain boundaries may play a significant role in the plastic deformation. Hence, the inverse Hall-Petch effect may contribute to softening of the copper foil at smaller foil thicknesses.

Copper foil thicknesses of 6 μm, 8 μm, and 10 μm are represented in the test cell IDs shown in Table 3 (FIGS. 18A-18B): there are 3 test cell IDs with copper foil thickness of about 6 μm, 15 test cell IDs with copper foil thickness of about 8 μm, and 22 test cell IDs with copper foil thickness of about 10 μm. Among test cell IDs with copper foil thickness of about 6 μm, the rate of passing the cracking test was 0%. The data points corresponding to these failing 6 μm-foil test cell IDs are located in the region between dotted lines 610 and 620. Accordingly, these failing 6 μm-foil test cell IDs may be excluded by (1) adopting the Formula 2 conditions, or by (2) adopting the Formula 1 conditions and additionally excluding copper foil thicknesses of 6 μm or less. Among test cell IDs with copper foil thickness of about 8 μm, the rate of passing the cracking test was 60%. Among test cell IDs with copper foil thickness of about 10 μm, the rate of passing the cracking test was about 59%.

For eight of the copper foils listed in Table 3 (FIGS. 18A-18B), there are two test cell IDs associated with each respective copper foil number because there is a respective test cell ID associated with each of the anode compositions (Si—C nanocomposite particles at 100 wt. % and 50 wt. % relative to all active anode materials). These eight copper foils are referred to as twice-tested copper foils herein. The twice-tested copper foils are foil numbers 3-2-10 (test cell IDs 3, 4), 3-5-10 (test cell IDs 9, 10), 3-8-10 (test cell IDs 13, 14), 3-9-10 (test cell IDs 15, 16), 3-10-10 (test cell IDs 19, 20), 3-11-10 (test cell IDs 23, 24), 3-16-10 (test cell IDs 32, 33), and 3-18-10 (test cell IDs 37, 38). Each of the twice-tested copper foils is about 10 μm in thickness. For each of the twice-tested copper foils, the test cell ID employing anode compositions with Si—C composite particles at 100 wt. % exhibits a greater maximum areal expansion than the test cell ID employing anode compositions with Si—C nanocomposite particles at 50 wt. % relative to all active anode materials (including graphite). A ratio of the greater maximum areal expansion divided by the lesser maximum areal expansion ("maximum areal expansion ratio") ranges between about 2.28 (11.40% divided by 5.00% for copper foil #3-16-10) and about 40 (4.00% divided by 0.10% for copper foil #3-11-10). Surprisingly, both test cells IDs (23, 24) for copper foil #3-11-10, exhibiting the greatest maximum areal expansion ratio, passed the cracking test. Additionally, the second greatest maximum expansion ratio was about 10 (6.00% divided by 0.60%) for copper foil #3-10-10. Surprisingly, both test cells IDs (19, 20) for copper foil #3-10-10, exhibiting the second greatest maximum areal expansion ratio, passed the cracking test, although test cell ID 20 (Si—C composite particles at 100 wt. % of all active anode materials, maximum areal expansion of about 6.00%) exhibited micro cracks. For the cases of the greatest and the second greatest areal expansion ratios (copper foil numbers 3-11-10 and 3-10-10), the test cell IDs satisfy the Formula 1 conditions on the maximum areal expansion and the strain at the UTS. For the cases of the greatest areal expansion ratio (copper foil number 3-11-10), the test cell IDs satisfy the Formula 2 conditions (e.g., a=0.65, b=0.65) on the maximum areal expansion and the strain at the UTS. Additionally, both test cells IDs (37, 38) for copper foil #3-18-10 passed the cracking test, although test cell ID 20 (Si—C nanocomposite particles at 100 wt. % of all active anode materials, maximum areal expansion of about 5.00%) exhibited micro cracks.

A variety of tensile properties is represented among the commercially available copper foils shown in Table 3 (e.g., the UTS in a range of about 255 MPa to about 580 MPa, the strain at the UTS in a range of about 2.2% to about 18%, the strain at break in a range of about 3% to about 20%, the yield strength in a range of about 170 to about 408 MPa, Young's modulus in a range of about 56 to about 88 GPa). The copper foils represented in Table 3 are electrodeposited (ED) copper foils. The copper foils shown in Table 3 represent a sampling of commercially available copper foils and other copper foils may also be used in anode electrode coatings thereon.

ED foils are formed by the deposition of copper ions onto a cathode drum via electrolysis. Alternatively, rolled copper foils may be formed by rolling from a copper block followed by annealing (e.g., in a range of 200 to 400° C., or higher than 400° C. in some circumstances). For example, the annealing temperature and other process conditions may be selected so that the grains are enlarged, while minimizing the oxidation of the copper. The grains in a rolled copper foil tend to be oriented along the longitudinal direction, whereas the grains in an ED foil tend to be oriented along the transverse direction. Therefore, the choice of the manufacturing method affects the microstructure of the thin copper foil which in turn affects the tensile properties of the copper foil. The tensile properties may also be affected by the surface finish of a copper foil. For example, a rolled annealed copper foil may have a lower surface roughness than an ED copper foil. In some cases, the surface roughness may affect the tensile properties. The surface roughness of an ED copper foil may be modified by the addition of certain additive compounds to the copper electrolyte (used during electrolysis). The surface roughness and/or the grain structure of an ED copper foil may also be modified by thermal annealing. A copper foil may include alloying elements (so called impurities) at mass fractions of up to about 1 wt. %, such as beryllium, chromium, zirconium, tin, silver, sulfur, and iron. Such elements affect the tensile properties of the copper foil by changing the grain size and fracture mode.

The maximum areal expansion of the anode is strongly dependent on the areal density (e.g., grams of silicon per $cm^2$ of anode area) of silicon (elemental silicon) in the anode. As the areal density of silicon in the anode increases, the maximum areal expansion increases. The areal density of silicon may be tuned by tuning one or more of the following: (1) average thickness of the anode coating, (2) mass fraction of silicon in the silicon-carbon composite particles, (3) mass fraction of silicon-carbon composite particles in the anode coating, and (4) mass fraction of silicon in the anode coating. Additionally, the maximum areal expansion is dependent on the porosity of the anode coating. The porosity of the anode coating may be tuned by the coating's calendering conditions. For example, a heavily calendered coating would be less porous than a lightly calendered or un-calendered coating and may exhibit a greater maximum areal expansion. Another variable that can affect the expansion of an electrode is the % ductility (strain at break) of the respective copper foil. In some cases, a greater ductility of a copper foil may contribute to a larger maximum areal expansion of an anode coating formed on the respective copper foil.

Anode configurations of Table 3 (e.g., copper foil characteristics, Si—C nanocomposite particles weight fraction relative to all active anode materials) that were determined to have passed the cracking test and did not have any micro edge cracks were further evaluated for integration into stacked pouch cells, wound pouch cells, and/or cylindrical cells. Results of the evaluation are shown in the column named "Form Factor Examples" in Table 3. Some of the anode configurations may be suitable for more than one cell configuration. In some implementations, copper foils for integration into cylindrical cells may exhibit a strain at the UTS of greater than about 9.0% or greater than about 9.5%. In some implementations, copper foils for integration into cylindrical cells may exhibit a strain at the UTS in a range of about 9 to about 20%, or about 9.5 to about 20%, or about 9 to about 18%, or about 9.5 to about 18%. In some implementations, copper foils for integration into wound pouch cells may exhibit a strain at the UTS in a range of about 2 to about 14%, or about 2 to about 13.5%, or about 2.2 to about 14%, or about 2.2 to about 13.5%. In some implementations, copper foils for integration into stacked pouch cells may exhibit a strain at the UTS in a range of about 2 to about 11%, or about 2 to about 10.8%, or about 2.2 to about 11%, or about 2.2 to about 10.8%.

In some implementations, the anode coating includes a lower-capacity material (e.g., material with a capacity of less than about 400 mAh/g, or less than or equal to 400 mAh/g) in addition to the composite particles comprising carbon and silicon. Some examples of lower-capacity material are graphite (e.g., natural or synthetic graphite), hard carbon, soft carbon. In the examples shown in Table 3 (FIGS. 18A, 18B), graphite is employed as the lower-capacity material, at a weight fraction of about 50 wt. % of the anode active material composition (excluding additives such as binder and conductive additives, and also excluding the anode current collector). In some implementations, a lower-capacity material may be employed at a weight fraction in a range of about 1 to about 10 wt. %, or in a range of about 10 to about 20 wt. %, or in a range of about 20 to about 30 wt. %, or in a range, or in a range of about 30 to about 40 wt. %, or in a range of about 40 to about 50 wt. %, or in a range of about 50 to about 60 wt. %, or in range of about 60 to about 70 wt. %, or in a range of about 70 to about 80 wt. %, or in a range of 80 to about 90 wt. %. In the examples listed in Table 3 in which the weight fraction of the Si—C nanocomposite particles is about 50 wt. %, the Si—C nanocomposite particles contribute about 80% of the reversible capacity. The remaining about 20% of the capacity is contributed by the graphite in the active material of the anode coating.

In one aspect, a LIB configured to undergo multiple charging and discharging cycles includes at least one anode component, at least one cathode component, and a separator and an electrolyte interposed between adjacent ones of the anode components and the cathode components. Each of the anode components includes an anode current collector and a respective anode coating on each side of the anode current collector. Each of the cathode components includes a cathode current collector and a respective cathode coating on each side of the cathode current collector. In some embodiments, the anode components and the cathode components are stacked along a stacking direction perpendicular to a plane of the anode components and the cathode components, the anode components and the cathode components alternating along the stacking direction. Such a lithium-ion battery may be referred to as a stacked cell. In some implementations, a lithium-ion battery (e.g., a stacked cell) may be configured as a pouch cell or a prismatic cell.

In another aspect, at least one of the anode components (e.g., in a stacked cell) undergoes a maximum areal expansion in a range of about 0% to about 5.0% (e.g., in some designs, in a range of about 0% to about 3.5%) during one or multiple charging and discharging cycles. In some implementations, the strain of the anode current collector foil (e.g., Cu foil) at UTS is from about 4% to about 400% (in some implementations, from about 6% to about 40%). In some implementations, the maximum areal expansion in an anode (or at least one of the anode components) is in a range of about 0.1% to about 3.5%. In some implementations (e.g., for 0.1-3.5% areal expansion, among others), the strain of the anode current collector foil (e.g., Cu foil) at UTS may preferably be from about 6% to about 40% (in some implementations, from about 8% to about 30%). In some implementations, the maximum areal expansion in an anode (or at least one of the anode components) is in a range of about 0.1% to about 2%. In other designs, the maximum areal expansion in an anode (or at least one of the anode components) is in a range of about 0.1% to about 2%). In some implementations, the maximum areal expansion in an anode (or at least one of the anode components) is in a range of about 1% to about 2%. In some implementations (e.g., for 1-2% areal expansion, among others), the strain of the anode current collector foil (e.g., Cu foil) at UTS may preferably be from about 4% to about 100% (in some implementations, from about 8% to about 30%). In some implementations, the maximum areal expansion in an anode (or at least one of the anode components) is in a range of about 2% to about 3.5%. In some implementations (e.g., for 2-3.5% areal expansion), the strain of the anode current collector foil (e.g., Cu foil) at UTS may preferably be from about 8% to about 200% (in some implementations, from about 10% to about 40%; in yet some implementations, from about 12% to about 25%).

In yet another aspect, at least one of the anode coatings of the at least one of the anode components (e.g., of a stacked cell) may include silicon-carbon composite particles (or, more broadly, silicon oxide-silicon-carbon composite particles or silicon oxide-carbon composite particles or other silicon element-comprising and carbon element-comprising composite particles), which may comprise silicon nanoparticles. In some implementations, a weight fraction of silicon (element) in the at least one anode coating may be in a range of about 5 wt. % to about 70 wt. %. In some implementations, the weight fraction of silicon may be in a range of about 5 wt. % to about 25 wt. %. In some implementations, the weight fraction of silicon may be in a range of about 25 wt. % to about 40 wt. %. In some implementations, the weight fraction of silicon may be in a range of about 40 wt. % to about 55 wt. %. In some implementations, the weight fraction of silicon may be in a range of about 55 wt. % to about 70 wt. %.

In yet another aspect, the anode current collector of the at least one of the anode components (e.g., of a stacked cell) includes a copper foil. The copper foil (or, more broadly, copper-dominant alloy foil with copper element content in excess of about 80 wt. %; in some designs—in excess of about 90 wt. %; in yet some designs—in excess of about 95 wt. %) is characterized, before the respective anode coatings are formed thereon, by a yield strength of at least about 220 MPa. In some implementations, the yield strength is in a range of about 220 MPa to about 700 MPa (in some designs, from about 220 MPa to about 350 MPa; in other designs, from about 350 MPa to about 500 MPa; in yet other designs, from about 500 to about 700 MPa). In some implementations, the copper foil is an electrodeposited copper foil. In some implementations, a thickness of the copper foil is in a range of about 6 μm to about 12 μm. In some implementations, the thickness of the copper foil is in a range of about 6 μm to about 8 μm. In some implementations, the thickness of the copper foil is in a range of about 8 μm to about 10 μm. In some implementations, the thickness of the copper foil is in a range of about 10 μm to about 12 μm.

In yet another aspect, areal capacity loading of the at least one of the anode coatings (e.g., of a stacked cell) is in a range of about 2 $mAh/cm^2$ to about 20 $mAh/cm^2$ (in some designs, from about 2 $mAh/cm^2$ to about 4 $mAh/cm^2$; in other designs, from about 4 $mAh/cm^2$ to about 6 $mAh/cm^2$; in other designs, from about 6 $mAh/cm^2$ to about 8 $mAh/cm^2$; in other designs, from about 8 $mAh/cm^2$ to about 10 mAh/cm2; in other designs, from about 10 $mAh/cm^2$ to about 14 $mAh/cm^2$; in other designs, from about 14 $mAh/cm^2$ to about 20 $mAh/cm^2$).

In some implementations, the at least one of the anode coatings includes graphite (e.g., natural or synthetic graphite) or hard carbon or soft carbon. In some implementations, the at least one of the anode coatings includes a binder, which may, in some designs, advantageously comprise a styrene-butadiene rubber or another styrene-comprising rubber. In some implementations, the at least one of the anode coatings may include a buffer layer. In some implementations, a thickness of the at least one of the anode coatings is in a range of about 25 μm to about 200 μm (in some designs, in a range of about 25 μm to about 40 μm; in other designs, in a range of about 40 μm to about 70 μm; in other designs, in a range of about 70 μm to about 100 μm; in other designs, in a range of about 100 μm to about 150 μm; in other designs, in a range of about 150 μm to about 200 μm).

In yet another aspect, a lithium-ion battery (e.g., stacked cell) includes (1) a wrapper wrapped around the anode components and the cathode components and (2) a container. In some implementations, the anode components, the cathode components, the separator, the electrolyte, and the wrapper are sealed in the container. In some implementations, the wrapper includes an adhesive tape adhered to at least some portion of the anode components and/or the cathode components.

In yet another aspect, the at least one anode component (e.g., of a stacked cell) includes a plurality of anode components. In some implementations, the respective anode current collectors are electronically coupled to each other. In some implementations, the separator is discontiguous (e.g., separator layers are not joined together).

In yet another aspect, the at least one cathode component (e.g., of a stacked cell) includes a plurality of cathode components. In some implementations, the respective cathode current collectors are electronically coupled to each other. In some implementations, the separator is discontiguous.

In yet another aspect, a lithium-ion battery configured to undergo multiple charging and discharging cycles includes an anode component, a cathode component, and at least one separator and an electrolyte interposed between the anode component and the cathode component. The anode component includes an anode current collector and a respective anode coating on each side of the anode current collector. The cathode component includes a cathode current collector and a respective cathode coating on each side of the cathode current collector. In some embodiments, the anode component, the cathode component, and the at least one separator are wound a common core. Such a lithium-ion battery may be referred to as a wound cell. In some implementations, a lithium-ion battery (e.g., a wound cell) may be configured as a cylindrical cell, a coin cell, a prismatic cell, a pouch cell or a jelly roll cell.

In yet another aspect, the anode current collector (e.g., of a wound cell; in some designs, of a cylindrical cell) includes a copper foil. In some implementations, the copper foil is characterized, before the respective anode coatings are formed thereon, by (1) a yield strength in a range of about 100 MPa to about 400 MPa, and/or (2) an elongation at break parameter in a range of about 4% to about 20%. In some implementations, the yield strength is in a range of 100 MPa to 200 MPa. In other implementations, the yield strength is in a range of about 200 MPa to about 300 MPa. In other implementations, the yield strength is in a range of about 300 MPa to about 400 MPa. In some implementations, the elongation at break parameter is in a range of about 4% to about 7.5%. In some implementations, the elongation at break parameter is in a range of about 7.5% to about 13%. In some implementations, the copper foil is an electrodeposited copper foil. In some implementations, the elongation at break parameter is in a range of about 13% to about 20%. In some implementations, a thickness of the copper foil is in a range of about 6 μm to about 12 μm. In some implementations, the thickness of the copper foil is in a range of about 6 μm to about 8 μm. In some implementations, the thickness of the copper foil is in a range of 8 μm to 10 μm. In some implementations, the thickness of the copper foil is in a range of about 10 μm to about 12 μm.

In yet another aspect, at least one of the anode coatings of the at least one of the anode components (e.g., of a wound cell; in some designs, of a cylindrical cell) includes silicon-carbon composite particles (or, more broadly, silicon oxide-silicon-carbon composite particles or silicon oxide-carbon composite particles or other silicon element-comprising and carbon element-comprising composite particles), which may include silicon nanoparticles. In some implementations, a weight fraction of (elemental) silicon in the at least one anode coating (e.g., elemental Si in Si—C(nano)composite anode particles) may be in a range of about 5 wt. % to about 70 wt. %. In some implementations, the weight fraction of silicon may be in a range of about 5 wt. % to about 15 wt. %. In some implementations, the weight fraction of silicon may be in a range of about 15 wt. % to about 25 wt. %. In some implementations, the weight fraction of silicon may be in a range of about 25 wt. % to about 40 wt. %. In some implementations, the weight fraction of silicon may be in a range of about 40 wt. % to about 55 wt. %. In some implementations, the weight fraction of silicon may be in a range of about 55 wt. % to about 70 wt. %.

In yet another aspect, a capacity loading of the at least one of the anode coatings (e.g., of a wound cell; in some designs, of a cylindrical cell) is in a range of about 2 mAh/cm$^2$ to about 20 mAh/cm$^2$ (in some designs, from about 2 mAh/cm$^2$ to about 4 mAh/cm$^2$; in other designs, from about 4 mAh/cm$^2$ to about 6 mAh/cm$^2$; in other designs, from about 6 mAh/cm$^2$ to about 8 mAh/cm$^2$; in other designs, from about 8 mAh/cm$^2$ to about 10 mAh/cm$^2$; in other designs, from about 10 mAh/cm$^2$ to about 14 mAh/cm$^2$; in other designs, from about 14 mAh/cm$^2$ to about 20 mAh/cm$^2$).

In some implementations, the at least one of the anode coatings includes graphite (e.g., natural or synthetic graphite) or hard carbon or soft carbon. In some implementations, the at least one of the anode coatings may include a binder comprising a styrene-butadiene rubber. In some implementations, the at least one of the anode coatings may include a buffer layer. In some implementations, a thickness of the at least one of the anode coatings is in a range of about 25 μm to about 200 μm (in some designs, in a range of about 25 μm to about 40 μm; in other designs, in a range of about 40 μm to about 70 μm; in other designs, in a range of about 70 μm to about 100 μm; in other designs, in a range of about 100 μm to about 150 μm; in other designs, in a range of about 150 μm to about 200 μm).

In yet another aspect, a lithium-ion battery (e.g., wound cell) may include a container. In some implementations, the anode component, the cathode component, the at least one separator, and the electrolyte are sealed in the container.

In yet another aspect, a method of making a lithium-ion battery configured to undergo multiple charging and discharging cycles is disclosed. The method includes (A1), (A2), (A3), and (A4). (A1) includes providing at least one anode component. Each of the anode components includes an anode current collector and a respective anode coating on each side of the anode current collector. (A2) includes providing at least one cathode component. Each of the cathode components includes a cathode current collector and a respective cathode coating on each side of the cathode current collector. (A3) includes stacking the anode components and the cathode components along a stacking direction perpendicular to a plane of the anode components and the cathode components. The anode components and the cathode components alternate along the stacking direction. A separator is interposed between adjacent ones of the anode components and the cathode components. (A4) includes infiltrating an electrolyte between adjacent ones of the anode components and the cathode components. Such a method may be referred to as a method of making a stacked cell. In some implementations, a lithium-ion battery (e.g., according to a method of making a stacked cell) may be configured as a pouch cell or a prismatic cell or a coin cell. In some implementations, (A1) includes providing a roll of the suitable anode current collector, forming the respective anode coatings on the roll of the anode current collector, and forming the anode component from the roll of the anode current collector and the anode coatings.

In yet another aspect, at least one of the anode components (e.g., according to a method of making a stacked cell) undergoes a maximum areal expansion in a range of about 0% to about 5.5% during one or the multiple charging and discharging cycles. In some implementations, the maximum areal expansion is in a range of about 0% to about 3.5%. In some implementations, the maximum areal expansion is in a range of about 0% to about 2%. In some implementations, the maximum areal expansion is in a range of about 1% to about 2%. In some implementations, the maximum areal expansion is in a range of about 2% to about 3.5%.

In yet another aspect, at least one of the anode coatings of the at least one of the anode components (e.g., according to a method of making a stacked cell) includes silicon-carbon composite particles (or, more broadly, silicon oxide-silicon-carbon composite particles or silicon oxide-carbon composite particles or other silicon element-comprising and carbon element-comprising composite particles), which may include silicon nanoparticles. In some implementations, a weight fraction of (elemental) silicon in the at least one anode coating (e.g., elemental Si in Si—C(nano)composite anode particles) may be in a range of about 5 wt. % to about 70 wt. %. In some implementations, the weight fraction of silicon may be in a range of about 5 wt. % to about 25 wt. %. In some implementations, the weight fraction of silicon may be in a range of about 25 wt. % to about 55 wt. %. In some implementations, the weight fraction of silicon may be in a range of about 55 wt. % to about 70 wt. %.

In yet another aspect, the anode current collector of the at least one of the anode components (e.g., according to a method of making a stacked cell) includes a copper foil (or, more broadly, copper-dominant alloy foil with copper element content in excess of about 80 wt. %; in some designs—in excess of about 90 wt. %; in yet some designs—in excess of about 95 wt. %). The copper foil is characterized, before the respective anode coatings are formed thereon, by a yield strength of at least about 220 MPa. In some implementations, the yield strength is in a range of about 220 MPa to about 700 MPa (in some designs, from about 220 MPa to about 400 MPa; in other designs, from about 400 MPa to about 600 MPa; in other designs, from about 600 MPa to about 700 MPa). In some implementations, the copper foil is an electrodeposited copper foil. In some implementations, a thickness of the copper foil is in a range of about 6 μm to about 12 μm. In some implementations, the thickness of the copper foil is in a range of about 6 μm to about 8 μm. In some implementations, the thickness of the copper foil is in a range of 8 μm to 10 μm. In some implementations, the thickness of the copper foil is in a range of about 10 μm to about 12 μm.

In yet another aspect, a capacity loading of the at least one of the anode coatings (e.g., according to a method of making a stacked cell) is in a range of about 2 $mAh/cm^2$ to about 20 $mAh/cm^2$ (in some designs, from about 2 $mAh/cm^2$ to about 4 $mAh/cm^2$; in other designs, from about 4 $mAh/cm^2$ to about 6 $mAh/cm^2$; in other designs, from about 6 $mAh/cm^2$ to about 8 $mAh/cm^2$; in other designs, from about 8 $mAh/cm^2$ to about 10 $mAh/cm^2$; in other designs, from about 10 $mAh/cm^2$ to about 14 $mAh/cm^2$; in other designs, from about 14 $mAh/cm^2$ to about 20 $mAh/cm^2$). In some implementations, the at least one of the anode coatings includes graphite (or soft or hard carbon or their various mixtures). In some implementations, the at least one of the anode coatings includes a binder, which may comprise a styrene-butadiene rubber. In some implementations, the at least one of the anode coatings includes a buffer layer. In some implementations, a thickness of the at least one of the anode coatings is in a range of about 25 μm to about 200 μm (in some designs, in a range of about 25 μm to about 40 μm; in other designs, in a range of about 40 μm to about 70 μm; in other designs, in a range of about 70 μm to about 100 μm; in other designs, in a range of about 100 μm to about 150 μm; in other designs, in a range of about 150 μm to about 200 μm).

In yet another aspect, a method of making a lithium-ion battery (e.g., a method of making a stacked cell) additionally includes (B1) and (B2). (B1) includes wrapping a wrapper around the anode components and the cathode components. (B2) includes sealing the anode components, the cathode components, the separator, the electrolyte, and the wrapper in a container. In some implementations, the anode components, the cathode components, the separator, the electrolyte, and the wrapper are sealed in the container. In some implementations, the wrapper includes an adhesive tape adhered to at least some portion of the anode components and/or the cathode components.

In yet another aspect, the at least one anode component (e.g., according to a method of making a stacked cell) includes a plurality of anode components. In some implementations, the method of making a lithium-ion battery (e.g., a method of making a stacked cell) additionally includes electronically coupling the respective anode current collectors to each other. In some implementations, the separator is discontiguous.

In yet another aspect, the at least one cathode component (e.g., according to a method of making a stacked cell) includes a plurality of cathode components. In some implementations, the method of making a lithium-ion battery (e.g., a method of making a stacked cell) additionally includes electronically coupling the respective cathode current collectors to each other. In some implementations, the separator is discontiguous.

In yet another aspect, a method of making a lithium-ion battery configured to undergo multiple charging and discharging cycles is disclosed. The method includes (C1), (C2), (C3), and (C4). (C1) includes providing an anode component including an anode current collector and a respective anode coating on each side of the anode current collector. (C2) includes providing a cathode component including a cathode current collector and a respective cathode coating on each side of the cathode current collector. (C3) includes winding the anode component, the cathode component, and at least one separator interposed between the anode component and the cathode component around a common core. (C4) includes infiltrating an electrolyte between the anode component and the cathode component. Such a method may be referred to as a method of making a wound cell. In some implementations, a lithium-ion battery (e.g., according to a method of making a wound cell) may be configured as a cylindrical cell, a coin cell, or a jelly roll cell. In some implementations, (C1) includes providing a roll of the anode current collector, forming the respective anode coatings on the roll of the anode current collector, and forming the anode component from the roll of the anode current collector and the anode coatings.

In yet another aspect, the anode current collector (e.g., according to a method of making a wound cell) includes a copper foil. In some implementations, the copper foil (or, more broadly, copper-dominant alloy foil with copper element content in excess of about 80 wt. %; in some designs—in excess of about 90 wt. %; in yet some designs—in excess of about 95 wt. %) is characterized, before the respective anode coatings are formed thereon, by (1) a yield strength in a range of about 100 MPa to about 400 MPa, and/or (2) an elongation at break parameter in a range of about 4% to about 20%. In some implementations, the yield strength is in a range of about 100 MPa to about 250 MPa. In some implementations, the elongation at break parameter is in a range of about 7.5% to about 13%. In some implementations, the copper foil is an electrodeposited copper foil. In some implementations, a thickness of the copper foil is in a range of about 6 μm to about 12 μm. In some implementations, a thickness of the copper foil is in a range of about 7 μm to about 12 μm. In some implementations, the thickness of the copper foil is in a range of about 6 μm to about 8 μm. In some implementations, the thickness of the copper foil is in a range of about 8 μm to about 10 μm. In some implementations, the thickness of the copper foil is in a range of about 10 μm to about 12 μm.

In yet another aspect, at least one of the anode coatings of the anode component (e.g., according to a method of making a wound cell) includes silicon-carbon composite particles (or, more broadly, silicon oxide-silicon-carbon composite particles or silicon oxide-carbon composite particles or other silicon element-comprising and carbon element-comprising composite particles), which may comprise silicon nanoparticles. In some implementations, a weight fraction of (elemental) silicon in the at least one anode coating (e.g., elemental Si in Si—C(nano)composite anode particles) may be in a range of about 5 wt. % to about 70 wt. %. In some implementations, the weight fraction of silicon may be in a range of about 5 wt. % to about 25 wt. %. In some implementations, the weight fraction of silicon may be in a range of about 25 wt. % to about 40 wt. %. In some implementations, the weight fraction of silicon may be in a range of about 40 wt. % to about 55 wt. %. In some implementations, the weight fraction of silicon may be in a range of about 55 wt. % to about 70 wt. %.

In yet another aspect, areal capacity loading of the at least one of the anode coatings (e.g., according to a method of making a wound cell) is in a range of about 2 $mAh/cm^2$ to about 20 $mAh/cm^2$ (in some designs, from about 2 $mAh/cm^2$ to about 4 $mAh/cm^2$; in other designs, from about 4 $mAh/cm^2$ to about 6 $mAh/cm^2$; in other designs, from about 6 $mAh/cm^2$ to about 8 $mAh/cm^2$; in other designs, from about 8 $mAh/cm^2$ to about 10 $mAh/cm^2$; in other designs, from about 10 $mAh/cm^2$ to about 14 $mAh/cm^2$; in other designs, from about 14 $mAh/cm^2$ to about 20 $mAh/cm^2$). In some implementations, the at least one of the anode coatings includes graphite (e.g., natural or synthetic graphite) or hard carbon or soft carbon. In some implementations, the at least one of the anode coatings includes a binder, which may, in some designs, advantageously comprise a styrene-butadiene rubber. In some implementations, the at least one of the anode coatings includes a buffer layer. In some implementations, a thickness of the at least one of the anode coatings is in a range of 25 μm to 200 μm (in some designs, in a range of about 25 μm to about 40 μm; in other designs, in a range of about 40 μm to about 70 μm; in other designs, in a range of about 70 μm to about 100 μm; in other designs, in a range of about 100 μm to about 150 μm; in other designs, in a range of about 150 μm to about 200 μm).

In another aspect, at least one of the anode components (e.g., in a wound cell; in some designs, in a cylindrical cell) undergoes a maximum areal expansion in a range of about 0% to about 5.0% during one or multiple charging and discharging cycles. In some implementations, the strain of the anode current collector foil (e.g., Cu foil) at UTS is from about 4% to about 400% (in some implementations, from about 6% to about 40%). In some implementations, the maximum areal expansion in an anode (or at least one of the anode components) is in a range of about 0.1% to about 3.5%. In some implementations (e.g., for 0.1-3.5% areal expansion), the strain of the anode current collector foil (e.g., Cu foil) at UTS may preferably be from about 6% to about 40% (in some implementations, from about 8% to about 30%). In some implementations, the maximum areal expansion in an anode (or at least one of the anode components) is in a range of about 0.1% to about 2%. In some implementations, the maximum areal expansion in an anode (or at least one of the anode components) is in a range of about 1% to about 2%. In some implementations (e.g., for 1-2% areal expansion), the strain of the anode current collector foil (e.g., Cu foil) at UTS may preferably be from about 4% to about 100% (in some implementations, from about 8% to about 30%). In some implementations, the maximum areal expansion in an anode (or at least one of the anode components) is in a range of about 2% to about 3.5%. In some implementations (e.g., for 2-3.5% areal expansion), the strain of the anode current collector foil (e.g., Cu foil) at UTS may preferably be from about 8% to about 200% (in some implementations, from about 10% to about 40%; in yet some implementations, from about 12% to about 25%).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A lithium-ion battery configured to undergo multiple charging and discharging cycles, comprising: at least one anode component, each of the anode components comprising an anode current collector and a respective anode coating on each side of the anode current collector; at least one cathode component, each of the cathode components comprising a cathode current collector and a respective cathode coating on each side of the cathode current collector; and a separator and an electrolyte interposed between adjacent ones of the anode components and the cathode components, wherein: the anode components and the cathode components are stacked along a stacking direction perpendicular to a plane of the anode components and the cathode components, the anode components and the cathode components alternating along the stacking direction; at least one of the anode components undergoes a maximum areal expansion in a range of about 0% to about 3.5% during the multiple charging and discharging cycles; at least one of the anode coatings of the at least one of the anode components comprises silicon-carbon composite particles including silicon nanoparticles, a weight fraction of (elemental) silicon in the at least one anode coating (e.g., elemental Si in Si—C(nano)composite anode particles) being in a range of about 5 wt. % to about 70 wt. %; and the anode current collector of the at least one of the anode components comprises a copper foil, the copper foil being characterized, before the respective anode coatings are formed thereon, by a yield strength of at least about 220 MPa.

Clause 2. The lithium-ion battery of clause 1, wherein: the weight fraction of silicon is in a range of about 15 wt. % to about 65 wt. %.

Clause 3. The lithium-ion battery of clause 2, wherein: the weight fraction of silicon is in a range of about 25 wt. % to about 60 wt. %.

Clause 4. The lithium-ion battery of clause 3, wherein: the weight fraction of silicon is in a range of about 35 wt. % to about 55 wt. %.

Clause 5. The lithium-ion battery of any of clauses 1 to 4, wherein: the copper foil is an electrodeposited copper foil.

Clause 6. The lithium-ion battery of any of clauses 1 to 5, wherein: the maximum areal expansion is in a range of about 0% to about 2%.

Clause 7. The lithium-ion battery of any of clauses 1 to 6, wherein: the yield strength is in a range of about 220 MPa to about 600 MPa.

Clause 8. The lithium-ion battery of any of clauses 1 to 7, wherein: the lithium-ion battery comprises (1) a wrapper wrapped around the anode components and the cathode components and (2) a container; and the anode components, the cathode components, the separator, the electrolyte, and the wrapper are sealed in the container.

Clause 9. The lithium-ion battery of clause 8, wherein: the wrapper comprises an adhesive tape adhered to at least some portion of the anode components and/or the cathode components.

Clause 10. The lithium-ion battery of any of clauses 1 to 9, wherein: the at least one anode component comprises a plurality of anode components; and the respective anode current collectors are electronically coupled to each other.

Clause 11. The lithium-ion battery of any of clauses 1 to 10, wherein: the at least one cathode component comprises a plurality of cathode components; and the respective cathode current collectors are electronically coupled to each other.

Clause 12. The lithium-ion battery of any of clauses 1 to 11, wherein: the at least one anode component comprises a plurality of anode components; the at least one cathode component comprises a plurality of cathode components; and the separator is discontiguous.

Clause 13. The lithium-ion battery of any of clauses 1 to 12, wherein: a thickness of the copper foil is in a range of about 7 μm to about 12 μm.

Clause 14. The lithium-ion battery of clause 13, wherein: the thickness of the copper foil is in a range of about 8 μm to about 10 μm.

Clause 15. The lithium-ion battery of any of clauses 1 to 14, wherein: a thickness of the at least one of the anode coatings is in a range of about 25 μm to about 75 μm.

Clause 16. The lithium-ion battery of any of clauses 1 to 15, wherein: a capacity loading of the at least one of the anode coatings is in a range of about 2 $mAh/cm^2$ to about 10 $mAh/cm^2$.

Clause 17. The lithium-ion battery of any of clauses 1 to 16, wherein: the at least one of the anode coatings comprises graphite.

Clause 18. The lithium-ion battery of any of clauses 1 to 17, wherein: the lithium-ion battery is configured as a pouch cell, a prismatic cell, or a coin cell.

Clause 19. The lithium-ion battery of any of clauses 1 to 18, wherein: the at least one of the anode coatings comprises a binder comprising a styrene-butadiene rubber.

Clause 20. The lithium-ion battery of any of clauses 1 to 19, wherein: the at least one of the anode coatings comprises a buffer layer.

Clause 21. A lithium-ion battery configured to undergo multiple charging and discharging cycles, comprising: an anode component comprising an anode current collector and a respective anode coating on each side of the anode current collector; a cathode component comprising a cathode current collector and a respective cathode coating on each side of the cathode current collector; and at least one separator and an electrolyte interposed between the anode component and the cathode component; wherein: the anode component, the cathode component, and the at least one separator are wound around a common core; at least one of the anode coatings comprises silicon-carbon composite particles including silicon nanoparticles, a weight fraction of (elemental) silicon in the at least one anode coating (e.g., elemental Si in Si—C(nano)composite anode particles) being in a range of about 5 wt. % to about 70 wt. %; and the anode current collector comprises a copper foil, the copper foil being characterized, before the respective anode coatings are formed thereon, by (1) a yield strength in a range of about 100 MPa to about 400 MPa, and (2) an elongation at break parameter in a range of about 4% to about 20%.

Clause 22. The lithium-ion battery of clause 21, wherein: the weight fraction of silicon is in a range of about 15 wt. % to about 65 wt. %.

Clause 23. The lithium-ion battery of clause 22, wherein: the weight fraction of silicon is in a range of about 25 wt. % to about 60 wt. %.

Clause 24. The lithium-ion battery of clause 23, wherein: the weight fraction of silicon is in a range of about 35 wt. % to about 55 wt. %.

Clause 25. The lithium-ion battery of any of clauses 21 to 24, wherein: the copper foil is an electrodeposited copper foil.

Clause 26. The lithium-ion battery of any of clauses 21 to 25, wherein: the yield strength is in a range of about 100 MPa to about 250 MPa.

Clause 27. The lithium-ion battery of any of clauses 21 to 26, wherein: the elongation at break parameter is in a range of about 7.5% to about 13%.

Clause 28. The lithium-ion battery of any of clauses 21 to 27, wherein: the lithium-ion battery comprises a container; and the anode component, the cathode component, the at least one separator, and the electrolyte are sealed in the container.

Clause 29. The lithium-ion battery of any of clauses 21 to 28, wherein: a thickness of the copper foil is in a range of about 7 μm to about 12 μm.

Clause 30. The lithium-ion battery of clause 29, wherein: the thickness of the copper foil is in a range of about 8 μm to about 10 μm.

Clause 31. The lithium-ion battery of any of clauses 21 to 30, wherein: a thickness of the at least one of the anode coatings is in a range of about 25 μm to about 75 μm.

Clause 32. The lithium-ion battery of any of clauses 21 to 31, wherein: a capacity loading of the at least one of the anode coatings is in a range of about 2 $mAh/cm^2$ to about 10 $mAh/cm^2$.

Clause 33. The lithium-ion battery of any of clauses 21 to 32, wherein: the at least one of the anode coatings comprises graphite.

Clause 34. The lithium-ion battery of any of clauses 21 to 33, wherein: the lithium-ion battery is configured as a cylindrical cell, a coin cell, or a jelly roll cell.

Clause 35. The lithium-ion battery of any of clauses 21 to 34, wherein: the at least one of the anode coatings comprises a binder comprising a styrene-butadiene rubber.

Clause 36. The lithium-ion battery of any of clauses 21 to 35, wherein: the at least one of the anode coatings comprises a buffer layer.

Clause 37. A method of making a lithium-ion battery configured to undergo multiple charging and discharging cycles, the method comprising: (A1) providing at least one anode component, each of the anode components comprising an anode current collector and a respective anode coating on each side of the anode current collector; (A2) providing at least one cathode component, each of the cathode components comprising a cathode current collector and a respective cathode coating on each side the cathode current collector; (A3) stacking the anode components and the cathode components along a stacking direction perpendicular to a plane of the anode components and the cathode components, the anode components and the cathode components alternating along the stacking direction, a separator being interposed between adjacent ones of the anode components and the cathode components; (A4) infiltrating an electrolyte between adjacent ones of the anode components and the cathode components, wherein: at least one of the anode components undergoes a maximum areal expansion in a range of about 0% to about 3.5% during the multiple charging and discharging cycles; at least one of the anode coatings of the at least one of the anode components comprises silicon-carbon composite particles including silicon nanoparticles, a weight fraction of silicon in the at least one of the anode coatings being in a range of about 5 wt. % to about 70 wt. %; and the anode current collector of the at least one of the anode components comprises a copper foil, the copper foil being characterized, before the respective anode coatings are formed thereon, by a yield strength of at least about 220 MPa.

Clause 38. The method of clause 37, wherein: (A1) comprises providing a roll of the anode current collector, forming the respective anode coatings on the roll of the anode current collector, and forming the at least one anode component from the roll of the anode current collector and the anode coatings.

Clause 39. The method of any of clauses 37 to 38, wherein: the weight fraction of silicon is in a range of about 15 wt. % to about 65 wt. %.

Clause 40. The method of clause 39, wherein: the weight fraction of silicon is in a range of about 25 wt. % to about 60 wt. %.

Clause 41. The method of clause 40, wherein: the weight fraction of silicon is in a range of about 35 wt. % to about 55 wt. %.

Clause 42. The method of any of clauses 37 to 41, wherein: the copper foil is an electrodeposited copper foil.

Clause 43. The method of any of clauses 37 to 42, wherein: the maximum areal expansion is in a range of about 0% to about %.

Clause 44. The method of any of clauses 37 to 43, wherein: the yield strength is in a range of about 220 MPa to about 600 MPa.

Clause 45. The method of any of clauses 37 to 44, additionally comprising: (B1) wrapping a wrapper around the anode components and the cathode components; (B2) sealing the anode components, the cathode components, the separator, the electrolyte, and the wrapper in a container.

Clause 46. The method of clause 45, wherein: the wrapper comprises an adhesive tape adhered to at least some portion of the anode components and/or the cathode components.

Clause 47. The method of any of clauses 37 to 46, wherein: the at least one anode component comprises a plurality of anode components; and the method additionally comprises electronically coupling the respective anode current collectors to each other.

Clause 48. The method of any of clauses 37 to 47, wherein: the at least one cathode component comprises a plurality of cathode components; and the method additionally comprises electronically coupling the respective cathode current collectors to each other.

Clause 49. The method battery of any of clauses 37 to 48, wherein: the at least one anode component comprises a plurality of anode components; the at least one cathode component comprises a plurality of cathode components; and the separator is discontiguous.

Clause 50. The method of any of clauses 37 to 49, wherein: a thickness of the copper foil is in a range of about 7 μm to about 12 μm.

Clause 51. The method of clause 50, wherein: the thickness of the copper foil is in a range of about 8 μm to about 10 μm.

Clause 52. The method of any of clauses 37 to 51, wherein: a thickness of the at least one of the anode coatings is in a range of about 25 μm to about 75 μm.

Clause 53. The method of any of clauses 37 to 52, wherein: a capacity loading of the at least one of the anode coatings is in a range of about 2 $mAh/cm^2$ to about 10 $mAh/cm^2$.

Clause 54. The method of any of clauses 37 to 53, wherein: the at least one of the anode coatings comprises graphite.

Clause 55. The method of any of clauses 37 to 54, wherein: the lithium-ion battery is configured as a pouch cell or a prismatic cell.

Clause 56. The method of any of clauses 37 to 55, wherein: the at least one of the anode coatings comprises a binder comprising a styrene-butadiene rubber.

Clause 57. The method of any of clauses 37 to 56, wherein: the at least one of the anode coatings comprises a buffer layer.

Clause 58. A method of making a lithium-ion battery configured to undergo multiple charging and discharging cycles, the method comprising: (C1) providing an anode component comprising an anode current collector and a respective anode coating on each side of the anode current collector; (C2) providing a cathode component comprising a cathode current collector and a respective cathode coating on each side of the cathode current collector; (C3) winding the anode component, the cathode component, and at least one separator interposed between the anode component and the cathode component around a common core; and (C4) infiltrating an electrolyte between the anode component and the cathode component, wherein: at least one of the anode coatings comprises silicon-carbon composite particles including silicon nanoparticles, a weight fraction of silicon in the at least one of the anode coatings being in a range of about 5 wt. % to about 70 wt. %; and the anode current collector comprises a copper foil, the copper foil being characterized, before the respective anode coatings are formed thereon, by (1) a yield strength in a range of about 100 MPa to about 400 MPa, and (2) an elongation at break parameter in a range of about 4% to about 20%.

Clause 59. The method of clause 58, wherein: (C1) comprises providing a roll of the anode current collector, forming the respective anode coatings on the roll of the anode current collector, and forming the anode component from the roll of the anode current collector and the anode coatings.

Clause 60. The method of any of clauses 58 to 59, wherein: the weight fraction of silicon is in a range of about 15 wt. % to about 65 wt. %.

Clause 61. The method of clause 60, wherein: the weight fraction of silicon is in a range of about 25 wt. % to about 60 wt. %.

Clause 62. The method of clause 61, wherein: the weight fraction of silicon is in a range of about 35 wt. % to about 55 wt. %.

Clause 63. The method of any of clauses 58 to 62, wherein: the copper foil is an electrodeposited copper foil.

Clause 64. The method of any of clauses 58 to 63, wherein: the yield strength is in a range of about 100 MPa to about 250 MPa.

Clause 65. The method of any of clauses 58 to 64, wherein: the elongation at break parameter is in a range of about 7.5% to about 13%.

Clause 66. The method of any of clauses 58 to 65, additionally comprising: sealing the anode component, the cathode component, the at least one separator, and the electrolyte in a container.

Clause 67. The method of any of clauses 58 to 66, wherein: a thickness of the copper foil is in a range of about 7 μm to about 12 μm.

Clause 68. The method of clause 67, wherein: the thickness of the copper foil is in a range of about 8 μm to about 10 μm.

Clause 69. The method of any of clauses 58 to 68, wherein: a thickness of the at least one of the anode coatings is in a range of about 25 μm to about 75 μm.

Clause 70. The method of any of clauses 58 to 69, wherein: a capacity loading of the at least one of the anode coatings is in a range of about 2 $mAh/cm^2$ to about 10 $mAh/cm^2$.

Clause 71. The method of any of clauses 58 to 70, wherein: the at least one of the anode coatings comprises graphite.

Clause 72. The method of any of clauses 58 to 71, wherein: the lithium-ion battery is configured as a cylindrical cell, a coin cell, or a jelly roll cell.

Clause 73. The method of any of clauses 58 to 72, wherein: the at least one of the anode coatings comprises a binder comprising a styrene-butadiene rubber.

Clause 74. The method of any of clauses 54 to 73, wherein: the at least one of the anode coatings comprises a buffer layer.

Further implementation examples are described in the following numbered Further Clauses:

Further Clause 1. A lithium-ion battery configured to undergo multiple charging and discharging cycles, comprising: an anode component, comprising an anode current collector and a respective anode coating on each side of the anode current collector; a cathode component, comprising a cathode current collector and a respective cathode coating on each side of the cathode current collector; a separator interposed between the anode component and the cathode component; and an electrolyte infiltrated in the separator between the anode component and the cathode component, wherein: the anode coatings comprise composite particles comprising carbon and silicon, a mass fraction of the silicon in the composite particles of the anode coatings being in a range of about 5 wt. % to about 70 wt. % of the anode coatings; the anode component undergoes a maximum areal expansion ($A_{max}$) during the multiple charging and discharging cycles, expressed as a percentage of an area of the anode component before the multiple charging and discharging cycles; the anode current collector comprises a copper foil, the copper foil being characterized, before the respective anode coatings are formed thereon, by an ultimate tensile stress (UTS) and a strain at the UTS ($\varepsilon_{UTS}$), expressed in %; and the maximum areal expansion and the strain at the UTS are related as follows:

$$A_{max} \leq \varepsilon_{UTS} \quad \text{(Formula 1).}$$

Further Clause 2. The lithium-ion battery of clause 1, wherein: the maximum areal expansion and the strain at the UTS are related as follows:

$$A_{max} \leq a\varepsilon_{UTS} - b \quad \text{(Formula 2);}$$

a is in a range of about 0.6 to about 1.0; and b is in a range of about 0.0 to about 0.7

Further Clause 3. The lithium-ion battery of clause 2, wherein: the a is in a range of about 0.6 to about 0.7; and the b is in a range of about 0.6 to about 0.7.

Further Clause 4. The lithium-ion battery of any of clauses 1 to 3, wherein: the strain at the UTS is in a range of about 2% to about 18%.

Further Clause 5. The lithium-ion battery of any of clauses 1 to 4, wherein: the maximum areal expansion is in a range of about 0.1% to about 6.0%.

Further Clause 6. The lithium-ion battery of any of clauses 1 to 5, wherein: the UTS is about 250 MPa or greater.

Further Clause 7. The lithium-ion battery of any of clauses 1 to 6, wherein: the mass fraction of the silicon in the composite particles of the anode coatings is in a range of about 15 wt. % to about 40 wt. % of the anode coatings.

Further Clause 8. The lithium-ion battery of any of clauses 1 to 7, wherein: the mass fraction of the silicon in the composite particles of the anode coatings is in a range of about 10 wt. % to about 65 wt. % of the anode coatings.

Further Clause 9. The lithium-ion battery of any of clauses 1 to 8, wherein: a capacity of the silicon in the composite particles of the anode coatings is in a range of about 500 mAh/g to about 1500 mAh/g.

Further Clause 10. The lithium-ion battery of any of clauses 1 to 9, wherein: the copper foil is an electrodeposited copper foil.

Further Clause 11. The lithium-ion battery of any of clauses 1 to 10, wherein: the copper foil exhibits a yield strength of about 170 MPa or greater.

Further Clause 12. The lithium-ion battery of any of clauses 1 to 11, wherein: a thickness of the copper foil is in a range of about 7 μm to about 12 μm.

Further Clause 13. The lithium-ion battery of clause 12, wherein: the thickness of the copper foil is in a range of about 8 μm to about 10 μm.

Further Clause 14. The lithium-ion battery of any of clauses 1 to 13, wherein: an average thickness of the anode coatings is in a range of about 25 μm to about 75 μm.

Further Clause 15. The lithium-ion battery of any of clauses 1 to 14, wherein: the anode coatings comprise graphite.

Further Clause 16. The lithium-ion battery of any of clauses 1 to 15, wherein: the anode component is a first anode component; the lithium-ion battery comprises a plurality of the first anode components; the cathode component is a first cathode component; the lithium-ion battery comprises a plurality of the first cathode components; and the plurality of the first anode components and the plurality of the first cathode components are stacked along a stacking direction perpendicular to a plane of the plurality of the first anode components and the plurality of the first cathode components, the plurality of the first anode components and the plurality of the first cathode components alternating along the stacking direction.

Further Clause 17. The lithium-ion battery of clause 16, wherein: the lithium-ion battery is configured as a pouch cell, a prismatic cell, or a coin cell.

Further Clause 18. The lithium-ion battery of any of clauses 1 to 17, wherein: the anode component, the cathode component, and the separator are wound around a common core.

Further Clause 19. The lithium-ion battery of clause 18, wherein: the lithium-ion battery is configured as a cylindrical cell, a coin cell, or a jelly roll cell.

Further Clause 20. A method of making a lithium-ion battery configured to undergo multiple charging and discharging cycles, the method comprising: (A1) providing an anode component comprising an anode current collector and a respective anode coating on each side of the anode current collector; (A2) providing a cathode component comprising a cathode current collector and a respective cathode coating on each side the cathode current collector; and (A3) assembling the lithium-ion battery with a separator interposed between the anode component and the cathode component and an electrolyte infiltrated in the separator between the anode component and the cathode component, wherein: the anode coatings comprise composite particles comprising carbon and silicon, a mass fraction of the silicon in the composite particles of the anode coatings being in a range of about 5 wt. % to about 70 wt. % of the anode coatings; the anode component undergoes a maximum areal expansion ($A_{max}$) during the multiple charging and discharging cycles, expressed as a percentage of an area of the anode component before the multiple charging and discharging cycles; the anode current collector comprises a copper foil, the copper foil being characterized, before the respective anode coatings are formed thereon, by an ultimate tensile stress (UTS) and a strain at the UTS ($\varepsilon_{UTS}$), expressed in %; and the maximum areal expansion and the strain at the UTS are related as follows:

$$A_{max} \leq \varepsilon_{UTS} \quad \text{(Formula 1).}$$

Further Clause 21. The method of clause 20, wherein: the maximum areal expansion and the strain at the UTS are related as follows:

$$A_{max} \leq a\varepsilon_{UTS} - b \quad \text{(Formula 2);}$$

a is in a range of about 0.6 to about 1.0; and b is in a range of about 0.0 to about 0.7.

Further Clause 22. The method of clause 21, wherein: the a is in a range of about 0.6 to about 0.7; and the b is in a range of about 0.6 to about 0.7.

Further Clause 23. The method of any of clauses 20 to 22, wherein: the strain at the UTS is in a range of about 2% to about 18%.

Further Clause 24. The method of any of clauses 20 to 23, wherein: the maximum areal expansion is in a range of about 0.1% to about 6.0%.

Further Clause 25. The method of any of clauses 20 to 24, wherein: the mass fraction of the silicon in the composite particles of the anode coatings is in a range of about 15 wt. % to about 40 wt. % of the anode coatings.

Further Clause 26. The method of any of clauses 20 to 25, wherein: the mass fraction of the silicon in the composite particles of the anode coatings is in a range of about 10 wt. % to about 65 wt. % of the anode coatings.

Further Clause 27. The method of any of clauses 20 to 26, wherein: a capacity of the silicon in the composite particles of the anode coatings is in a range of about 500 mAh/g to about 1500 mAh/g.

Further Clause 28. The method of any of clauses 20 to 27, wherein: the copper foil is an electrodeposited copper foil.

Further Clause 29. The method of any of clauses 20 to 28, wherein: a thickness of the copper foil is in a range of about 7 μm to about 12 μm.

Further Clause 30. The method of clause 29, wherein: the thickness of the copper foil is in a range of about 8 μm to about 10 μm.

Further Clause 31. The method of any of clauses 20 to 30, wherein: an average thickness of the anode coating is in a range of about 25 μm to about 75 μm.

Further Clause 32. The method of any of clauses 20 to 31, wherein: the anode coatings comprise graphite.

The forgoing description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A lithium-ion battery configured to undergo multiple charging and discharging cycles, comprising:

an anode component, comprising an anode current collector and a respective anode coating on each side of the anode current collector;

a cathode component, comprising a cathode current collector and a respective cathode coating on each side of the cathode current collector;

a separator interposed between the anode component and the cathode component; and an electrolyte infiltrated in the separator between the anode component and the cathode component, wherein:

the anode coatings comprise composite particles comprising carbon and silicon, a mass fraction of the silicon in the composite particles of the anode coatings being in a range of about 5 wt. % to about 70 wt. % of the anode coatings;

the anode component undergoes a maximum areal expansion ($A_{max}$) during the multiple charging and discharging cycles, expressed as a percentage of an area of the anode component before the multiple charging and discharging cycles;

the anode current collector comprises a copper foil, the copper foil being characterized, before the respective anode coatings are formed thereon, by an ultimate tensile stress (UTS) and a strain at the UTS ($\varepsilon_{UTS}$), expressed in %; and the maximum areal expansion and the strain at the UTS are related as follows:

$$A_{max} \leq \varepsilon_{UTS}. \quad \text{(Formula 1)}$$

2. The lithium-ion battery of claim 1, wherein: the maximum areal expansion and the strain at the UTS are related as follows:

$$A_{max} \leq a\varepsilon_{UTS} - b; \quad \text{(Formula 2)}$$

a is in a range of about 0.6 to about 1.0; and b is in a range of about 0.0 to about 0.7.

3. The lithium-ion battery of claim 2, wherein: the a is in a range of about 0.6 to about 0.7; and the b is in a range of about 0.6 to about 0.7.

4. The lithium-ion battery of claim 1, wherein: the strain at the UTS is in a range of about 2% to about 18%.

5. The lithium-ion battery of claim 1, wherein: the maximum areal expansion is in a range of about 0.1% to about 6.0%.

6. The lithium-ion battery of claim 1, wherein: the UTS is about 250 MPa or greater.

7. The lithium-ion battery of claim 1, wherein: the mass fraction of the silicon in the composite particles of the anode coatings is in a range of about 15 wt. % to about 40 wt. % of the anode coatings.

8. The lithium-ion battery of claim 1, wherein: the mass fraction of the silicon in the composite particles of the anode coatings is in a range of about 10 wt. % to about 65 wt. % of the anode coatings.

9. The lithium-ion battery of claim 1, wherein: a capacity of the silicon in the composite particles of the anode coatings is in a range of about 500 mAh/g to about 1500 mAh/g.

10. The lithium-ion battery of claim 1, wherein: the copper foil is an electrodeposited copper foil.

11. The lithium-ion battery of claim 1, wherein: the copper foil exhibits a yield strength of about 170 MPa or greater.

12. The lithium-ion battery of claim 1, wherein: a thickness of the copper foil is in a range of about 7 μm to about 12 μm.

13. The lithium-ion battery of claim 12, wherein: the thickness of the copper foil is in a range of about 8 μm to about 10 μm.

14. The lithium-ion battery of claim 1, wherein: an average thickness of the anode coatings is in a range of about 25 μm to about 75 μm.

15. The lithium-ion battery of claim 1, wherein: the anode coatings comprise graphite.

16. The lithium-ion battery of claim 1, wherein: the anode component is a first anode component; the lithium-ion battery comprises a plurality of the first anode components; the cathode component is a first cathode component; the lithium-ion battery comprises a plurality of the first cathode components; and the plurality of the first anode components and the plurality of the first cathode components are stacked along a stacking direction perpendicular to a plane of the plurality of the first anode components and the plurality of the first cathode components, the plurality of the first anode components and the plurality of the first cathode components alternating along the stacking direction.

17. The lithium-ion battery of claim 16, wherein: the lithium-ion battery is configured as a pouch cell, a prismatic cell, or a coin cell.

18. The lithium-ion battery of claim 1, wherein: the anode component, the cathode component, and the separator are wound around a common core.

19. The lithium-ion battery of claim 18, wherein: the lithium-ion battery is configured as a cylindrical cell, a coin cell, or a jelly roll cell.

20. A method of making a lithium-ion battery configured to undergo multiple charging and discharging cycles, the method comprising:

(A1) providing an anode component comprising an anode current collector and a respective anode coating on each side of the anode current collector;

(A2) providing a cathode component comprising a cathode current collector and a respective cathode coating on each side of the cathode current collector; and (A3) assembling the lithium-ion battery with a separator interposed between the anode component and the cathode component and an electrolyte infiltrated in the separator between the anode component and the cathode component, wherein:

the anode coatings comprise composite particles comprising carbon and silicon, a mass fraction of the silicon in the composite particles of the anode coatings being in a range of about 5 wt. % to about 70 wt. % of the anode coatings;

the anode component undergoes a maximum areal expansion ($A_{max}$) during the multiple charging and discharging cycles, expressed as a percentage of an area of the anode component before the multiple charging and discharging cycles;

the anode current collector comprises a copper foil, the copper foil being characterized, before the respective anode coatings are formed thereon, by an ultimate tensile stress (UTS) and a strain at the UTS ($\varepsilon_{UTS}$), expressed in %; and the maximum areal expansion and the strain at the UTS are related as follows:

$$A_{max} \leq \varepsilon_{UTS}. \quad \text{(Formula 1)}$$

21. The method of claim 20, wherein: the maximum areal expansion and the strain at the UTS are related as follows:

$$A_{max} \leq a\varepsilon_{UTS} - b; \quad \text{(Formula 2)}$$

a is in a range of about 0.6 to about 1.0; and b is in a range of about 0.0 to about 0.7.

22. The method of claim 21, wherein: the a is in a range of about 0.6 to about 0.7; and the b is in a range of about 0.6 to about 0.7.

23. The method of claim 20, wherein: the strain at the UTS is in a range of about 2% to about 18%.

24. The method of claim 20, wherein: the maximum areal expansion is in a range of about 0.1% to about 6.0%.

25. The method of claim 20, wherein: the mass fraction of the silicon in the composite particles of the anode coatings is in a range of about 15 wt. % to about 40 wt. % of the anode coatings.

26. The method of claim 20, wherein: the mass fraction of the silicon in the composite particles of the anode coatings is in a range of about 10 wt. % to about 65 wt. % of the anode coatings.

27. The method of claim 20, wherein: a capacity of the silicon in the composite particles of the anode coatings is in a range of about 500 mAh/g to about 1500 mAh/g.

28. The method of claim 20, wherein: the copper foil is an electrodeposited copper foil.

29. The method of claim 20, wherein: a thickness of the copper foil is in a range of about 7 μm to about 12 μm.

30. The method of claim 29, wherein: the thickness of the copper foil is in a range of about 8 μm to about 10 μm.

31. The method of claim 20, wherein: an average thickness of the anode coatings is in a range of about 25 μm to about 75 μm.

32. The method of claim 20, wherein: the anode coatings comprise graphite.

* * * * *